US009300398B2

(12) United States Patent
Chaffee et al.

(10) Patent No.: US 9,300,398 B2
(45) Date of Patent: Mar. 29, 2016

(54) USPL-FSO LASERCOM POINT-TO-POINT AND POINT-TO-MULTIPOINT OPTICAL WIRELESS COMMUNICATION

(71) Applicant: ATTOCHRON LLC, Lexington, VA (US)

(72) Inventors: Tom Chaffee, Lexington, VA (US); Paul F. Szajowski, Chatham, NJ (US); Isaac Kim, La Jolla, CA (US); Alexandre Braga, Albuquerque, NM (US)

(73) Assignee: ATTOCHRON, LLC, Lexington, VA (US)

( * ) Notice: Subject to any disclaimer, the term of this patent is extended or adjusted under 35 U.S.C. 154(b) by 7 days.

(21) Appl. No.: 13/737,898

(22) Filed: Jan. 9, 2013

(65) Prior Publication Data

US 2013/0182620 A1    Jul. 18, 2013

Related U.S. Application Data

(60) Provisional application No. 61/584,666, filed on Jan. 9, 2012.

(51) Int. Cl.
*H04B 7/00* (2006.01)
*H04B 10/11* (2013.01)
*H04B 10/112* (2013.01)

(52) U.S. Cl.
CPC ............ *H04B 10/11* (2013.01); *H04B 10/1121* (2013.01)

(58) Field of Classification Search
CPC ............................. H04B 10/11; H04B 10/1121
USPC .................................................. 370/212, 310
See application file for complete search history.

(56) References Cited

U.S. PATENT DOCUMENTS

| 6,043,920 | A | 3/2000 | Leopold et al. |
| 6,735,398 | B1 * | 5/2004 | Izadpanah et al. ............ 398/189 |
| 6,978,093 | B2 * | 12/2005 | Clark ................. H04B 10/1125 398/118 |
| 6,990,350 | B2 * | 1/2006 | Davis et al. ................ 455/452.2 |
| 7,106,973 | B2 * | 9/2006 | Kube ................. H04B 10/1121 398/118 |
| 7,120,363 | B2 * | 10/2006 | Andreu-von Euw .................... H04B 10/1127 398/118 |

(Continued)

FOREIGN PATENT DOCUMENTS

EP    0798825 A2    10/1997

OTHER PUBLICATIONS

PCT Search Report and Written Opinion dated Jun. 24, 2013 for corresponding PCT application No. PCT/US2013/020892.

*Primary Examiner* — Brian O'Connor
(74) *Attorney, Agent, or Firm* — Loza & Loza, LLP; A. John Kefalos

(57) ABSTRACT

Enhancements in optical beam propagation performance can be realized through the utilization of ultra-short pulse laser (USPL) sources for laser transmit platforms, which are can be used throughout the telecommunication network infrastructure fabric. One or more of the described and illustrated features of USPL free space-optical (USPL-FSO) laser communications can be used in improving optical propagation through the atmosphere, for example by mitigating optical attenuation and scintillation effects, thereby enhancing effective system availability as well as link budget considerations, as evidenced through experimental studies and theoretical calculations between USPL and fog related atmospheric events.

25 Claims, 34 Drawing Sheets

(56) References Cited

U.S. PATENT DOCUMENTS

| | | | |
|---|---|---|---|
| 7,593,643 B2 * | 9/2009 | Diels | G02F 1/3515 398/146 |
| 7,616,897 B2 * | 11/2009 | Graves | 398/129 |
| 7,989,775 B2 * | 8/2011 | Allen et al. | 250/393 |
| 8,379,285 B1 * | 2/2013 | Diels | H01S 3/1121 359/239 |
| 8,488,639 B1 * | 7/2013 | Diels | H01S 3/10092 372/13 |
| 8,774,635 B2 * | 7/2014 | Juarez | H04B 10/1121 398/118 |
| 9,086,342 B2 * | 7/2015 | Miller | G01N 21/3504 398/130 |
| 2007/0242955 A1 * | 10/2007 | Kavehrad | 398/130 |
| 2010/0189438 A1 | 7/2010 | Hoshida | |
| 2010/0220754 A1 * | 9/2010 | Yokoyama et al. | 372/25 |
| 2010/0315701 A1 | 12/2010 | Takeyama | |
| 2012/0170599 A1 * | 7/2012 | Sprangle et al. | 372/5 |
| 2012/0327963 A1 * | 12/2012 | Hubbard et al. | 372/29.014 |
| 2013/0315604 A1 * | 11/2013 | LoPresti et al. | 398/116 |

\* cited by examiner

USPL-FSO LASERCOM POINT-TO-POINT AND POINT-TO-MULTIPOINT OPTICAL WIRELESS COMMUNICATION

CROSS-REFERENCE TO RELATED APPLICATIONS

The current application claims priority under 35 U.S.C. §119(e) to U.S. provisional patent application No. 61/584,666 filed on Jan. 9, 2012, the disclosure of which is incorporated by reference herein in its entirety.

TECHNICAL FIELD

The subject matter described herein relates to free-space optical (FSO) wireless communications, and more particularly, to enhanced optical transport efficiencies that can be realized for wavelength propagation using ultra-short-pulse-laser (USPL) sources for beam propagation through optically impaired atmospheric conditions due to conditions that can include without limitation fog, atmospheric beam wander, scintillation effects, and the like.

BACKGROUND

Explosive growth in demand for telecommunication services, from both the private as well as commercial sectors, has placed an unprecedented strain upon currently available telecommunications networks. Without alternative network delivery technologies and topologies, overall effective network speed is likely to be reduced while occurrences of bottlenecks within networks will become increasingly frequent.

Bi-directional, free-space optical (FSO) communications networks can, where feasible, provide a useful alternative to microwave links, wire, or cable system applications. Such networks can be transparent to current as well as future network architectures due to sharing of common technological platforms with fiber optic transmission systems, the backbone of many present day telecommunication systems. FSO communication systems can generally share common fiber-optic components, and commercial optical components can often utilized for both applications. The primary difference in free-space optical data link systems is that the medium of propagation is the atmosphere rather than optical fiber.

Utilizing current state-of-the art fiber-optic components, free-space optical data links can be fully integrated into current short-haul and long-haul high-speed optical networks. Free-space data links can fully attain current synchronous optical networking (SONET) system architectures, such as for example SONET OC-48 architectures utilizing current 1550 nm technology platforms. Additionally, such systems can be scaled to higher data rates and configurations. Optical data link systems can benefit from operating in an unregulated segment of the electro-magnetic spectrum. Unlike the microwave and RF spectrum, optical data links can generally require no special leasing fees or tariffs to be issued. Additionally, because of the operating wavelength of the system, issues related to eye safety can generally be minimized. Furthermore, no special precautions or permits are typically required operating a free-space data link related to territorial right-of-ways. Expenses related to plowing and trenching of fixed cabled systems can also be avoided.

More recently, FSO communication technology has leveraged commercial advancements made within the 1550 nm optical transmission band. Erbium fiber doped amplifier (EFDA) technology has been incorporated within system design configuration for enhancing the overall effective optical budget of transport budgets and thereby extending the reach of transport systems over the air.

High power optical amplifiers are useful for terrestrial free-space transmission as well as fiber optic systems. Repeater distances have been extended in terrestrial and submarine fiber systems and dense wavelength division multiplexing (DWDM) transmission architectures have been introduced. With the advent of high power Er/Yb optical amplifiers, similar advances as seen in fiber optic transmission have also been realized in optical wireless and free-space laser communications systems. Experimental transmission results for a single-channel 1550 nm free-space optical data-link operating at 2.5 Gbps over a 2.4 km transmission span have been reported, as have results for a four-channel 1550 nm wavelength division multiplexing (WDM) free-space optical data link operating at 10 Gbps over a 4.4 km transmission distance.

SUMMARY

In some implementations of the current subject matter, an optical communication apparatus and a method for operating the same are provided for the generation and transmission of a modulated signal.

In one aspect, the optical communication apparatus includes an ultra-short-pulse-laser (USPL) source that generates a beam of light pulses. Each lights pulse has a duration of approximately 1 nanosecond or shorter. The optical communication apparatus further includes a modulation element that applies a modulation signal to the beam generated by the USPL source to generate a modulated optical signal. The modulation signal carries data for transmission to a second optical communication apparatus. The optical communication apparatus further includes an optical transceiver that receives the modulated optical signal and transmits the modulated optical signal for receipt by the second optical communication apparatus.

In an interrelated aspect, a method includes generating a beam of light pulses. Each of these light pulses has a duration of approximately 1 nanosecond or shorter. The method further includes applying modulation signal to the beam to generate a modulated optical signal. The modulation signal carries data for transmission to a second optical communication apparatus. The method further includes receiving the modulated optical signal at an optical transceiver, and transmitting, using the optical transceiver, the modulated optical signal for receipt by the second optical communication apparatus.

In another interrelated aspect, a method includes generating first and second beams comprising light pulses; applying a first modulation signal to the first beam to generate a first modulated optical signal and a second modulation signal to the second beam to generate a second modulated optical signal; adjusting a first polarization state of the first modulated optical signal; multiplexing the first modulated optical signal having the adjusted first polarization state with the second modulated signal; and transmitting the multiplexed first modulated optical signal having the adjusted first polarization state with the second modulated signal by an optical transceiver for receipt by a second optical communication apparatus.

In an interrelated aspect, an optical communication apparatus includes a first laser source that generates a first beam comprising light pulses and a second laser source that generates a second beam comprising light pulses. A first modulation element applies a first modulation signal to the first beam to generate a first modulated optical signal. The first modulation signal carries first data for transmission to a remote optical communication apparatus. A second modulation element applies a second modulation signal to the second beam to generate a second modulated optical signal. The second modulation signal carries second data for transmission to the remote optical communication apparatus. A first polarization component adjusts a first polarization state of the first modulated optical signal. A polarization dependent multiplexer component multiplexes the first modulated optical signal having the adjusted first polarization state with the second modulated signal. An optical transceiver receives the multiplexed optical signal first modulated optical signal with the adjusted first polarization state having the second modulated signal and transmits the multiplexed first modulated optical signal having the adjusted first polarization state with the second modulated signal for receipt by the second optical communication apparatus.

In further variations, one or more of the following additional features can be included in any feasible combination. With regard to the optical communication apparatus, the modulation element can include at least one of a direct modulation element, an indirect modulation element, and an external modulation element. The external modulation element can be external to the USPL source.

In some variations, the duration of each light pulse can be less than approximately a picosecond. In other variations, the duration of each light pulse can be less than approximately a femtosecond. In still other variations, the duration of each light pulse can be less than approximately an attosecond.

Alternatively or in addition, the optical communication apparatus can further include an optical multiplexer that multiplexes more than one communication channel into the beam.

In some variations, the optical communication apparatus can further include an optical amplifier disposed between the USPL source and the optical transceiver. The optical amplifier can increase an output power of the modulated optical signal transmitted by the optical transceiver. In some variations, the optical amplifier can include at least one of an optical pre-amplifier, a semi-conductor optical amplifier, an erbium-doped fiber amplifiers, and an erbium-ytterbium doped fiber amplifier.

In other variations, the optical communication apparatus can further include a second USPL source that supplies a second beam of light pulses to the optical transceiver. The second USPL source can serve as a tracking and alignment beacon to determine or verify a target point for the transmitted modulated optical signal at the second optical communication apparatus.

In yet other variations, a tracking and alignment beacon signal can be generated within the modulated optical signal. The tracking and alignment beacon signal can be used to determine or verify a target point for the transmitted modulated optical signal at the second optical communication apparatus.

In still other variations, the optical communication apparatus can further include a polarization dependent multiplexer component that multiplexes optical signals of differing polarity before transmission of the modulated optical signal to the second optical communication apparatus.

In some variations, the optical communication apparatus can further include a polarization dependent de-multiplexer component that de-multiplexes optical signals of differing polarity received as a second modulated optical signal from the second optical communication apparatus. The de-multiplexed optical signals can each be interfaced to a different optical network for network usage.

In some implementations of the current subject matter, a remote sensing apparatus and a method for operating the same are provided. In one aspect, a method includes generating, using a USPL source, a beam of light pulses each having a duration of approximately 1 nanosecond or shorter; transmitting the beam of light pulses toward a target atmospheric region via an optical transceiver; and analyzing optical information received at the optical transceiver as a result of optical backscattering of the beam of light pulses from one or more objects in the target atmospheric region.

In an interrelated aspect, a remote sensing apparatus includes an ultra-short-pulse-laser (USPL) source that generates a beam of light pulses each having a duration of approximately 1 of nanosecond or shorter; an optical transceiver that transmits the beam of light pulses toward a target atmospheric region; and detection circuitry for analyzing optical information received at the remote sensing apparatus as a result of optical backscattering from one or more objects in the target atmospheric region. The remote sensing apparatus can optionally include a spectrographic analysis component for analyzing spectroscopic information extracted from the optical information received at the remote sensing apparatus.

Implementations of the current subject matter can include, but are not limited to, systems and methods including one or more features as described herein as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTIONS OF THE DRAWINGS

The accompanying drawings, which are incorporated in and constitute a part of this specification, show certain aspects of the subject matter disclosed herein and, together with the description, help explain some of the principles associated with the disclosed implementations. In the drawings, FIG. 1 depicts an example of an optical communications platform including free-space coupling of a USPL source as an optical source for transport to a remote optical receive terminal;

Figure 11:
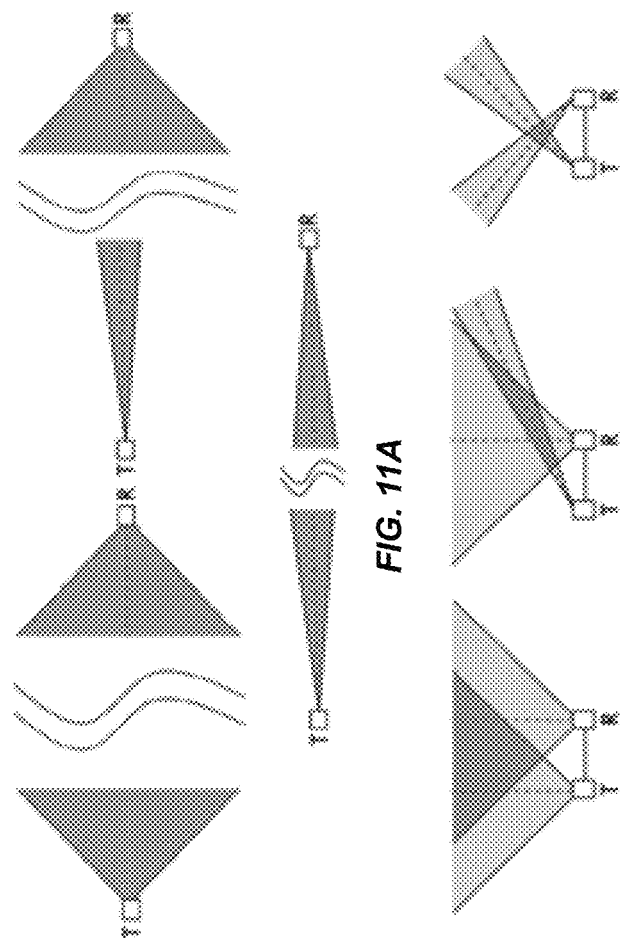
Figure 12:
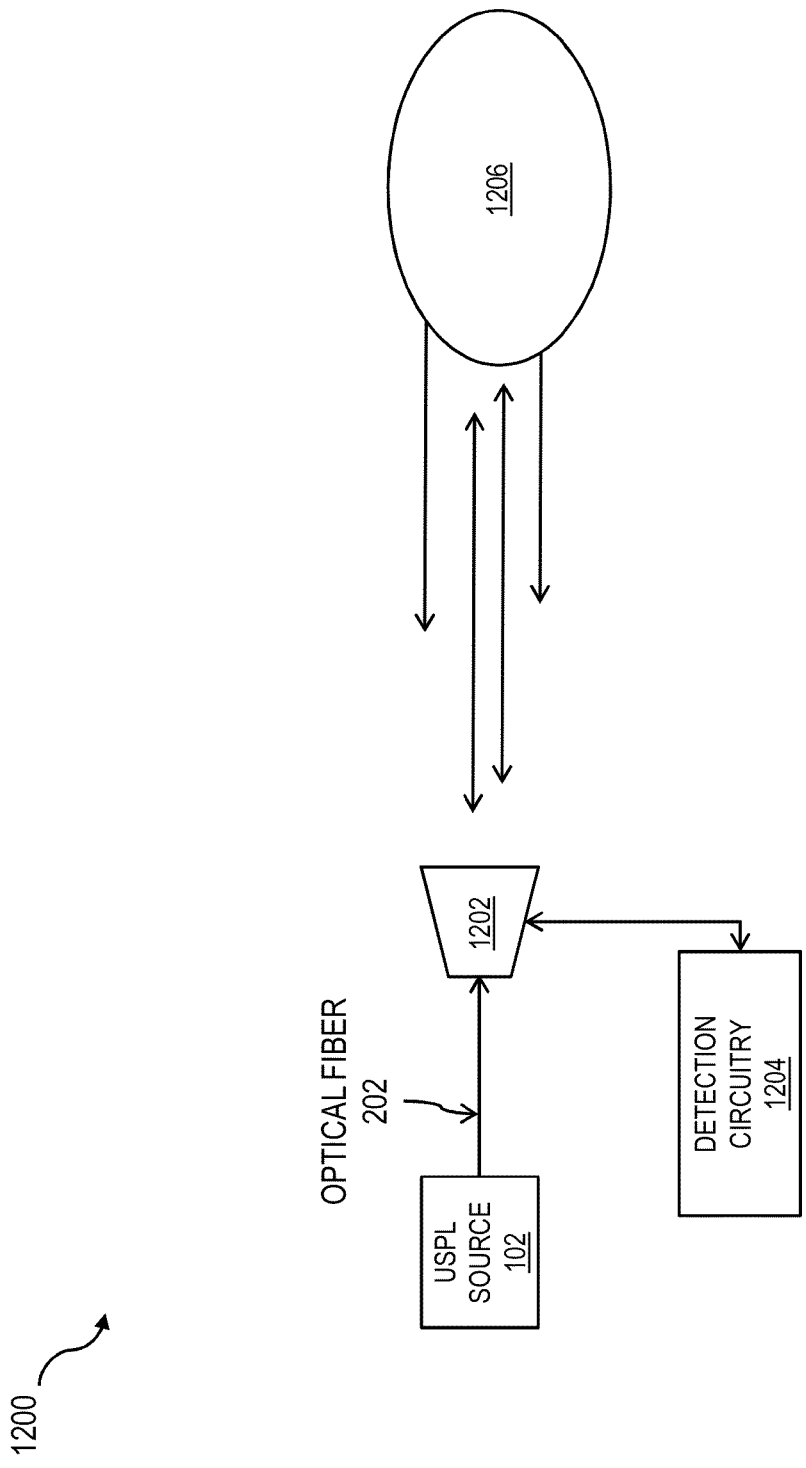
Figure 13:
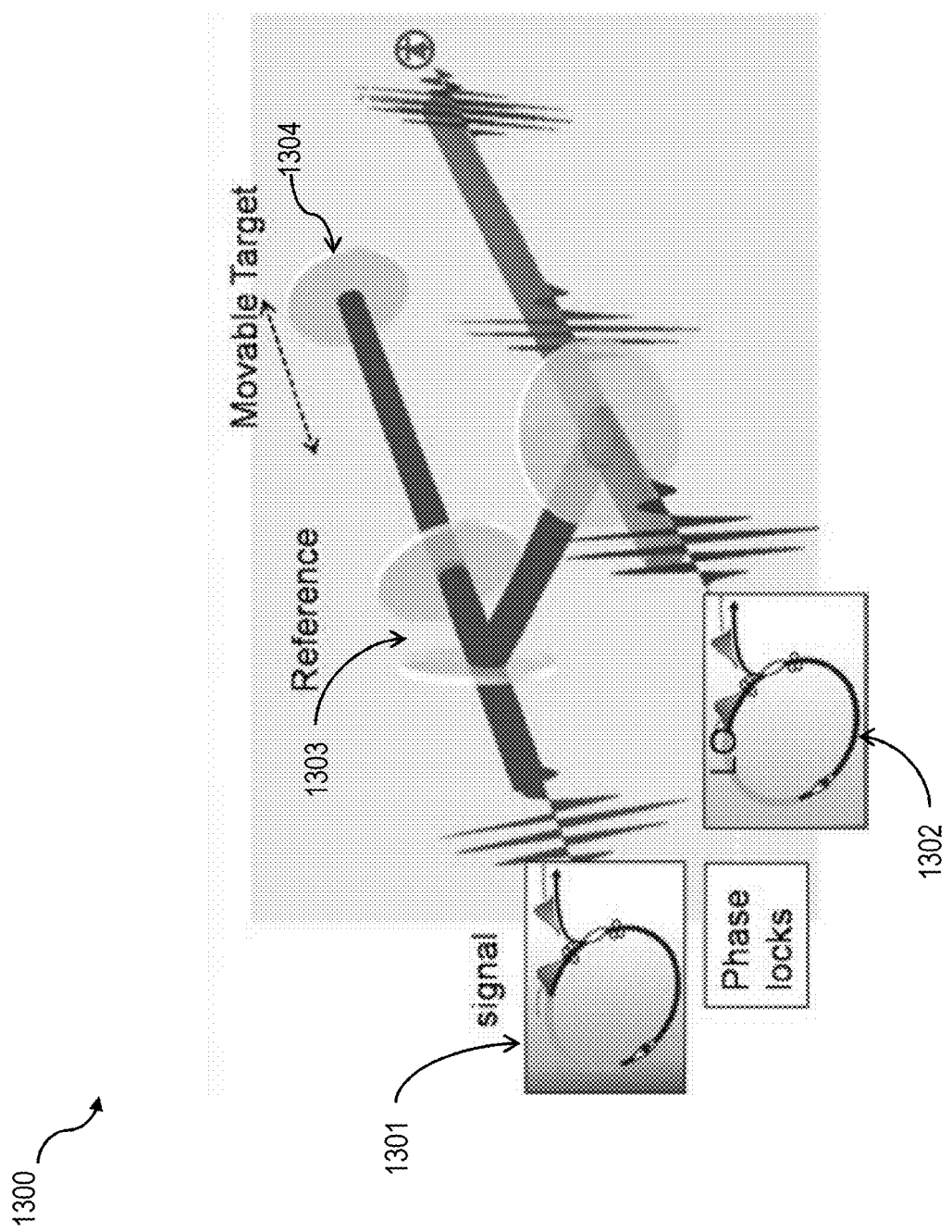

FIG. 11A and FIG. 11B respectively depict examples of USPL-FSO transceivers utilized for use in line-of-sight and non-line-of-sight lasercom applications;

FIG. 12 depicts an example of light propagated forward being backscattered by interaction with air-borne particulates that are the subject of investigation;

FIG. 13 depicts an example of USPL laser sources as optics reception techniques to improve detection sensitivity consistent with an implementation of the current subject matter; USPL laser sources as well as optical reception techniques to improve detection sensitivity.

Figure 14:
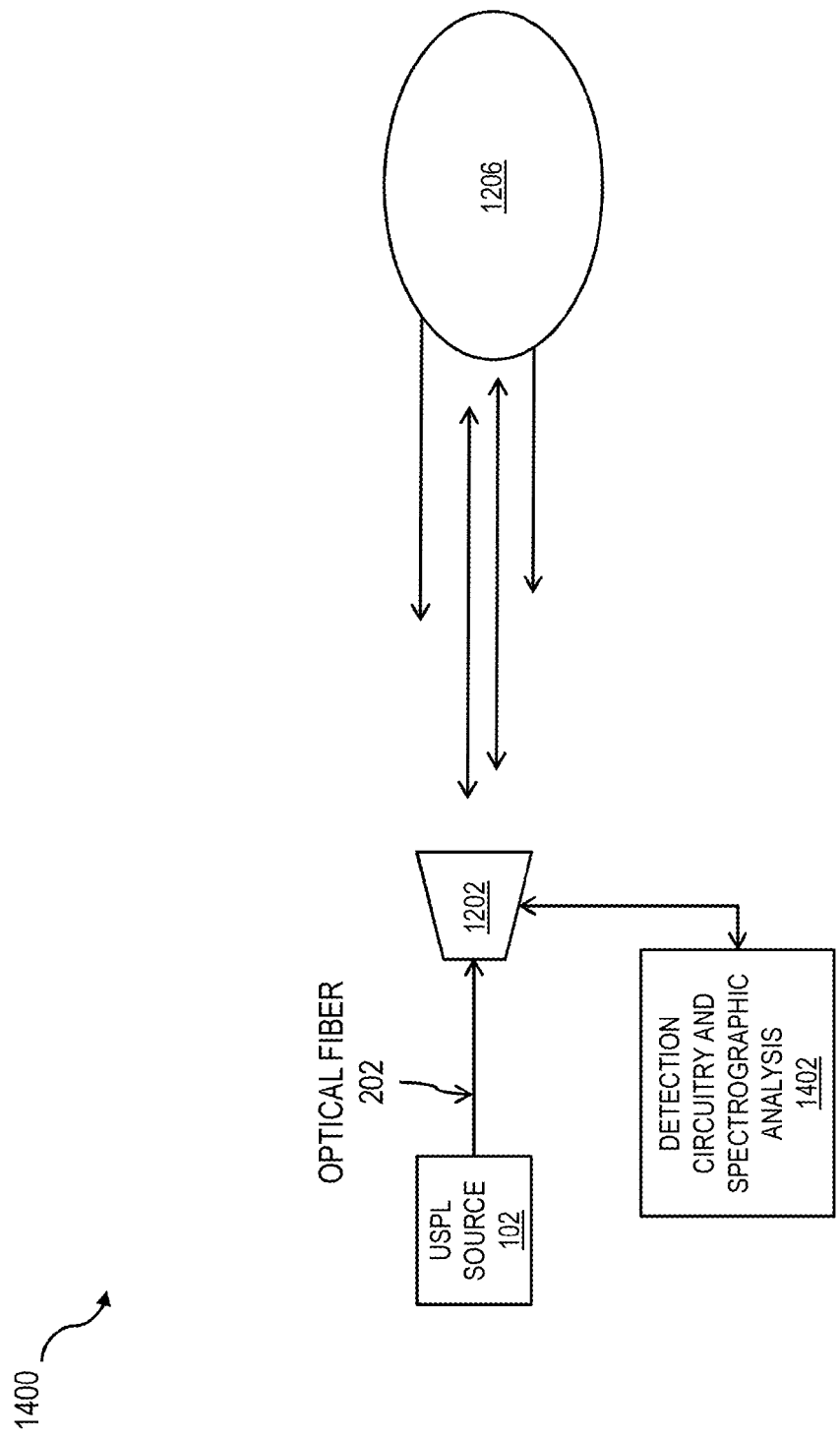
Figure 15:
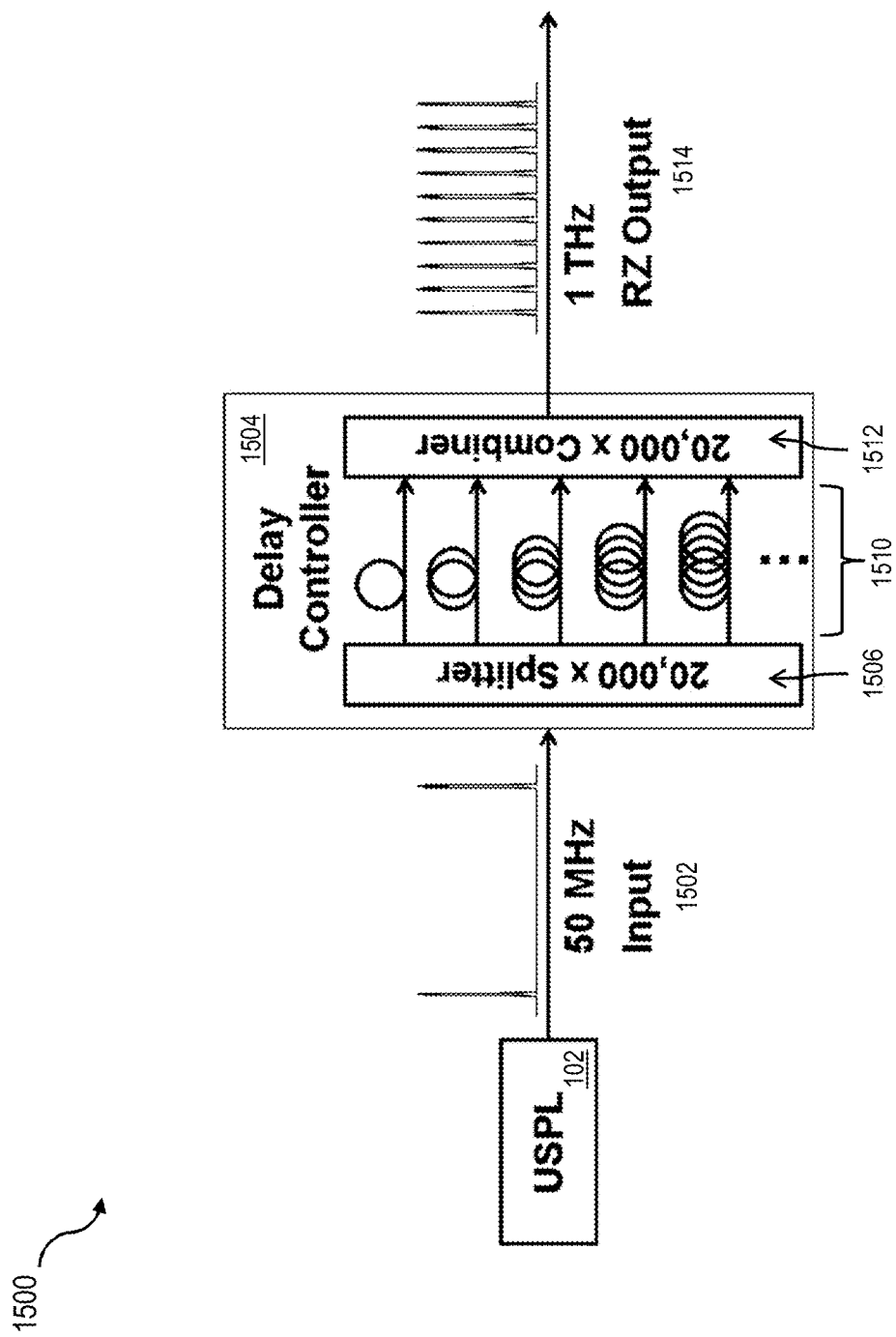
Figure 16:
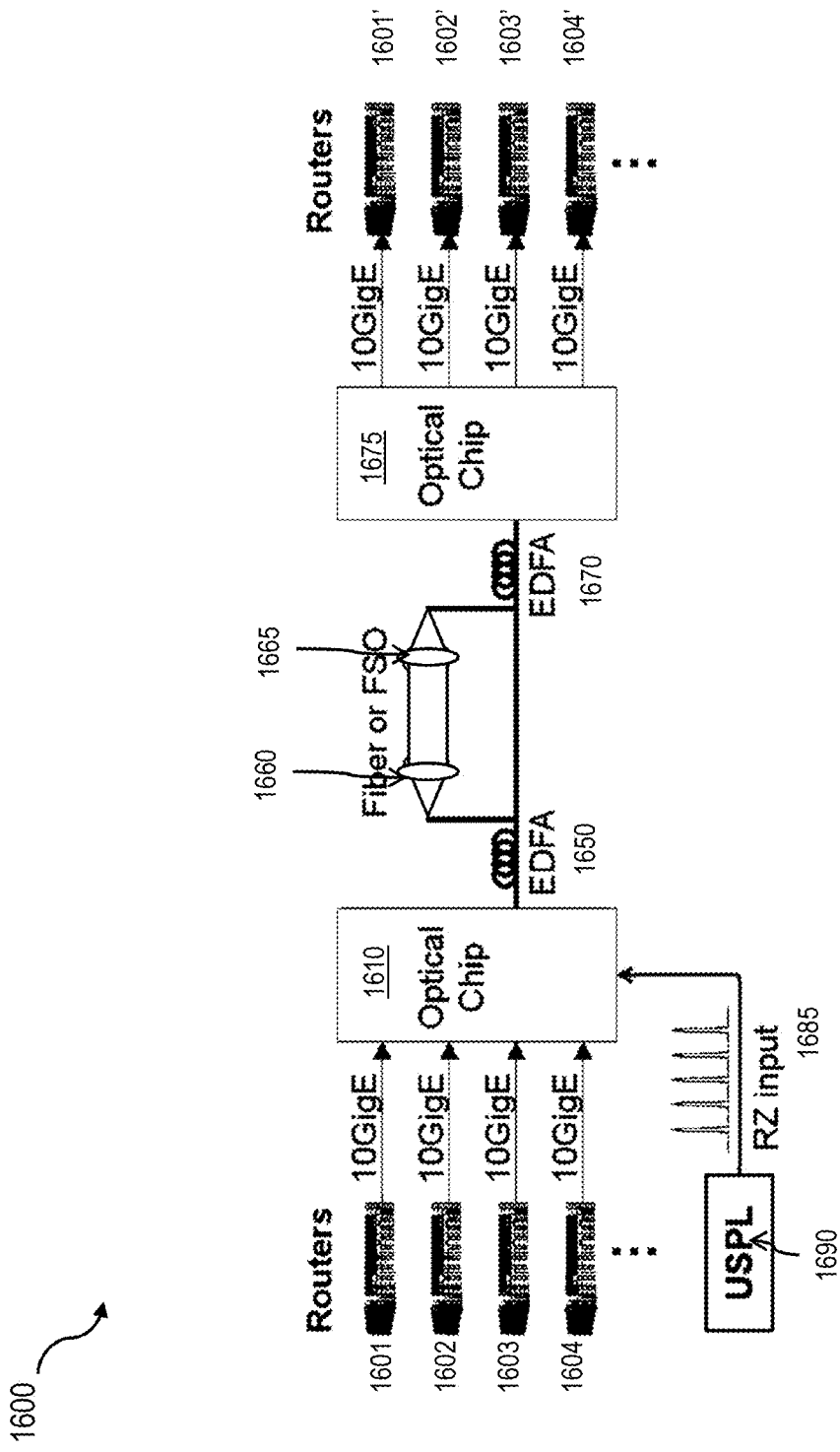
Figure 17:
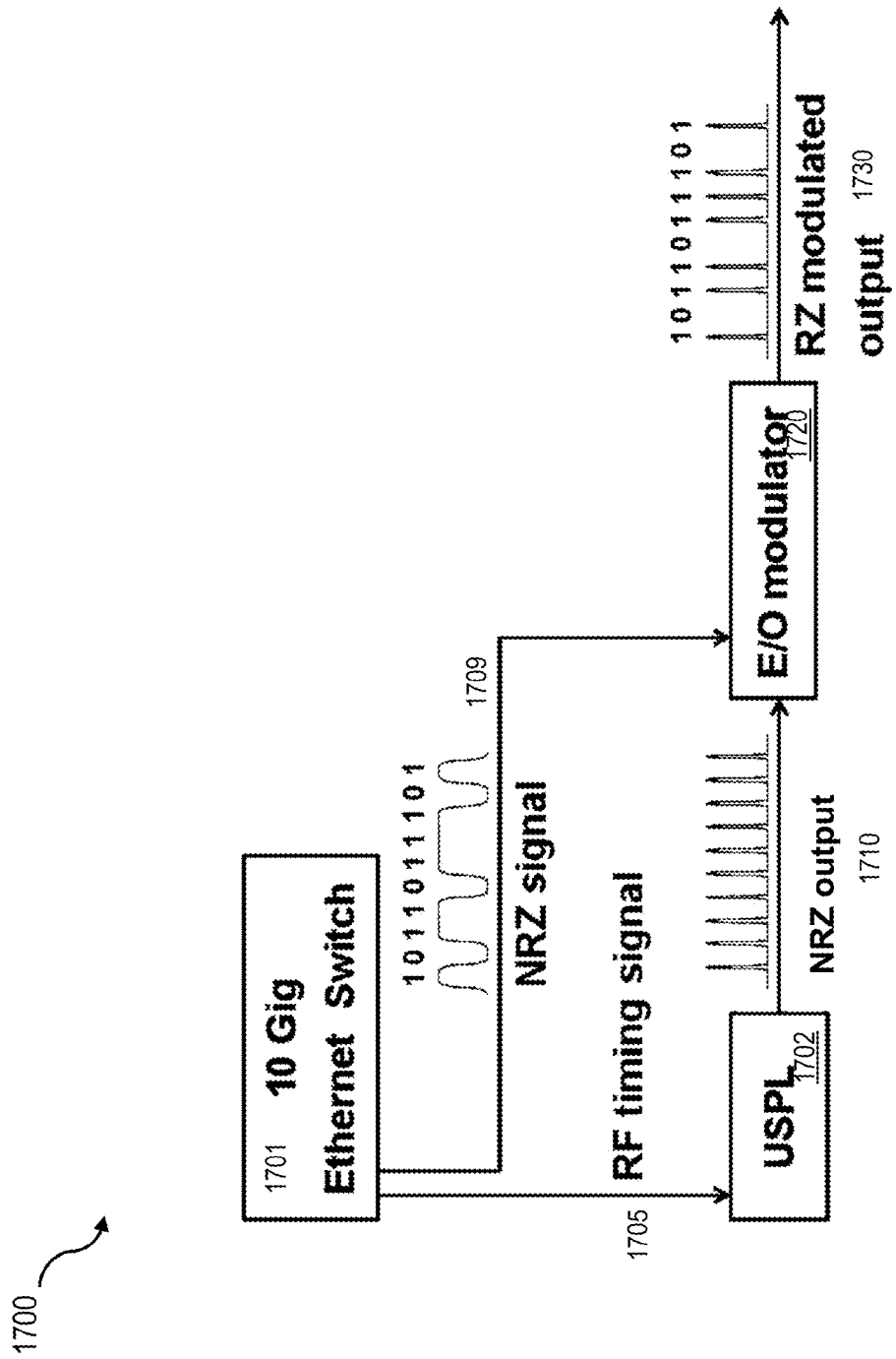
Figure 18:
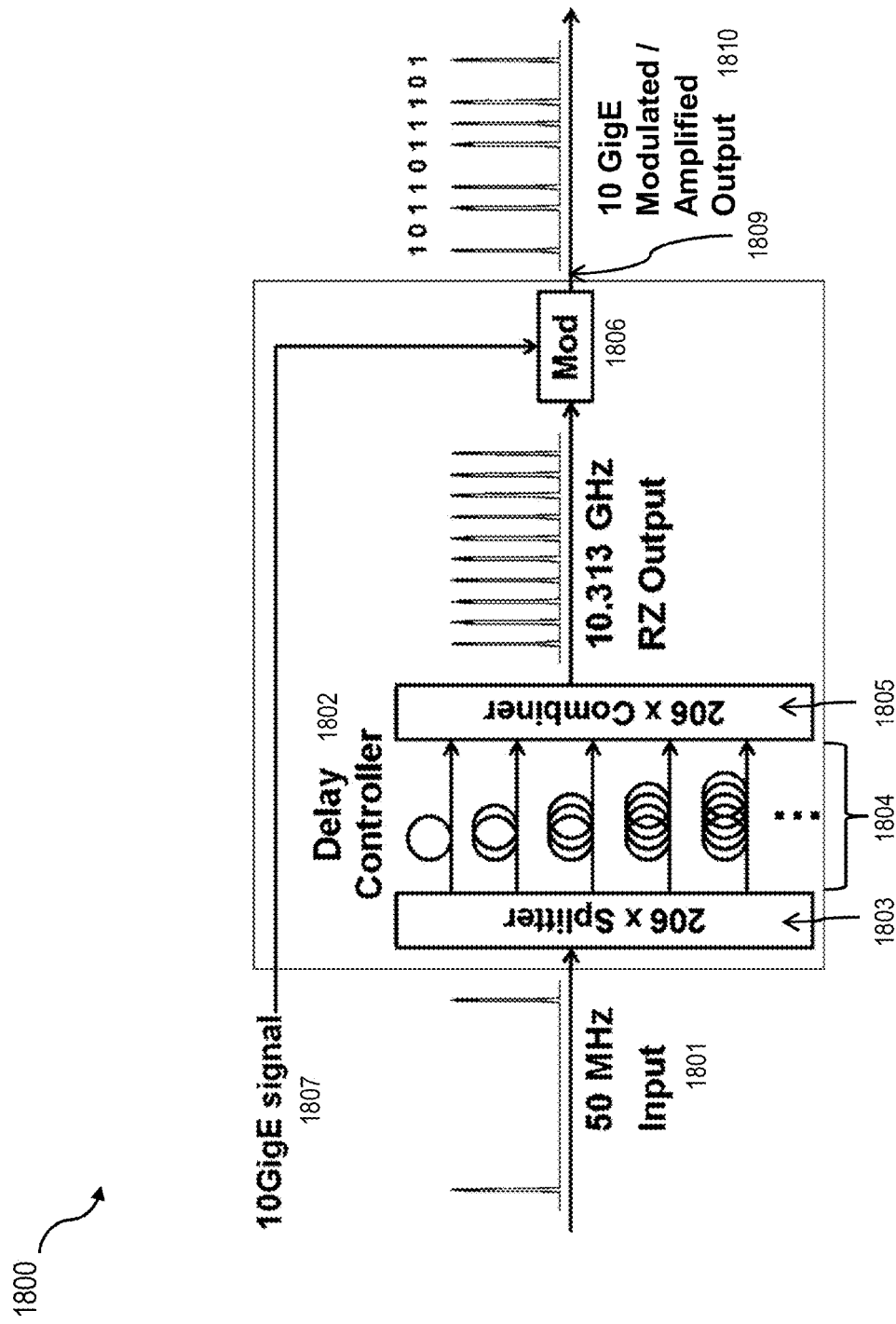
Figure 19:
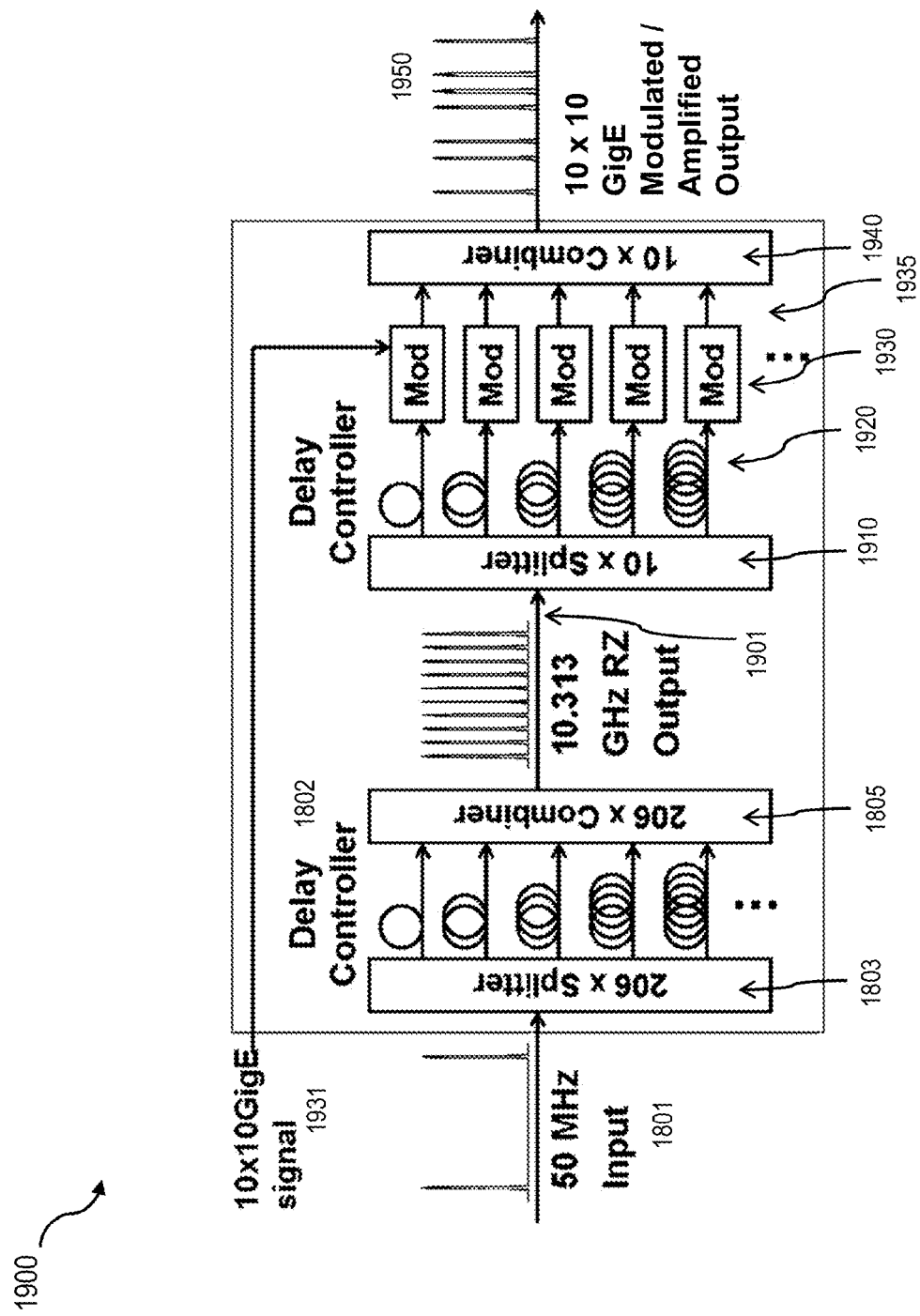
Figure 20:
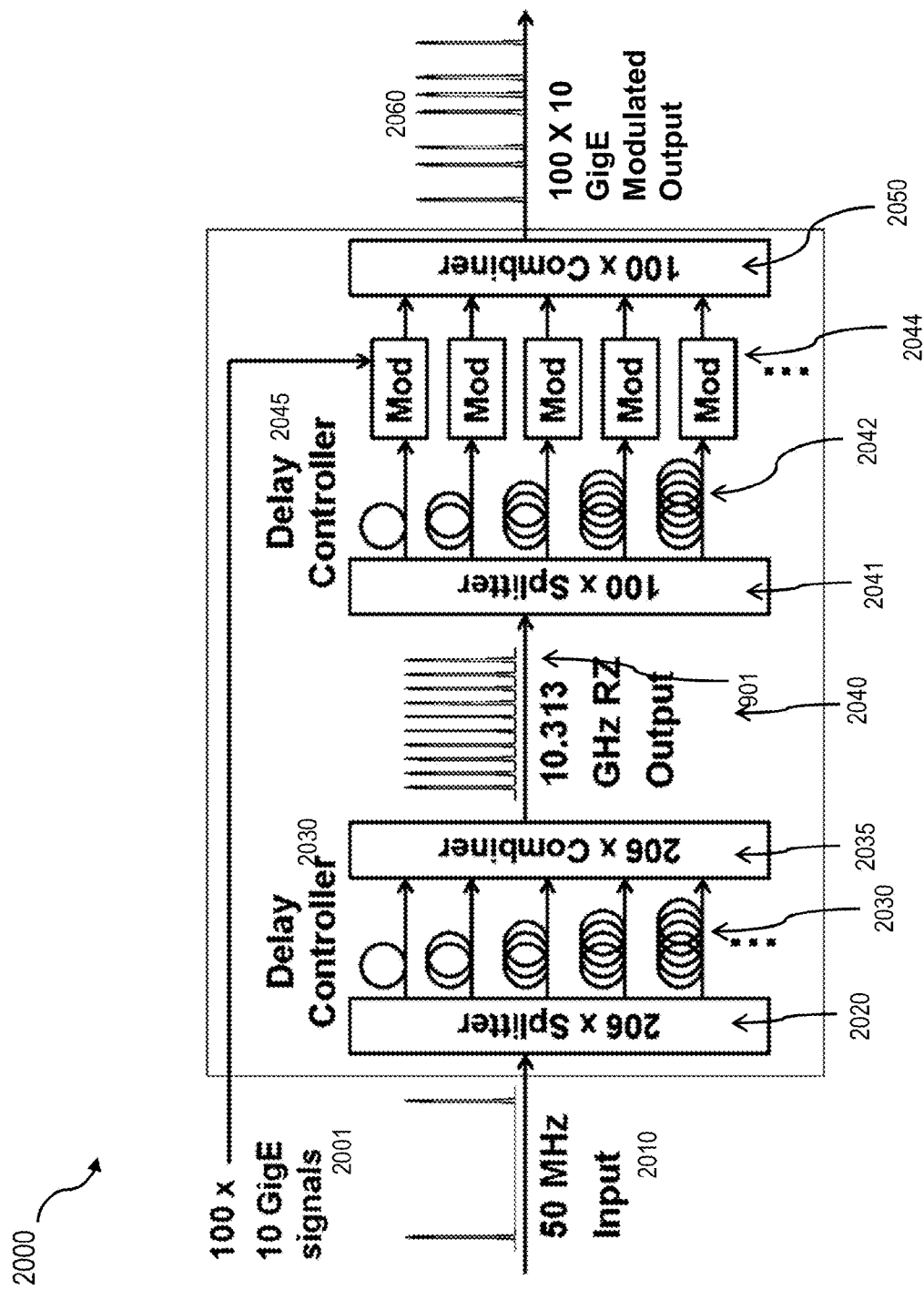
Figure 21:
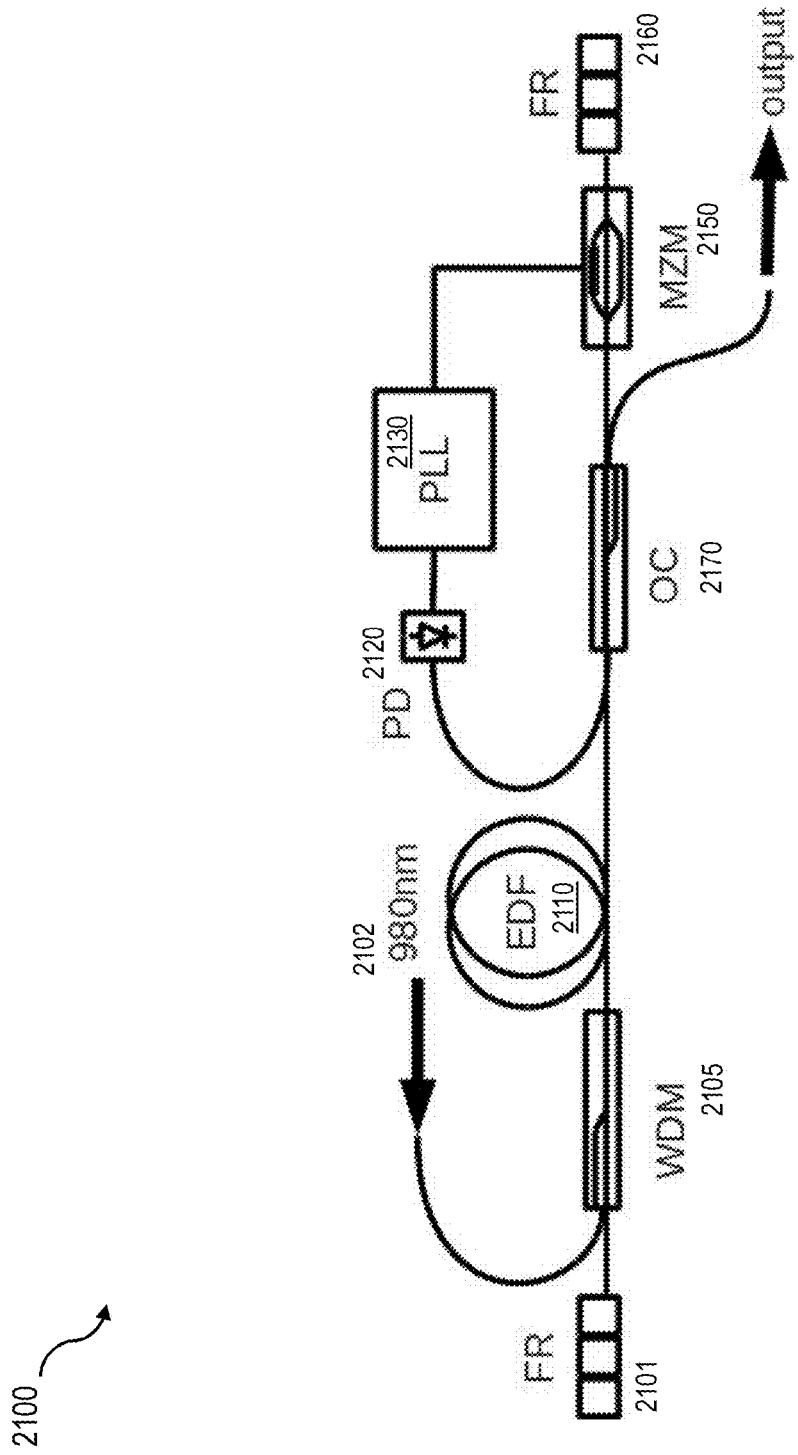
Figure 22:
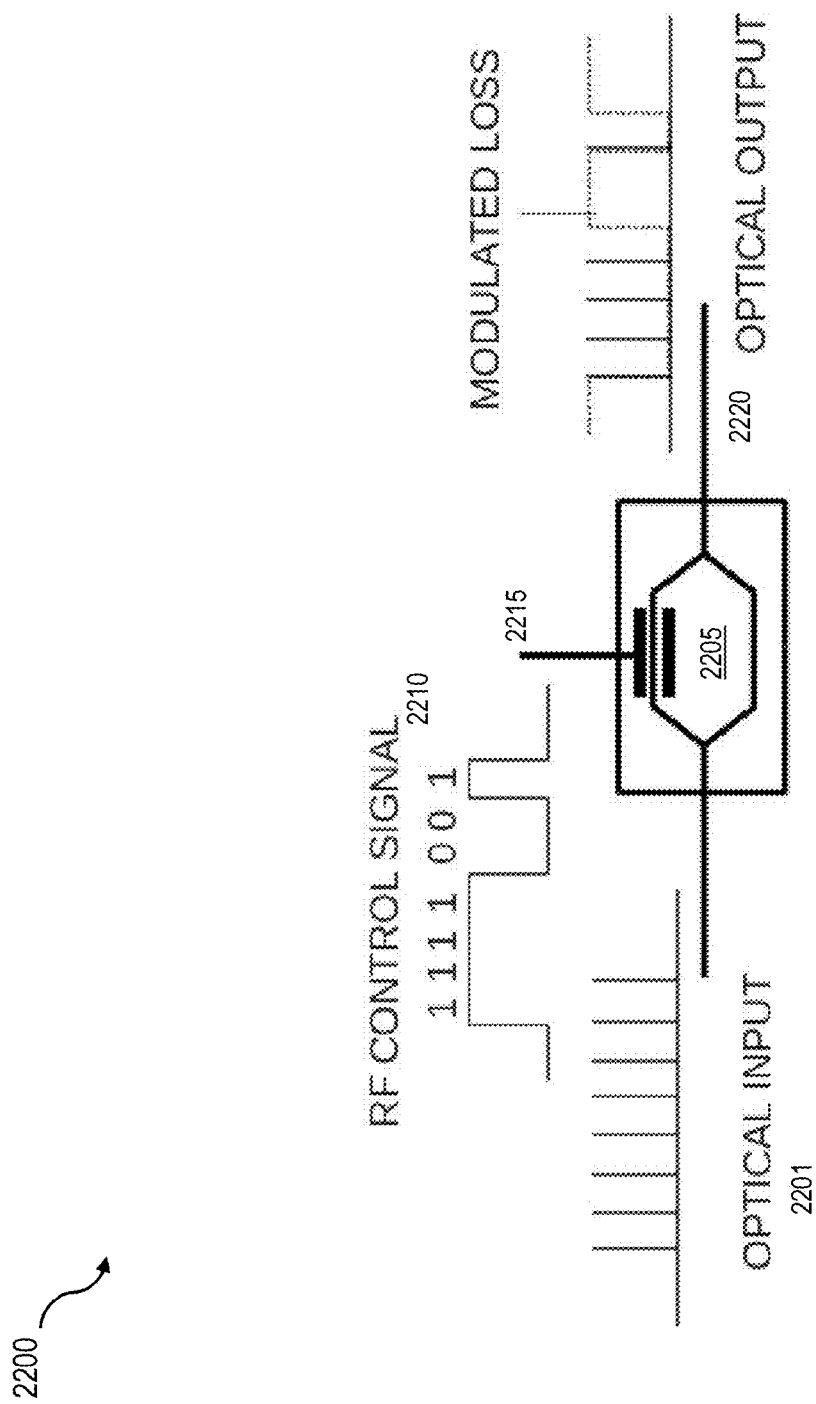
Figure 23:
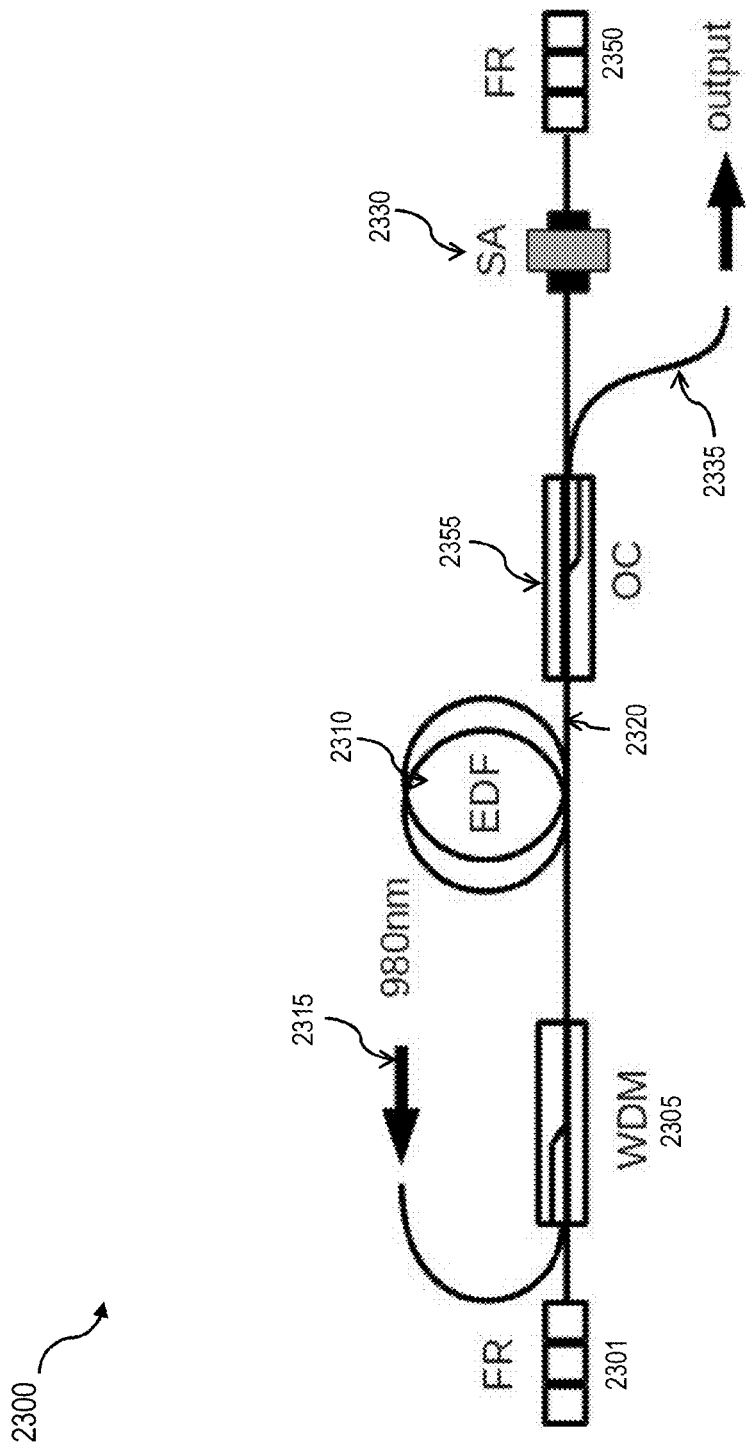
Figure 24:
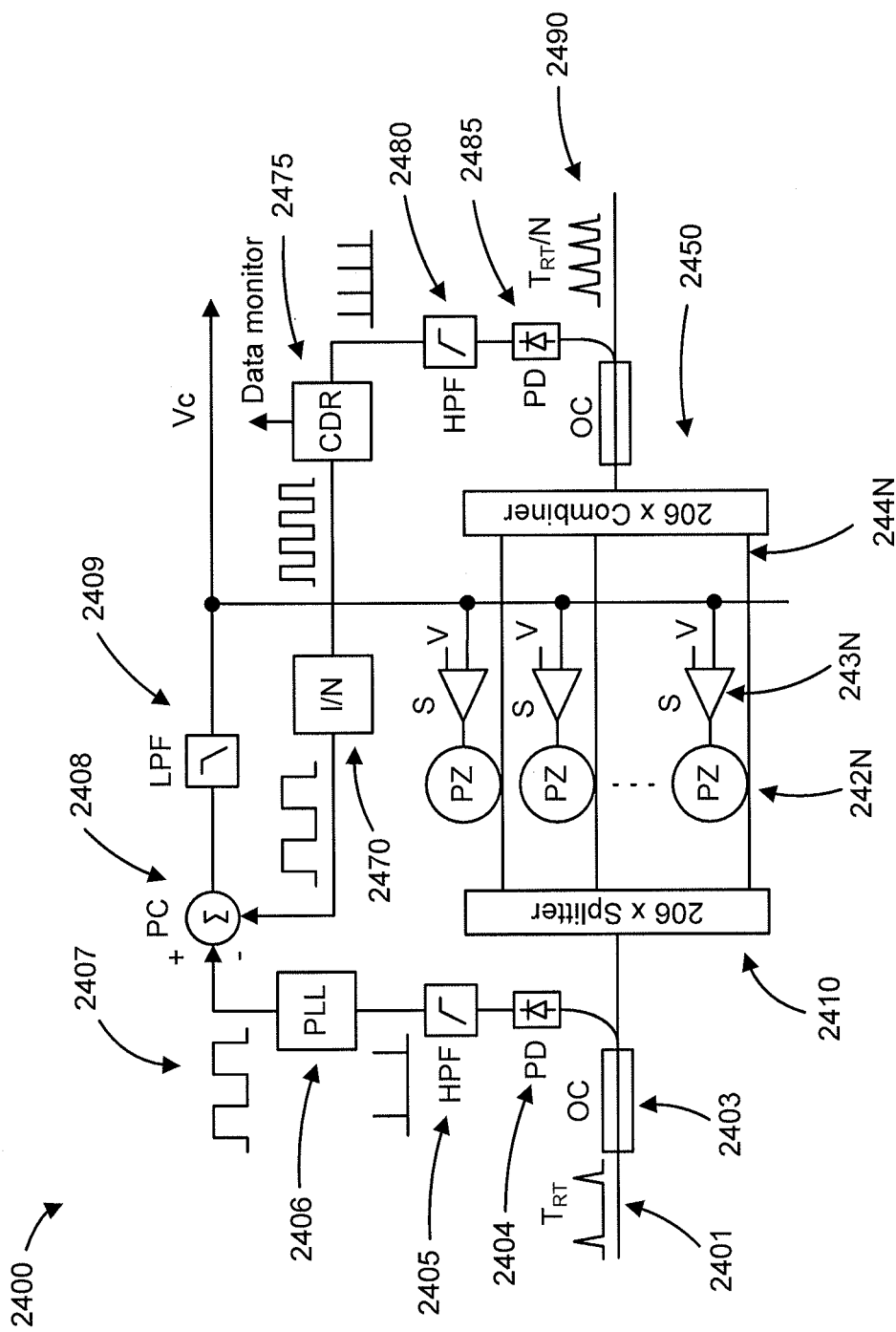
Figures 25A, 25B:
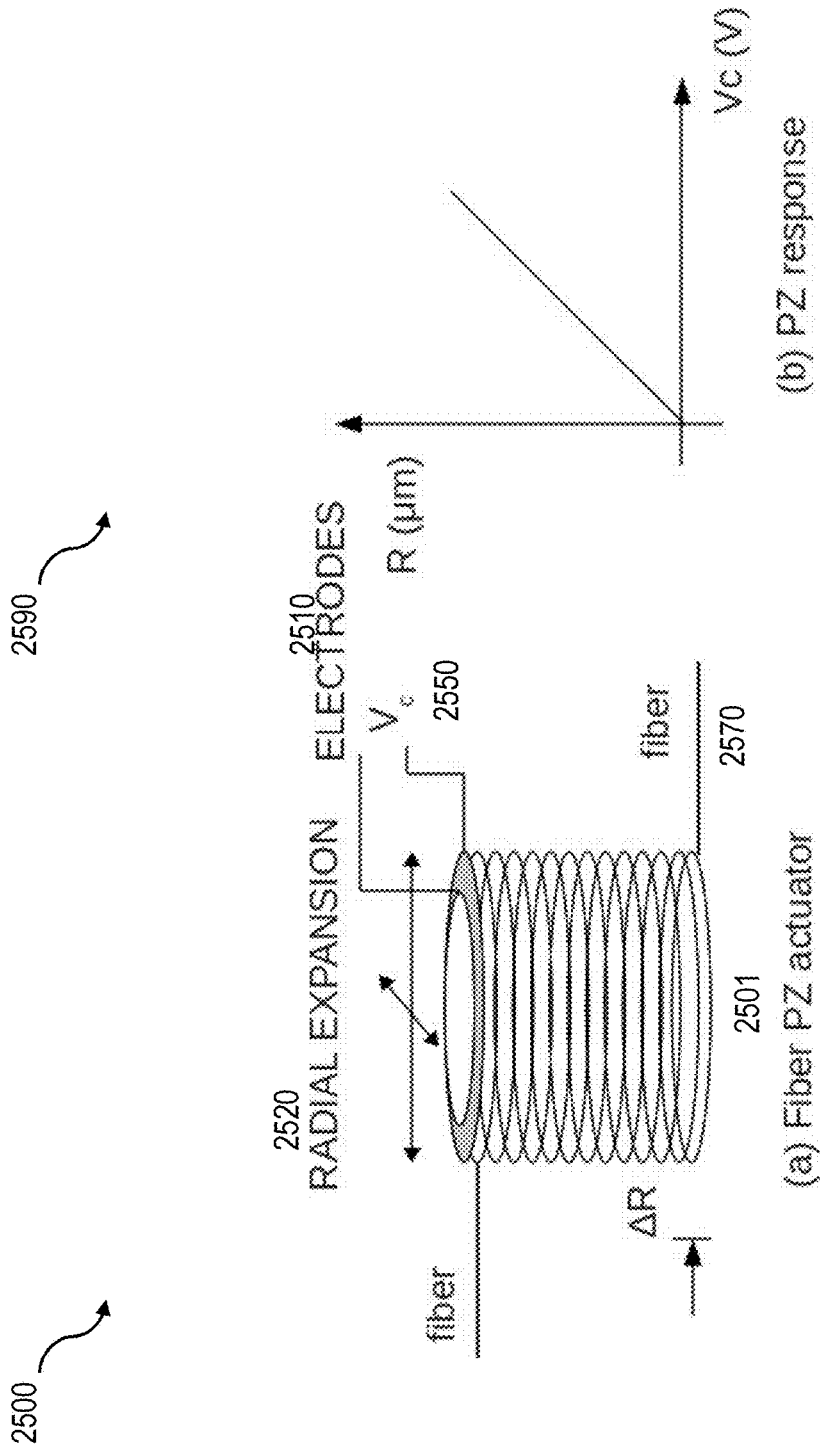
Figure 26:
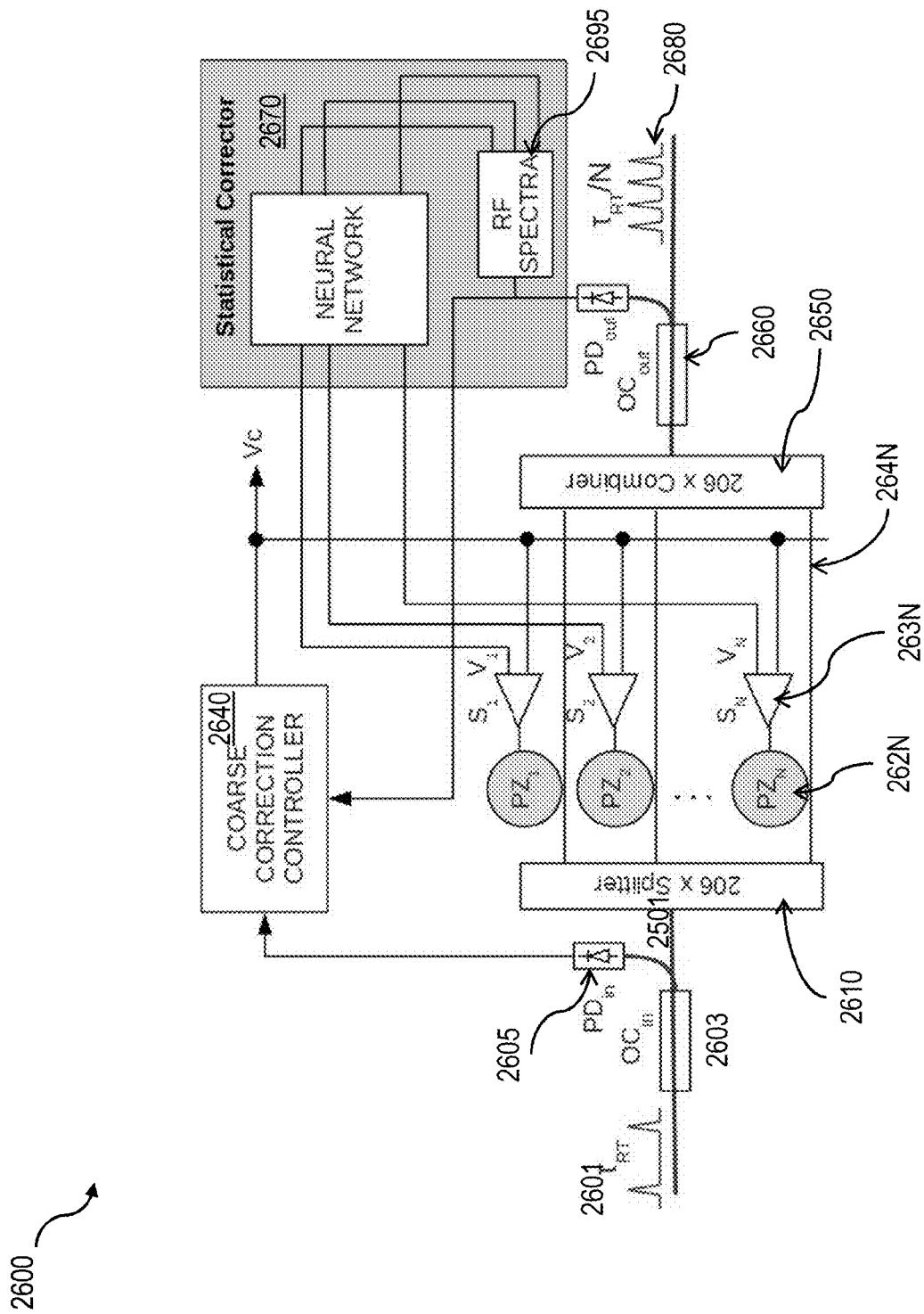
Figure 27:
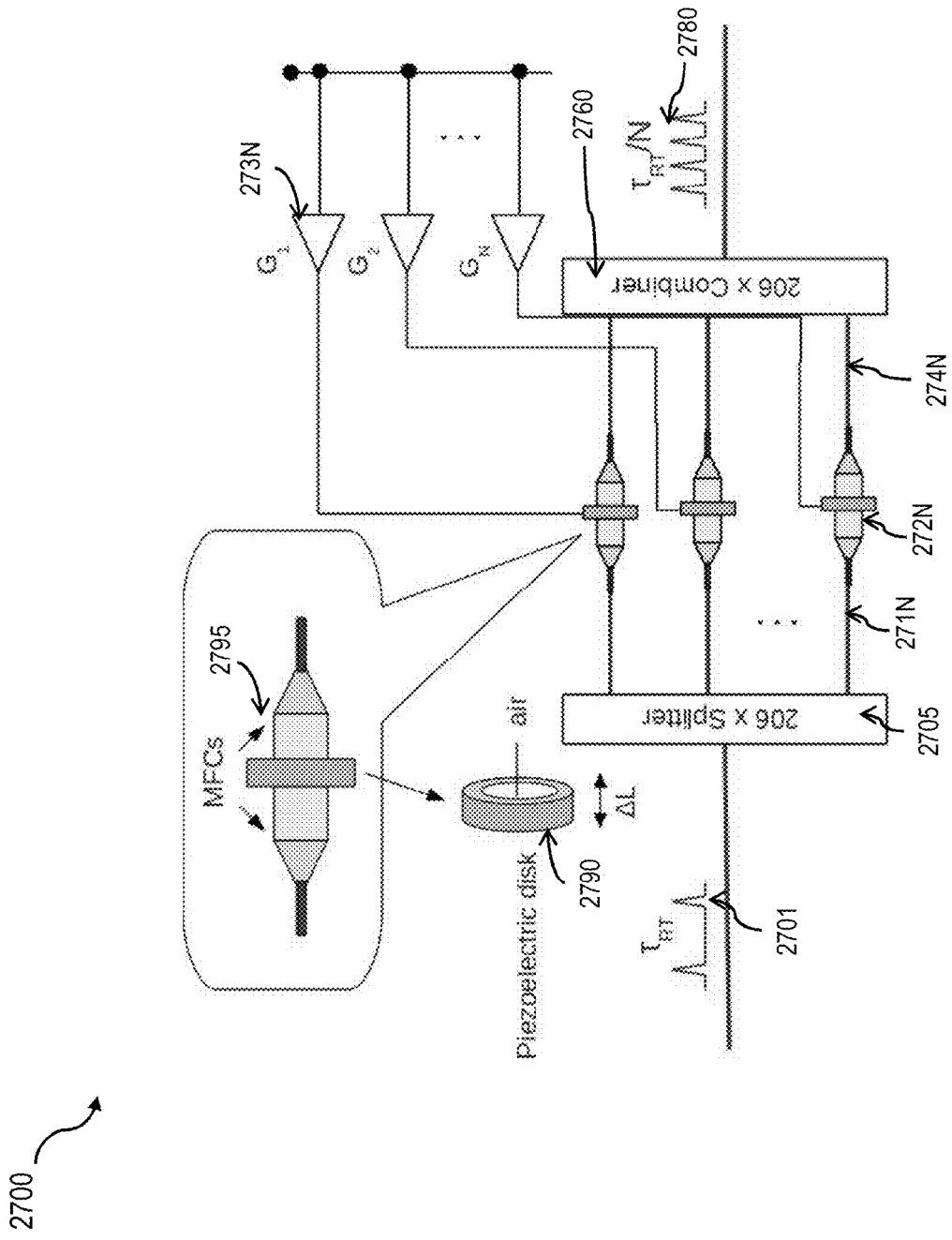
Figure 28:
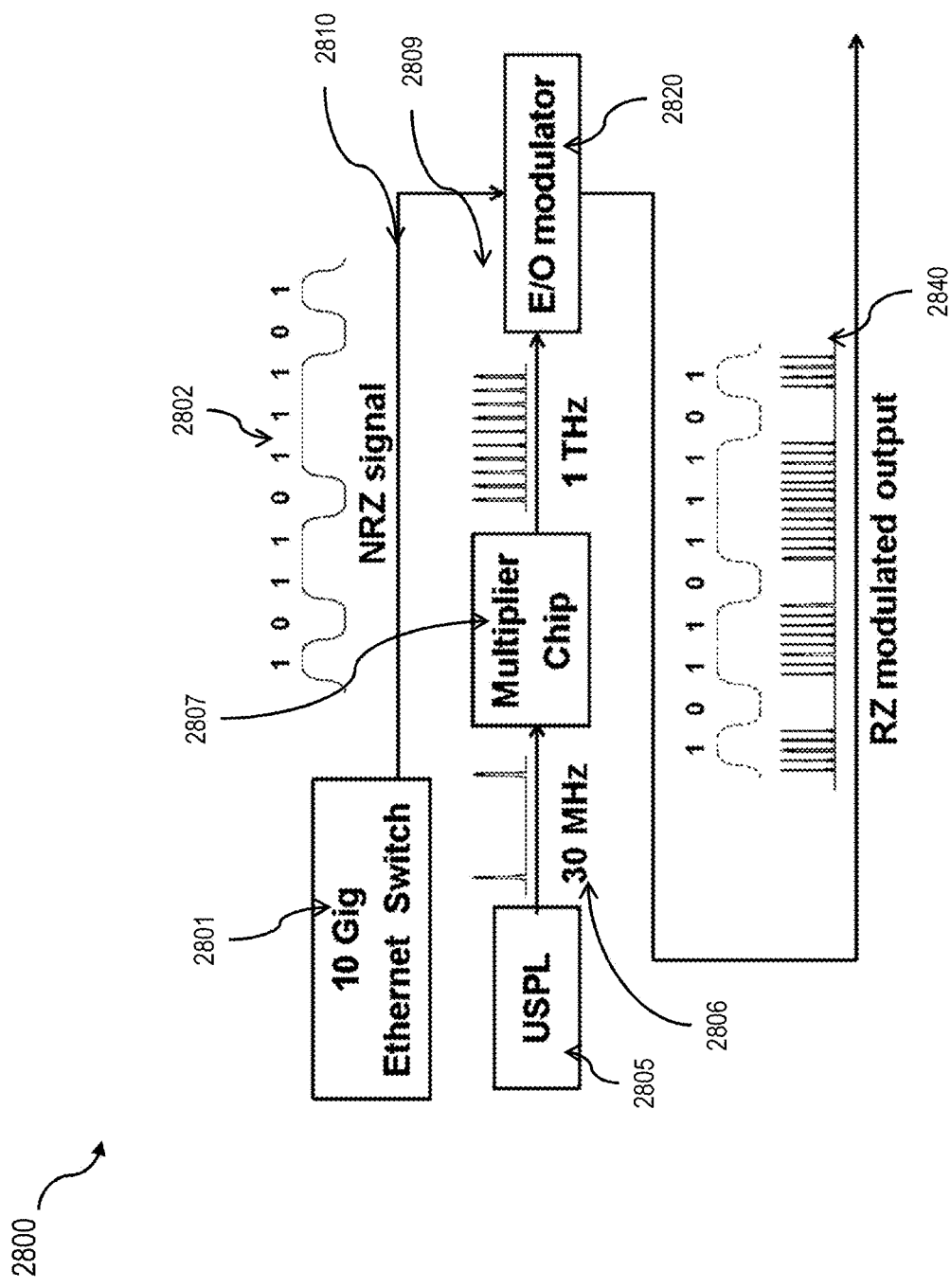
Figure 29:
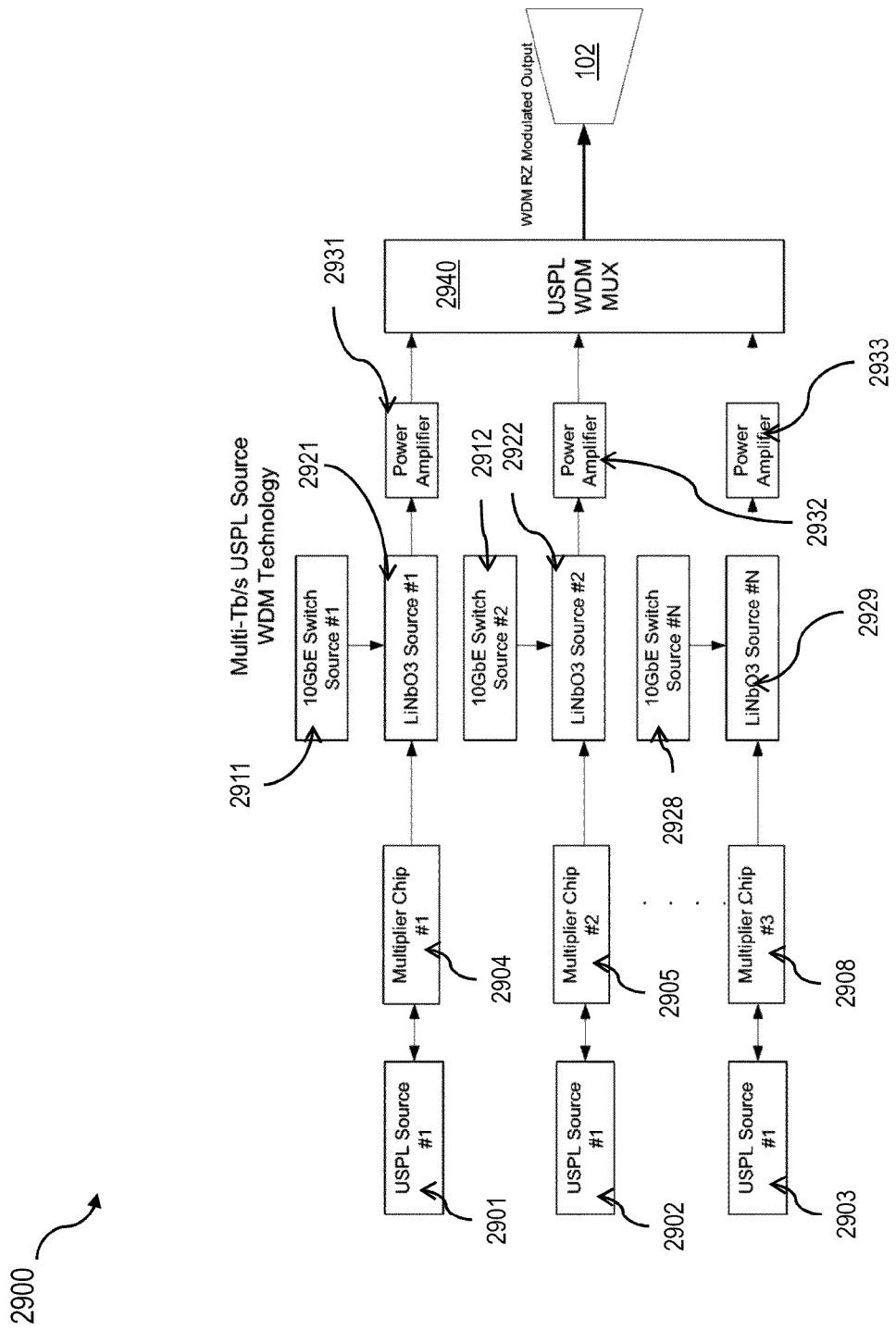
Figure 30:
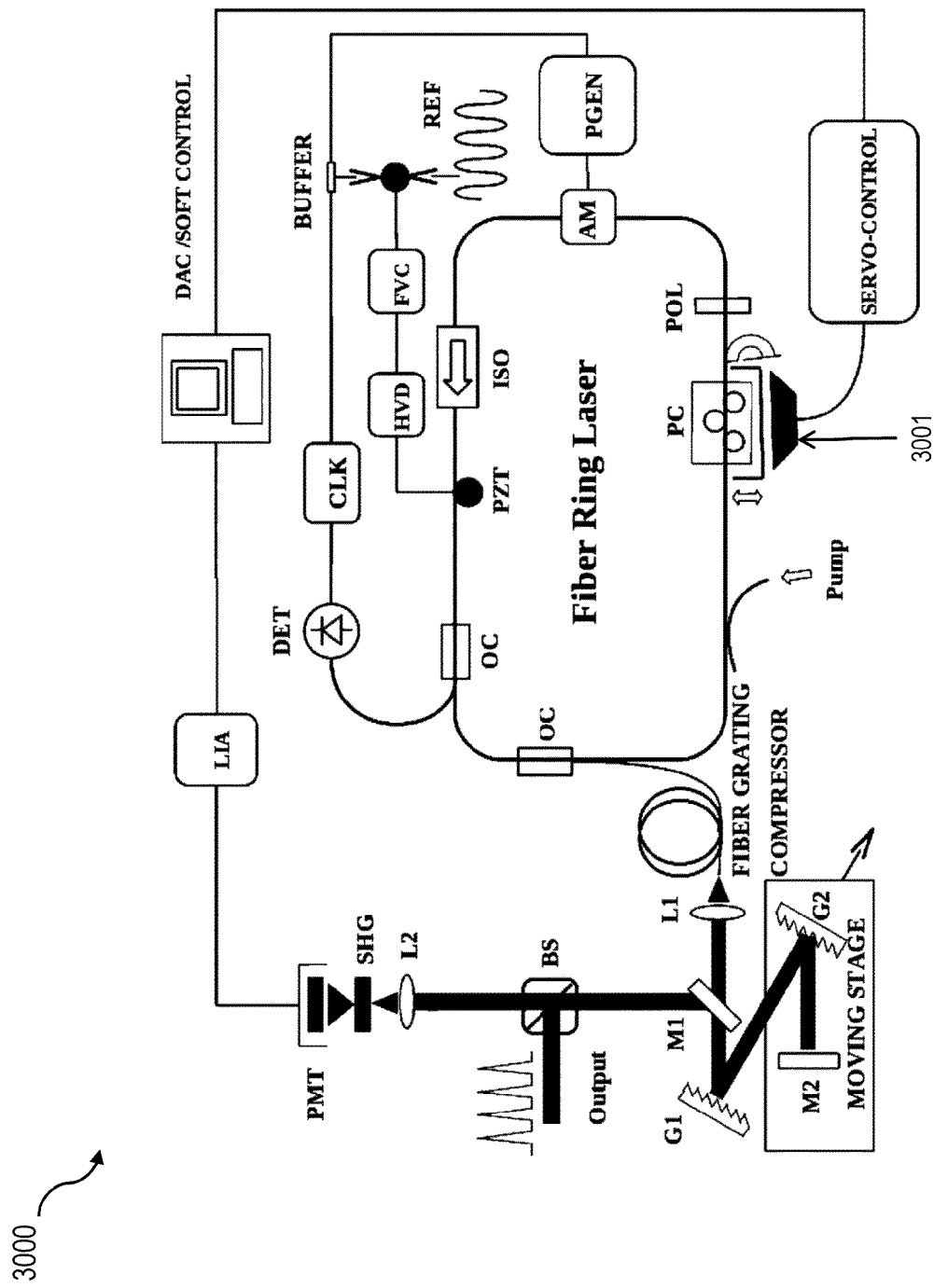
Figure 31:
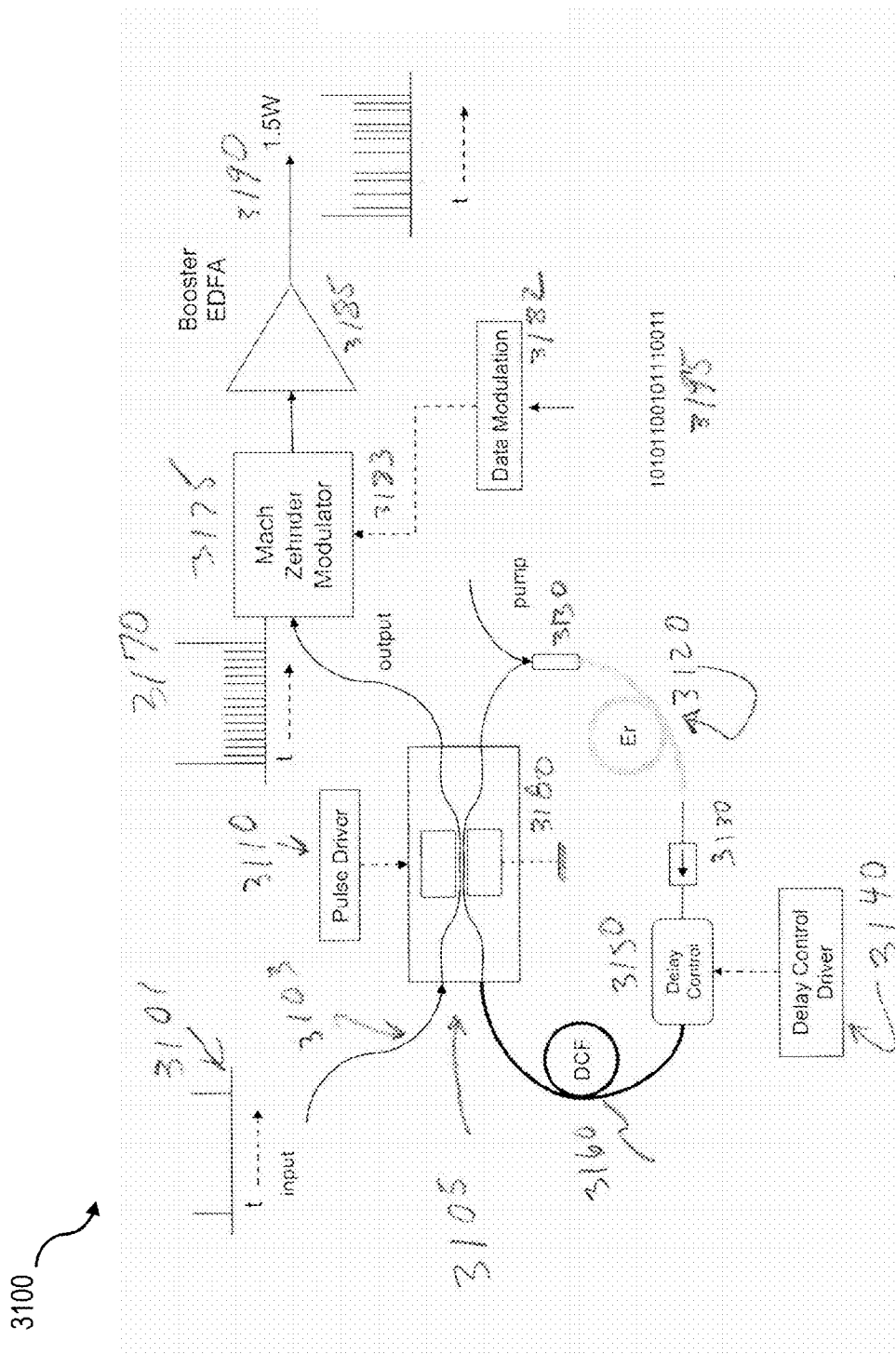
Figure 32:
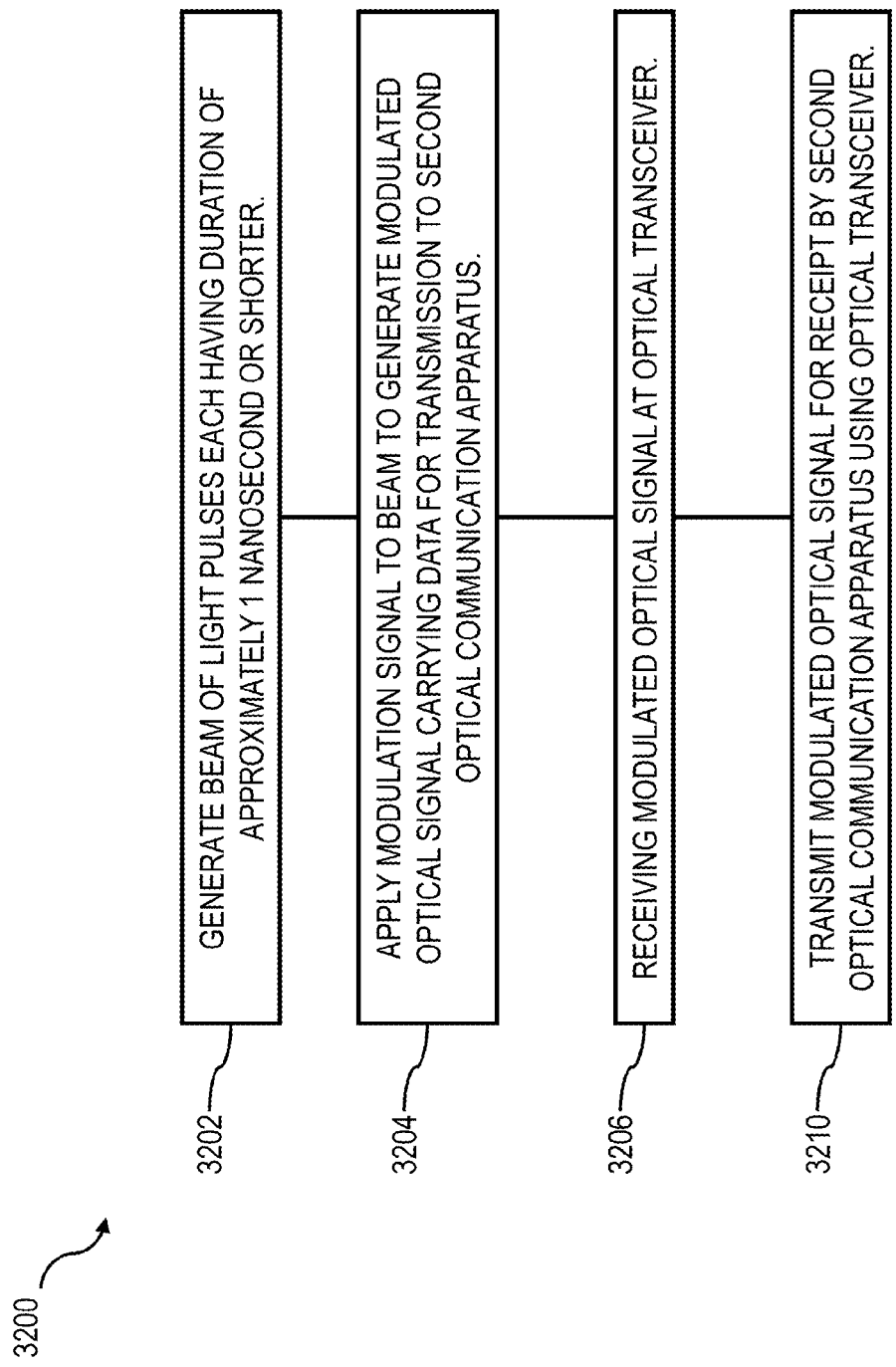
Figure 33:
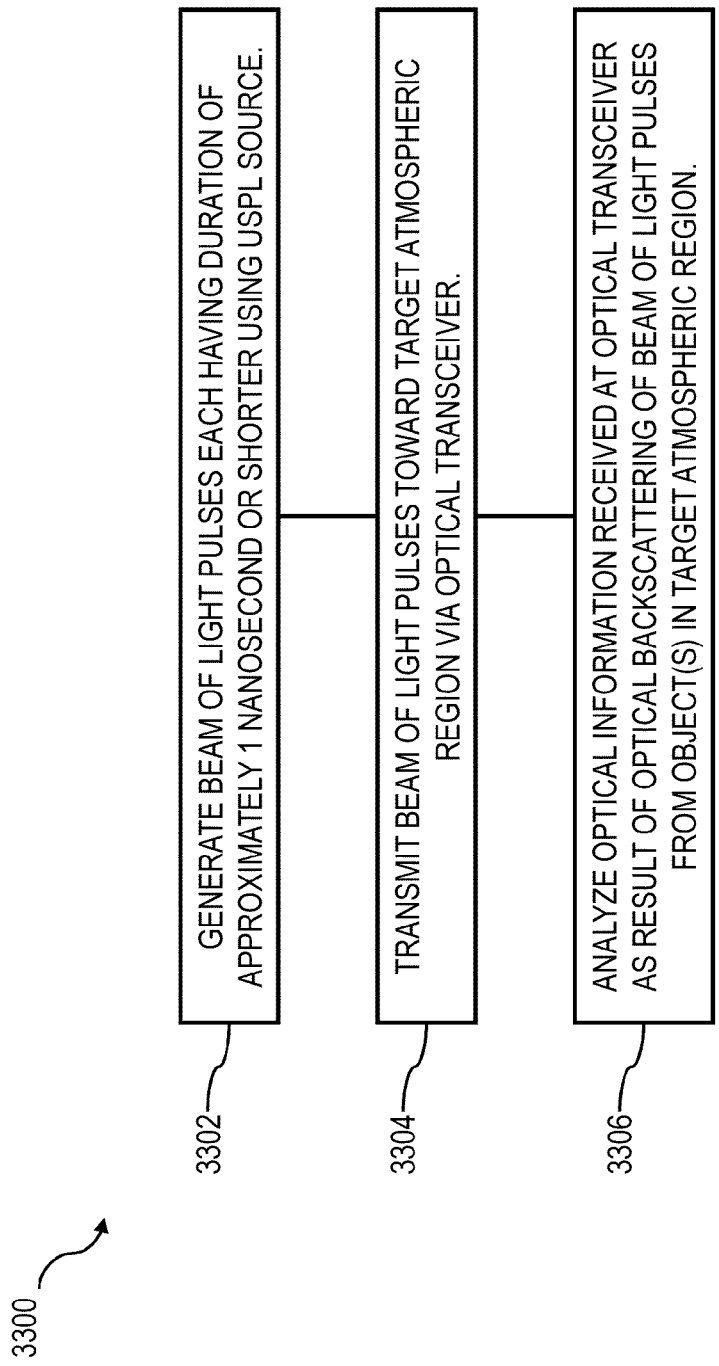
Figure 34:
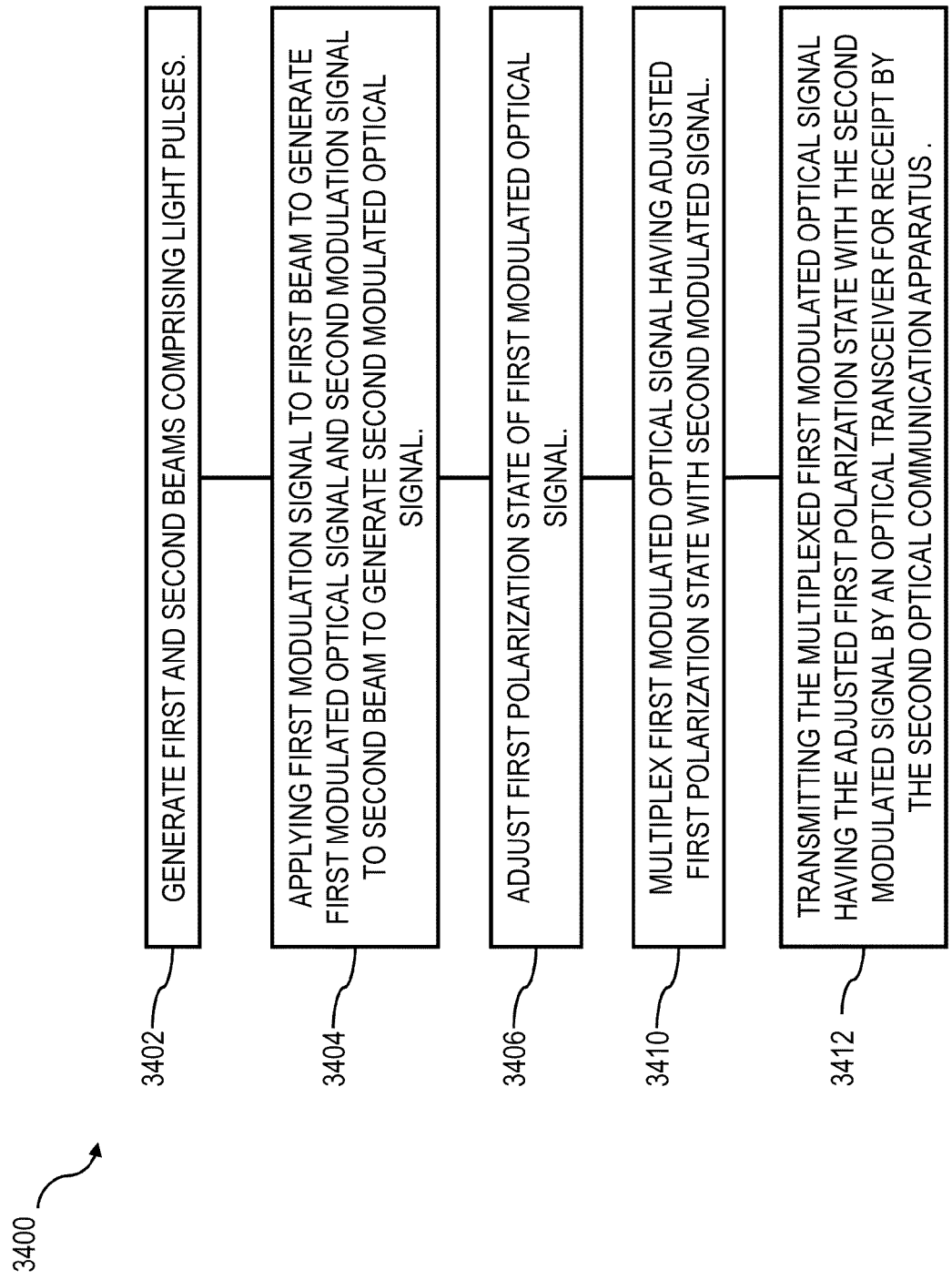

FIG. 14 depicts an example of a USPL-FSO transceiver utilized and operated across the 1.3 to 1.6 micron wavelength range as a range-finder and spotting apparatus for the purposes of target identification;

FIG. 15 depicts an example of a USPL pulse multiplier device consistent with implementations of the current subject matter;

FIG. 16 depicts another example of a device for generation of high pulse rate USPL optical streams consistent with implementations of the current subject matter;

FIG. 17 depicts another example of an optical device to a generate a USPL RZ data stream from a conventional transmission networking element;

FIG. 18 depicts an example of a implementing a USPL pulse multiplier device for generation of 10×TDM type signals system to give a 100 Gbps output;

FIG. 19 depicts an example of a implementing another type of USPL pulse multiplier device for extending the pulse repetition rate for use in high capacity networks;

FIG. 20 depicts an example of a implementing another type of USPL pulse multiplier device for extending the pulse repetition rate for use in high capacity networks;

FIG. 21 depicts examples of active mode-locked linear fiber lasers with feedback regenerative systems: fiber reflector (FR), wavelength-division multiplexer (WDM), Erbium-doped fiber (EDF), optical coupler (OC), photo-detector (PD), phase-locked loop (PLL), and Mach-Zender Modulator (MZM);

FIG. 22 and FIG. 23 depict examples of passive mode-locked linear fiber lasers using a carbon nano-tubes saturable absorber: fiber reflector (FR), wavelength-division multiplexer (WDM), Erbium-doped fiber (EDF), optical coupler (OC), and saturable absorber (SA);

FIG. 24 depicts an example of a time-delay stabilization mechanism: optical coupler (OCin, OCout), photo-detector (PDin, PDout), high-pass filter (HPF), low-pass filter (LPF), phase-locked loop (PLL), phase-comparator (PC), frequency-divider (1/N), clock-data recovery system (CDR), piezoelectric actuator (PZ1 ... PZN), summing op amp, for use in stabilizing the optical pulse to pulse relationship produced from the USPL source;

FIG. 25A and FIG. 25B respectively include a schematic diagram and a graph relating to an example of a controlling mechanism to stabilize the output frequency of TDM sources utilizing an idealized PZ actuator;

FIG. 26 depicts an example of a Time-Domain Multiplexing (TDM) where the TDM multiplexes a pulse train using parallel time delay channels, having the delay channels to be "consistent" relative to each another (Because the frequency of an output multiplexed pulse train is ideally as insensitive as possible to environmental changes, a feedback loop control system can correct the delay units for any fluctuations which compromise the stability of the output rep rate, and feedback can be provides through interconnection to a Neural Network);

FIG. 27 depicts an example of use of fiber based collimators along with Piezoelectric transducers for controlling individual MFC circuits;

FIG. 28 depicts an example of timing of the TDM chip from the USPL modulation source to provide a Terabit/second (or faster) with a Multiplier Photonic chip;

FIG. 29 depicts an example of timing of the TDM chip from the USPL modulation source to provide a Terabit/second (or faster) with a Multiplier Photonic chip operating in a WDM configuration;

FIG. 30 depicts an example of construction of a computer assisted system, which can control the pulse width of an all-fiber mode-locked laser using recursive linear polarization adjustments with simultaneous stabilization of the cavity's repetition rate using a synchronous self-regenerative mechanism and can also offer tunability of the repetition rate, and pulse width;

FIG. 31 depicts an example of a modified pulse interleaving scheme, by a pulse multiplication technique, in which the lower repetition rate pulse train of a well-characterized, well-mode locked laser can be coupled into an integrated-optical directional coupler, where a well-determined fraction of the pulse is tapped off and "re-circulated" in an optical loop with an optical delay equal to the desired inter-pulse spacing in the output pulse train, and re-coupled to the output of the directional coupler;

FIG. 32 is a process flow chart illustrating features of a method consistent with implementations of the current subject matter;

FIG. 33 is another process flow chart illustrating features of a method consistent with implementations of the current subject matter; and FIG. 34 is another process flow chart illustrating features of a method consistent with implementations of the current subject matter.

DETAILED DESCRIPTION

One or more implementations of the current subject matter can provide improved optical propagation efficiencies for free-space optical wireless optical communication systems that operate within the C-band wavelength spectrum. These efficiencies can be realized in reduced optical attenuation coefficient reduction along with significantly improved scintillation performance characteristics when compared to current FSO communication systems operating within the 1550 nm C-band.

Typically, use of FSO along with high-power optical amplification techniques can generally realize only marginal increases in optical budget and system availability, especially during fog related events, during which optical attenuation within the transmitted band can rise to 100 dB/km and higher. A common limitation to system performance for currently available 1550 nm FSO systems, and also to systems operating at shorter optical operating wavelengths, is wavelength susceptibility to attenuation due to fog related effects. Such attenuation can be caused by both geometric and Mie scattering mechanisms. System availability for FSO transmission networks can be severely reduced or impaired due to a large optical loss coefficient due to fog related events, in which optical losses due to atmospheric absorption can exceed 100 dB/km for dense fog conditions. In such cases, system availability considerations can be compromised even for links of only several kilometers in length. Currently available commercial FSO transport systems can be limited for high availability, high capacity long range operation. Additionally, current state-of-the-art free-space optical communications systems generally require large amounts of optical launch power to overcome gradual reductions in line-of-sight visibility through aerosol and fog related atmospheric events. Such systems can in some cases become totally inoperable and therefore unavailable as communication links during mild or heavy fog events, thereby resulting in link outages.

Recent advances in alternate FSO laser transmission sources within the 1550 nm transmission window have been reported in which USPL technology has been successfully demonstrated as a potential replacement technology for currently used 1550 nm optical FSO technology. USPL laser source pulse propagation tends to be less susceptible to interaction with fog particulates. Accordingly, optical attenuation effects can generally be more readily mitigated, which can result in reduced optical attenuation and improved link availability and overall system performance.

Current state-of-the-art free-space optical communications systems generally utilize optical tracking to maintain optical co-alignment between optical transceiver platforms. Such optical tracking can be thereby limited to the same extent as that of the data carrying channels for in-band transmission channels. As atmospheric conditions deteriorate, tracking and steering beacons can become ineffective in maintaining co-alignment between transceivers. In instance in which increasing optical transport densities are ineffective to overcome reductions in line-of-sight visibility through aerosol and fog related atmospheric events, such approaches can become totally inoperable during mild or heavy fog events, thereby leading to link outages. Also, during high scintillation conditions, signal wander and speckle effects can severely limit both signal propagation and beacon tracking signals between terminals along the optical data link.

Conventional free-space optical beam propagation is typically affected by atmospheric absorption from particulates and aerosols interacting with the optical beam over the link span. These phenomena can have a cumulative effect upon the overall received power level of the signal and can also cause fluctuations in the detected optical power level due to temporal instabilities of the attenuation mechanisms within the beam path. The transmitted optical power at a specific distance is given by Beer's Law, which can be expressed as $$T[R]=P[R]/P[0]=e^{-\sigma *R} \quad (1)$$

where $T[R]$ is the transmittance at range R, $P[R]$ is the link power at range R, $P[0]$ is the initial launched data link optical power, and $\sigma$ is the attenuation coefficient per unit length. The attenuation coefficient per unit length, $\sigma$, can be the overall atmospheric attenuation coefficient, which can be composed of four variables, for example as follows:

$$\sigma = \alpha_m + \alpha_a + \alpha_m + \alpha_a \quad (2)$$

where $\alpha_m$, $\alpha_a$, $\alpha_m$, and $\alpha_a$ are the molecular absorption, aerosol absorption, and Rayleigh and Mie scattering coefficients, respectively.

When the size of atmospheric particles approaches the wavelength of the propagating beam, Mie scattering typically dominates the total attenuation coefficient. The Mie scattering coefficient can be expressed as a function of atmospheric visibility and wavelength, and can be given by the following expression:

$$\sigma_a = \sim = \sigma = [3.91/V](V/550)^{-q} \quad (3)$$

where V is the visibility (km), $\lambda$ is the wavelength (nm), and q=size distribution of scattering particulates and takes on values for various visibility conditions. The value q in the above equation takes on the following values under various visibility condition: q=1.6 for high visibility conditions (e.g. V>approximately 50 km); q=1.3 for average visibility (e.g. approximately 6<V<approximately 50 km); q=0.585V$^{1/3}$ for low visibility (e.g. V<approximately 6 km); q=0.16 V+0.34 for haze visibility (e.g. approximately 1 km<V<approximately 6 km); q=V−0.5 for mist visibility (e.g. approximately 0.5 km<V<approximately 1 km); and q=0 for fog visibility (e.g. V<approximately 0.5 km).

Because of the shorter transmission wavelengths of 1550 nm free-space links, these signals can be more susceptible to atmospheric effects when compared to RF and microwave communications. Atmospheric effects can deteriorate free-space laser link transmission by either or both of overall reduction in detected optical power level due to atmospheric attenuation and random optical power fluctuations in the received signal resulting from beam deformation, scintillation effects, and beam wander.

As a conventional free-space optical laser beam propagates through the atmosphere, it generally experiences deterioration and deformation of its wave-front. These degradation modes are caused from small scale, randomly localized changes in the atmospheric index of refraction, which result in beam wander and distortion of the wave-front and scintillation effects. Temperature gradients between ground and atmospheric conditions lead to atmospheric turbulence, which in turn lead to small scale, localized random pockets of varying indices of refraction. When scintillation cell size is smaller than the diameter of the laser beam diameter, the optical beam will experience distortion, and a non-uniform optical intensity across the wave-front will be observed. This effect is called scintillation. If the size of the interference cell is larger than the laser beam diameter then the bean will randomly wander off course of the site path. The mixing of scintillation and beam wander can lead to fluctuations in overall signal stability. Therefore, the beam can experience a propagation path that is non-homogeneous both spatially and temporally, which can cause the beam to propagate in a random manner. These effects generally add together to produce an overall noise component to the received optical signal.

Scintillation effects can be strongly dependent upon the concurrent visibility at the link sites, and also vary with link range. Experimental studies indicate that USPL beam propagation can experience less susceptibility to the effects of scintillation and beam wander phenomena. Accordingly, USPL-FSO laser communication sources can be a useful replacement technology within a FSO transport platform for not only data transport but also for use as optical beacon applications for use in pointing-and-tracking applications, at least because of the relative resistance of such beams to wander and to be affected by atmospheric scintillation. Such benefits can be realized through enhanced visibility performance as compared to conventional FSO propagation techniques as well as improved scintillation and beam wander performance.

Attenuation through heavy fog conditions can limit signal propagation using conventional free-space optical schemes, regardless of optical launch power densities. USPL laser pulses can occupy a much smaller spatial dimension. For example, a 100 femtosecond (fs) pulse generally occupies 30 microns in a dimension along the axis of propagation of the light. Thus, interaction of the pulse with the droplets of water that constitute fog and clouds, which typically have diameters in the range of tens of microns, can be reduced by one or more orders of magnitude, and in some examples by a factor of 1000 or more while carrying the same amount of energy, compared to longer-pulse radiation from conventional laser sources. The result of this effect can be that laser pulses on the order of 100 fs do not excite power scavenging whispering-gallery physics in the water droplets to the same extent as longer pulses. Such phenomena can generally scale exponentially for continuous wave (CW) lasers, especially during heavy fog. Benefits of USPL laser sources consistent with implementations of the current subject matter can result in up to 8 times the visibility of traditional sources.

FSO transport systems can typically utilize a transmitting telescope coupled to a data source, such as for example an optical switch fabric supplying data, for transport of the supplied data to a remote site along a direct line-of-site. At the remote site, a similar optical telescope can receive the incoming signal. Each telescope can operate in a bi-directional manner (e.g. for both sending an receiving of data). In other examples, a transmitting telescope can be aimed at a second identical/reciprocal receiving telescope. The optical signal to be transmitted can emanate from a 1550 nm DFB type semiconductor laser and then may be amplified with an optical amplifier typically through the use of an erbium-doped fiber amplifier, (EDFA). For a more detailed discussion of conventional wireless optical systems see, for example, P. F. Szajowski, "Key Elements of High-Speed WDM Terrestrial Free-Space Optical Communications Systems," SPIE Paper No. 3932-01, Photonics West (January 2000), which incorporated by reference herein.

As discussed above, current state-of-the-art free-space optical communication systems are generally limited in reach and availability due to optical power budgets as well as local atmospheric conditions, most notably fog related events. To address these and/or potentially other issues with currently available optical communication solutions, one or more implementations of the current subject matter provide methods, systems, articles or manufacture, and the like that can, among other possible advantages, provide free-space optical communication links while mitigating fog related and other similar effects that events that can limit power detection limits. In some implementations, USPL 1550 nm laser sources can be used within the framework of FSO transport hardware. An improved replacement optical transport technology can provide enhanced optical budgets as well as link availability Consistent with some implementation of the current subject matter, the overall optical collection efficiency at a receiving site can be enhanced, thereby making the optical data-link more resistant to atmospheric effects, such as for example scintillation effects and fog attenuation effects. Furthermore, the USPL sources consistent with implementations of the current subject matter are generally compatible with current telecommunications infrastructure components.

It can be an advantage of certain implementations of the current subject matter that previously encountered problems, for example insufficient power and insufficient bandwidth due to fog and aerosol optical impairments with distance and atmospheric conditions, can be more readily overcome. In overcoming these and other problems, implementations of the current subject matter can (among other possible benefits) provide techniques for multiplexing and de-multiplexing a FSO bi-directional laser communication data link for single channel and wavelength division multiplexing (WDM) applications using USPL-FSO laser sources. Also included in the scope of the current subject matter is the use of USPL-FSO laser sources as an out-of-band, or alternatively, an in-band tracking beacon.

USPL laser sources can be used, consistent with implementations of the current subject matter, to address potential issues relating to system availability while propagating in the presence of fog or harmful aerosol environments. Using an USPL source, for example a 1550 nm USPL laser source, in an FSO system can allow the USPL to be modulated in a similar manner as conventional 1550 nm used throughout the telecommunication industry, for use in terrestrial, space, and undersea applications. USPL laser sources used in conjunction with a FSO platform can provide an optical wireless system with similar benefits in WDM configurations, thereby increasing the magnitude of effective optical bandwidth of the carrier data link. Having the advantage of long-range optical propagation can require an equally robust optical tracking channel to maintain optical co-alignment between optical terminals.

The output power of the transmitter can be increased by using single mode optical amplifier type devices between the lasers and the focal plane of the transmitting telescope, regardless of whether the wireless medium is a multiple mode (multimode) medium. Such single mode optical structures can advantageously include one or more single mode optical amplifiers to provide the necessary gain to the optical signal. Also, to provide the needed increase in bandwidth, implementations of the current subject matter can send information over multiple modulated USPL laser sources at 1550 nm wavelengths, rather than the single wavelength of currently available optical wireless techniques.

FSO transmit beams can be very narrow (3 milliradian and less), and any motion between the terminals can cause misalignment and loss of signal link. FSO installations on mobile platforms (ground vehicle, air ship, marine ship, or satellite) therefore generally require a tracking system to maintain alignment between the bi-directional FSO terminals. Tower installations and other non-stable stationary platforms can also require a tracking system. Tracking systems can use a wide field-of-view CCD (charge coupled-device) or similar camera or other optical device, which can capture a transit beam pattern from another communication terminal in the x-y plane (the z-direction points directly to the other FSO terminal), and thereby calculate a centroid position of the beam on the camera. If there is any relative motion between the FSO terminals, the centroid position of the beam will shift from the center of the camera plane. Either an external gimbal or internal steering mirrors can be adjusted accordingly to move the centroid back to the center of the CCD camera plane, thereby keeping the FSO terminals aligned.

Legacy continuous wave (CW) FSO transmit beam patterns can be subject to atmospheric scintillation, which can cause the transmit beam to "dance" and "dart" around at distance. This effect can cause tracking systems to move unnecessarily to compensate for the scintillation. In the worse case, scintillation can cause beam power fade, which can disruptions to the tracking system if it loses the beam all together. Experimental observations from USPL sources show a much more stable beam pattern with distance. Using a USPL as a transmit source in a FSO system can lead to improvement in tracking systems because of the much more stable beam pattern. Excessive tracking motion can therefore be reduced significantly, thereby extending the lifetime of the mechanical tracking system. Scintillation fades can also be reduced or even eliminated using an USPL in the FSO system, resulting in a more robust tracking system with reduced or eliminated signal loss and tracking disruption. The tracking signal can either be modulated out-of-band (on a different wavelength), or sent as a separate Ethernet signal and then incorporated in the total Ethernet pipe between FSO terminals. Additionally, an out-of-band optical signal can be modulated with a data stream and multiplexed to the overall capacity of the data link and can be used for the purposes of tracking.

Figure 1:
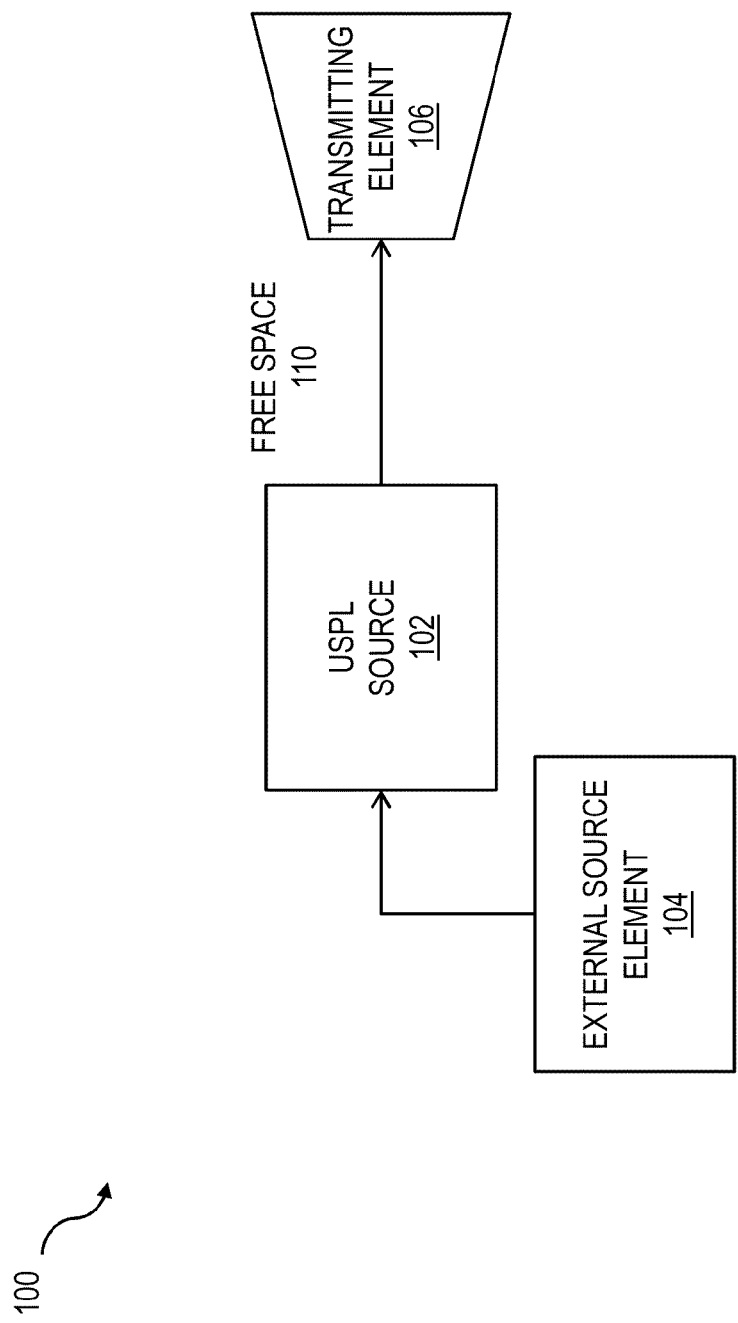

FIG. 1 illustrates an example of an optical communications platform 100 consistent with an implementation of the current subject matter for using an USPL device that is free-space coupled as an optical source for transport. As shown in FIG. 1, a USPL source 102 is directly modulated by an external source element 104. Optical power from the USPL source 102 can be coupled across free space 110 to a transmitting element 106, optionally by an optical telescope. The transmitting element 106 can optionally include optical components formed by hyperbolic mirror fabrication techniques, conventional Newtonian designs, or the like. A reciprocal receiving telescope at a receiver system can provide for optical reception. Consistent with implementations of the current subject matter, each optical transport platform can be designed to operate as a bi-directional unit. In other words, the transmitting element 106 of the optical communications platform 100 can also function as a receiving element. In general, unless otherwise explicitly stated, a transmitting element 106 as described can be considered to also be functional as a receiving element and vice versa. An optical element that performs both transmission and receiving functions can be referred to herein as an optical transceiver.

Figure 2:
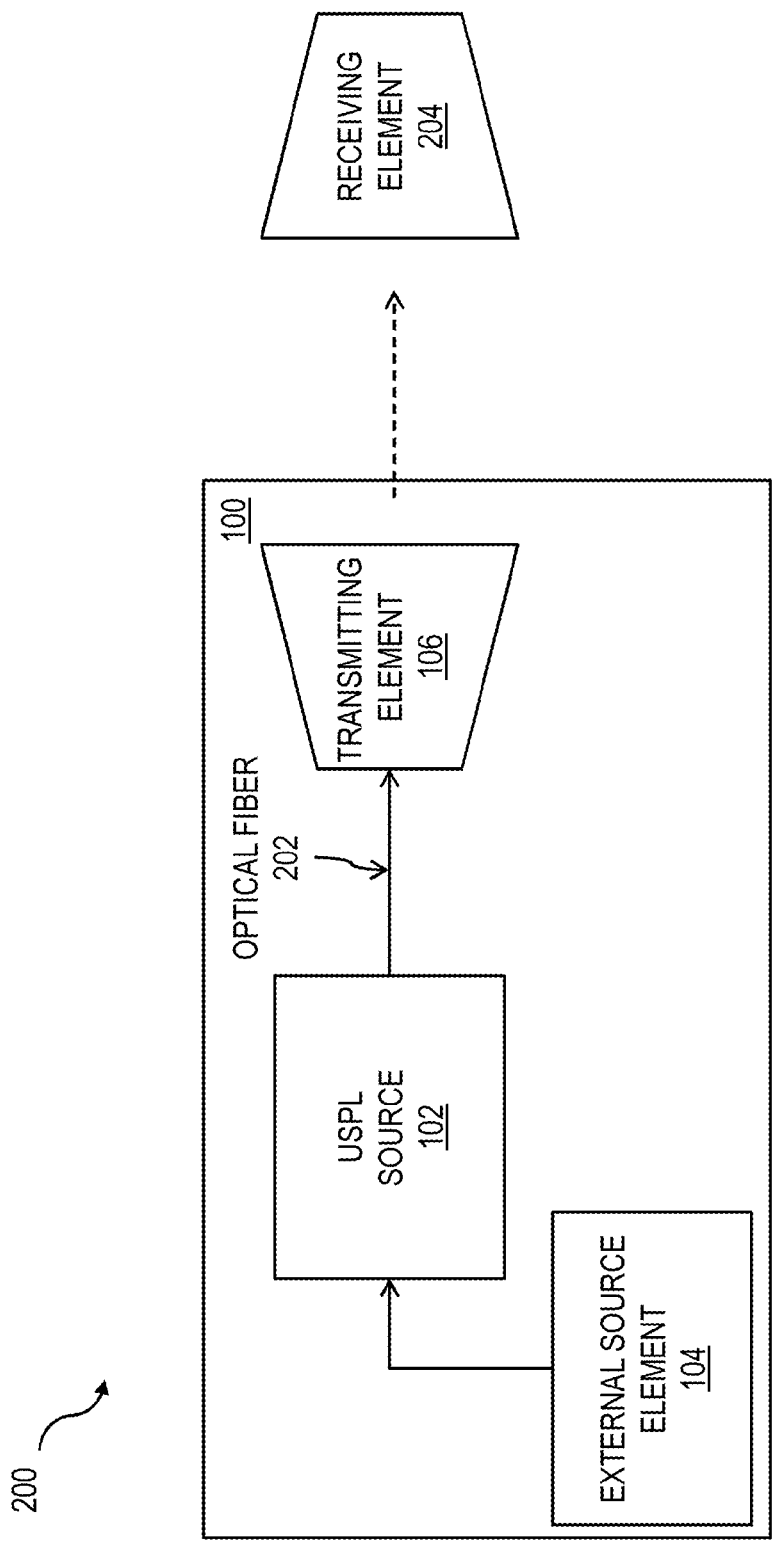
FIG. 2 depicts an example of an optical communications platform including fiber coupling of a USPL source as an optical source for transport to a remote optical receive terminal.

FIG. 2 illustrates an example of an optical communications system 200 consistent with an implementation of the current subject matter that includes the optical communications platform 100 of FIG. 1. Also shown in FIG. 2 is a second complementary receiving element 204, which can be a receiving telescope located at a remote distance from the transmitting element 106. As noted above, both the transmitting element 106 and the receiving element 204 can be bi-directional, and each can function as both a transmitting element 106 and a receiving element 204 depending on the instantaneous direction of data transmission in the optical communications system 200. This feature applies throughout this disclosure for transmitting and receiving elements unless otherwise explicitly stated. Either or both of the transmitting element 106 and the receiving element 204 can be optical telescopes or other devices for transmitting and receiving optical information.

Figure 3:
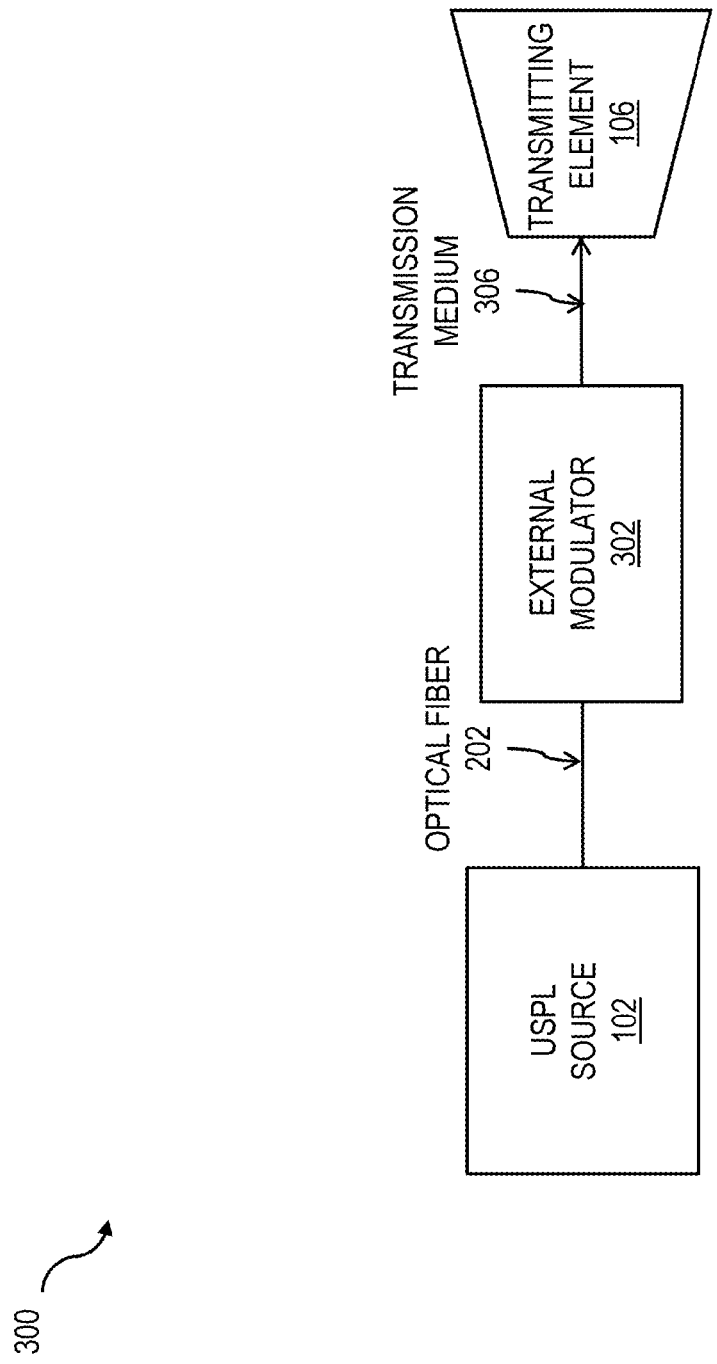
FIG. 3 depicts an example of an optical communications platform including fiber coupling of a USPL source to an external modulator for transport to a remote optical receive terminal.

FIG. 3 illustrates an example of an optical communications platform 300 consistent with an implementation of the current subject matter for using an USPL source 102 fiber coupled to an external modulator 302 through a fiber medium 304 and connected to a transmitting element 106 through an additional transmission medium 306, which can optionally be a fiber medium, a free space connection, etc. The USPL source 102 can be externally modulated by the external modulator 302 such that optical power from the USPL source 102 is fiber coupled to the transmitting element 106 or handled via an equivalent optical telescope.

Figure 4:
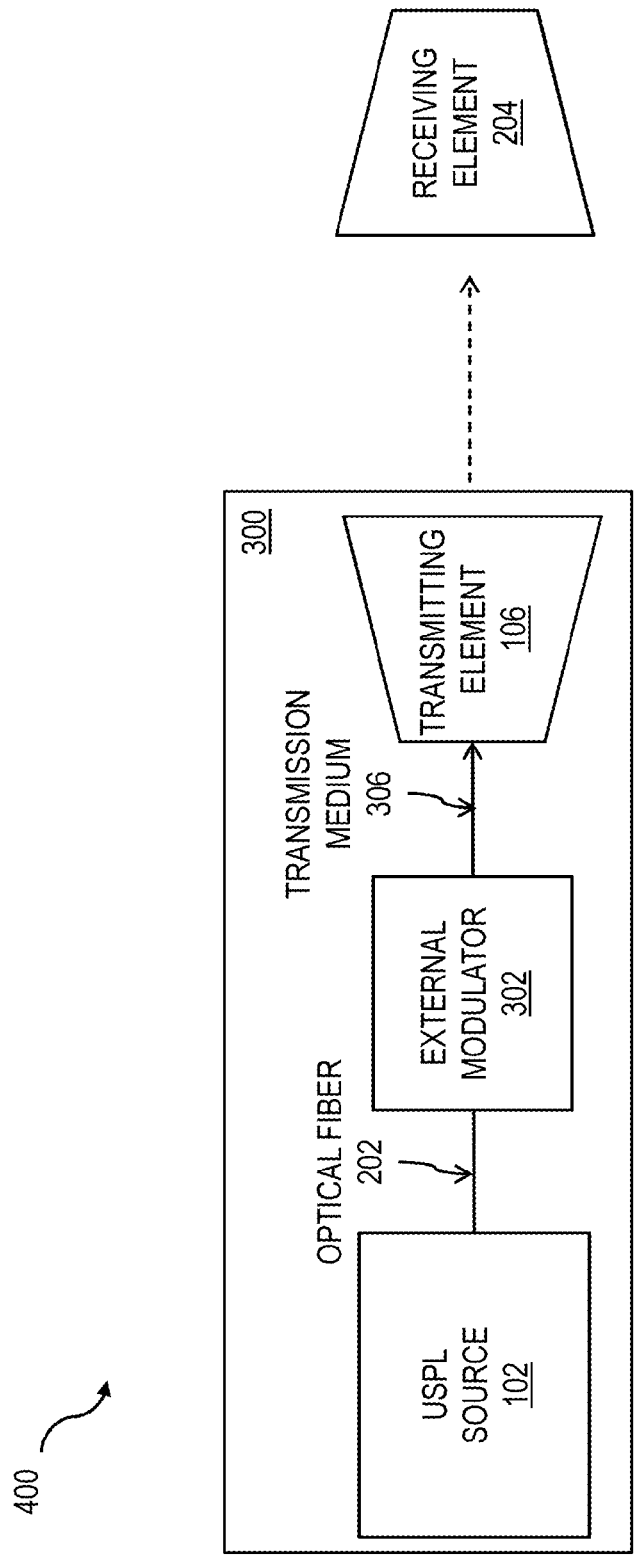
FIG. 4 depicts an example of an optical communications platform including fiber coupling of a USPL source to an external modulator through a fiber medium for transport to a remote optical receive terminal.

FIG. 4 illustrates an example of an optical communications system 400 consistent with an implementation of the current subject matter that includes the optical communications platform 300 of FIG. 3. Also shown in FIG. 4 is a second complementary receiving telescope 204, which, as noted above in relation to FIG. 2, can be a receiving telescope located at a remote distance from the transmitting element 106.

Figure 5:
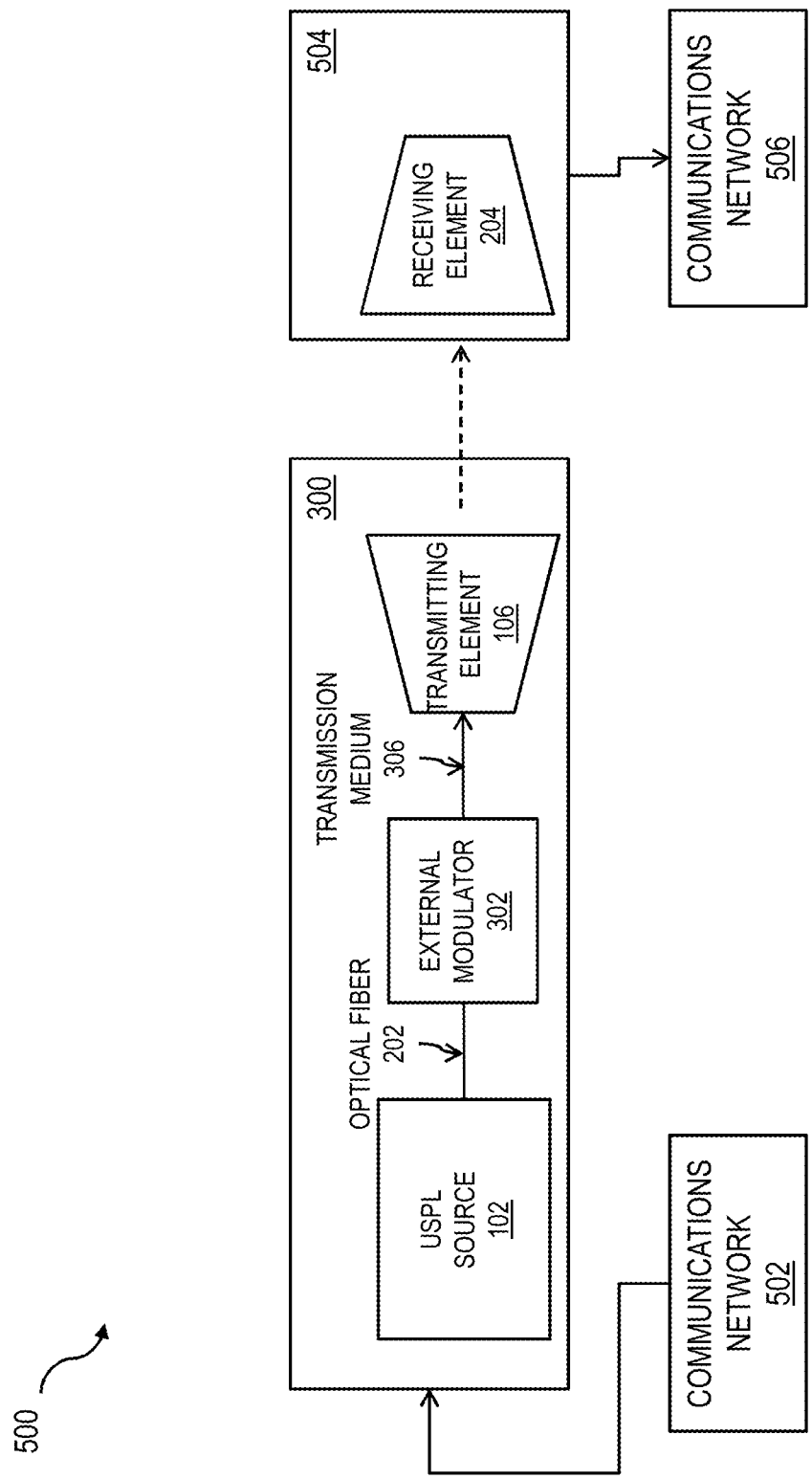
FIG. 5 depicts an example of a transmitting and or receiving elements, which can be of a type from either the Hyperbolic Mirror Fabrication Techniques or conventional Newtonian designs.

FIG. 5 illustrates an example of an optical communications architecture 500 consistent with an implementation of the current subject matter. The architecture 500 of FIG. 5 includes the elements of FIG. 4 and further includes a first communication network 502 connected to a first optical communications platform 300. The receiving element 204 is part of a second optical communications platform 504, which can optionally include components analogous to those of the first optical communications platform 300. A second communications network 506 can be connected to the second optical communications platform 504 such that the data transmitted optically between the transmitting element 106 and the receiving element 204 or are passed between the first and second communications networks 502, 506, which can each include one or more of optical and electrical networking features.

Figure 6:
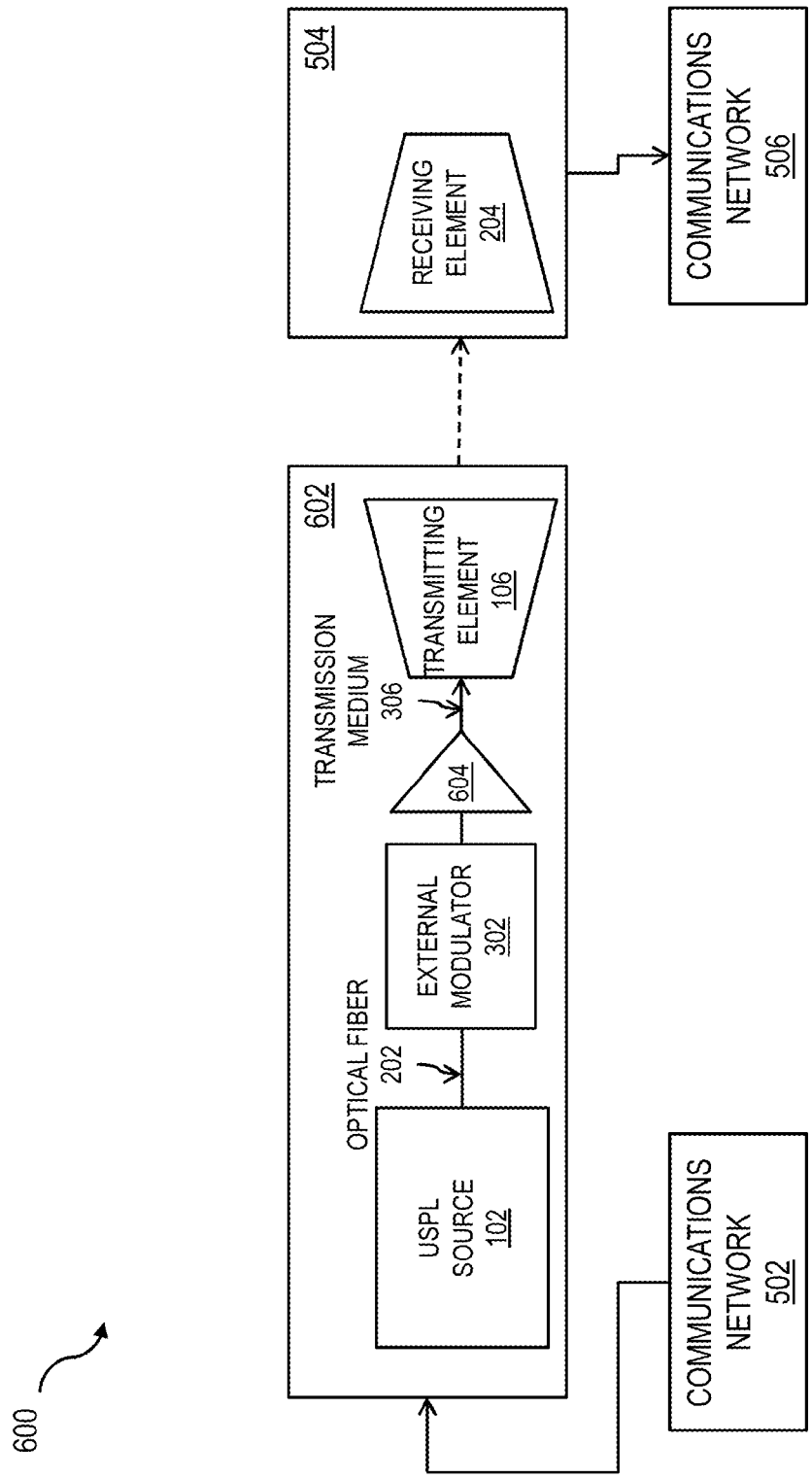
FIG. 6 depicts an example of an optical fiber amplifier element identified and used to increase enhancing optical transmit launch power for transport to a remote optical receive terminal.

FIG. 6 illustrates an example of an optical communications system 600 consistent with an implementation of the current subject matter. As part of an optical communications platform 602, an USPL source 102 is fiber coupled to an external modulator 302, for example through an optical fiber 202 or other transmission medium. The light from the USPL source 102 is propagated via a transmitting element 106 in a similar manner as discussed above. An optical amplifier element 604, which can optionally be an optical fiber amplifier element, can be used to increase optical transmit launch power, and can optionally be disposed between the external modulator 302 and the transmitting element 106 and connected to one or both via an additional transmission medium 306, which can optionally be a fiber medium, a free space connection, etc. Also shown in FIG. 6 is a second complementary receiving element 206 located at a remote distance from the optical communications platform 602. It will be readily understood that a second optical communications platform 504 that includes the receiving element 204 can also include an optical amplifier element 604. First and second communications networks 502, 506 can be connected respectively to the two optical communications platforms 602, 504

Figure 7:
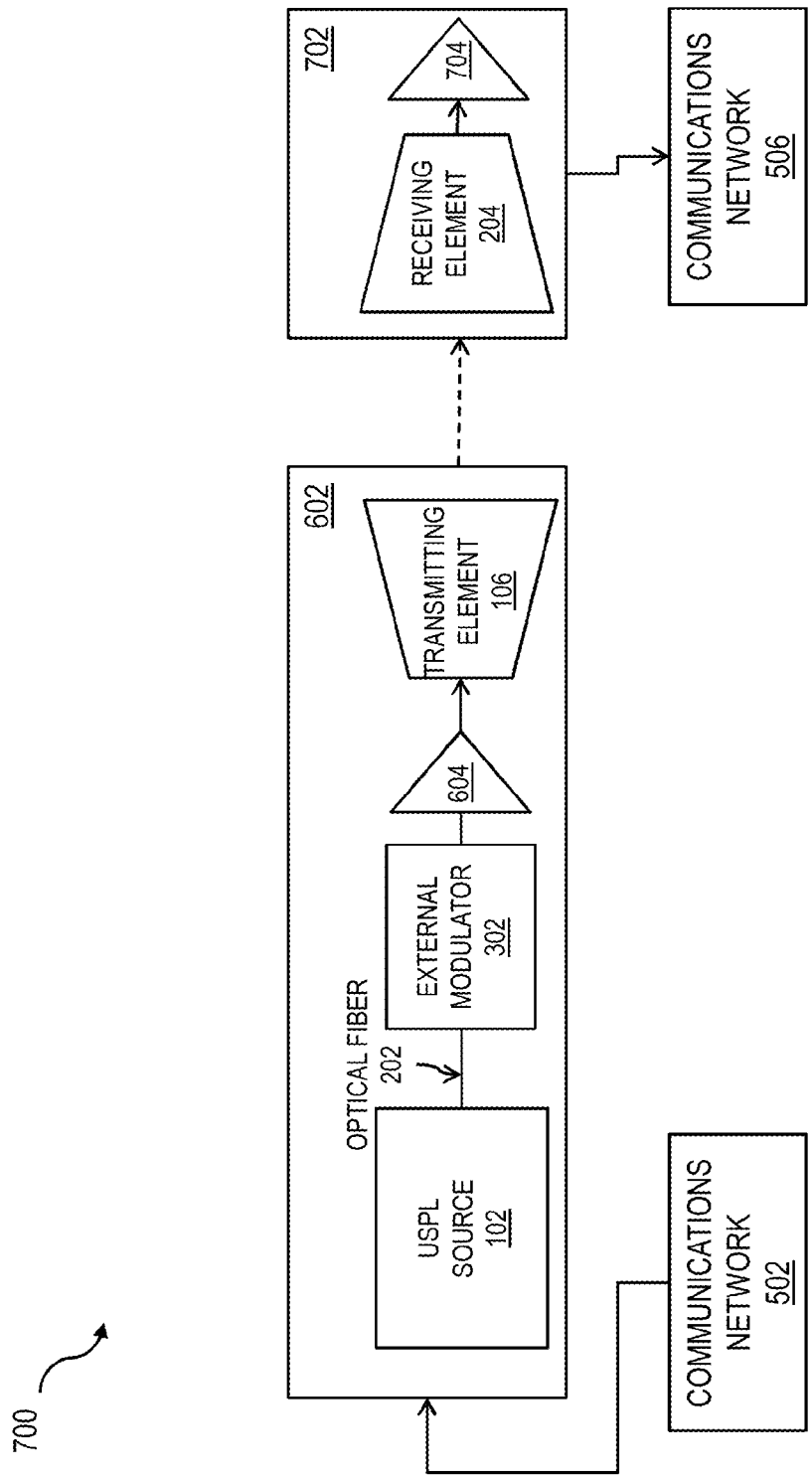
FIG. 7 depicts an example of a USPL laser device that is fiber coupled to an external modulator for transport, in a point-to-point configuration for transport to a remote optical receive terminal.

FIG. 7 illustrates an example of an optical communications system 700 consistent with an implementation of the current subject matter. The optical communications platform 602 shown in FIG. 6 can be in communication with a second optical communications platform 702, which can in this implementation include a receiving element 204 and an optical preamplifier 704. Other components similar to those shown in the optical communications platform 602 can also be included in the second optical communications platform 702, although they are not shown in FIG. 7. It will be understood that a bi-directional optical communications platform can include both of an optical preamplifier 704 for amplifying a received optical signal and an optical amplifier element 604 for boosting a transmitted optical signal. Consistent with the implementation depicted in FIG. 7 and other implementations of the current subject matter, optical amplification (e.g. for either or both of an optical amplifier element 604 or an optical preamplifier 704) be included for enhancing the optical budget for the data-link between the transmitting element 106 and the receiving element 204 (and vice versa), for example using one or more of an erbium-doped fiber amplifier (EDFA), a high power erbium-ytterbium doped fiber amplifier (Er/Yb-DFA), or equivalents, which can include but are not limited to semiconductor-optical-amplifiers (SOA).

Figure 8:
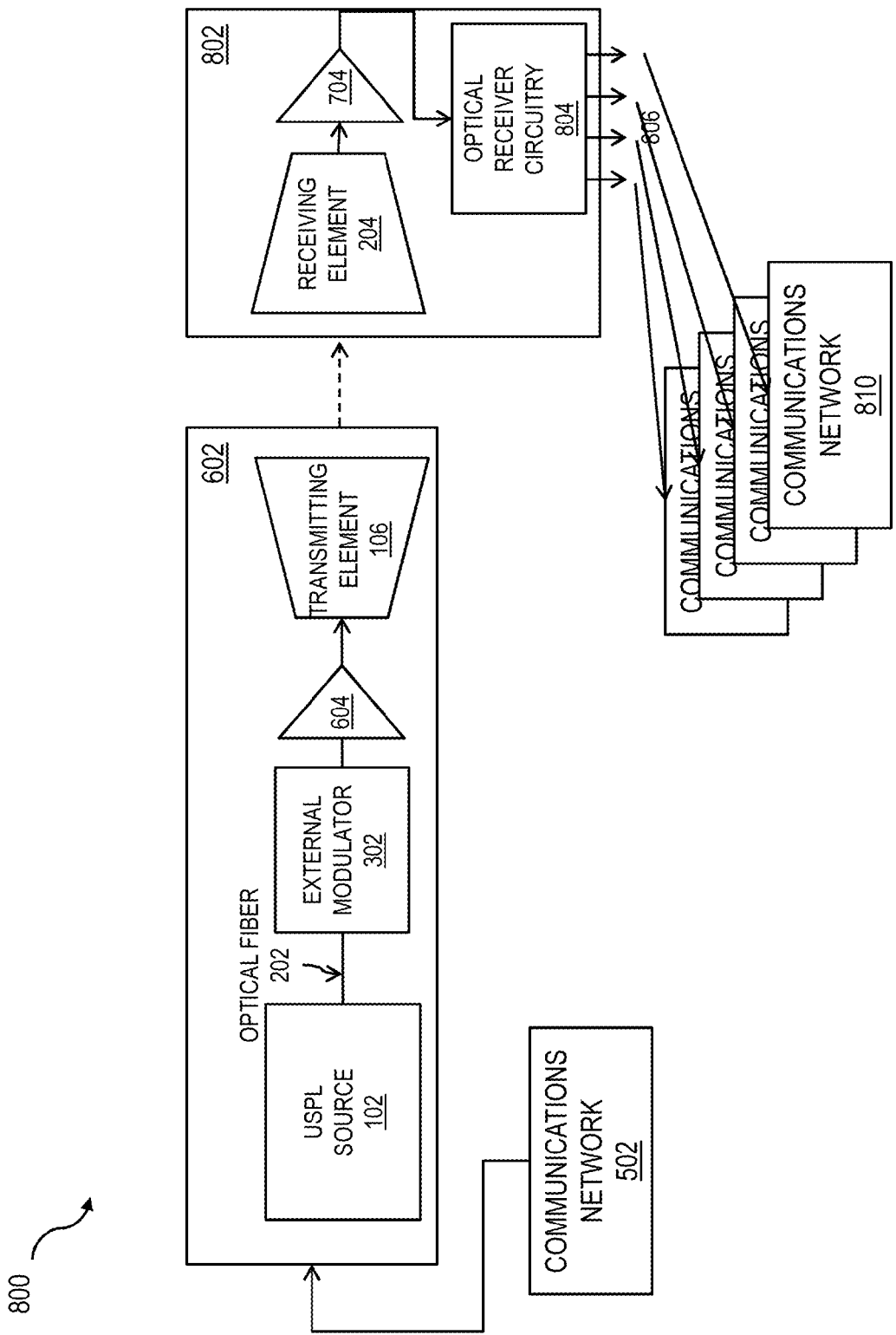
FIG. 8 depicts an example of a USPL laser device that is fiber coupled to an external modulator for transport, in a point-to-Multi-point configuration.

FIG. 8 illustrates an example of an optical communications system 800 consistent with an implementation of the current subject matter. The optical communications platform 602 shown in FIG. 6 can be in communication with a second optical communications platform 802, which can in this implementation include a receiving element 204 and an optical preamplifier 704 similar to those shown in FIG. 7. As shown in FIG. 8, the second optical communications platform 802 can further include optical receiver circuitry 804, which can receive amplified and electrically recovered data received at the receiving element 204 and amplified by the optical preamplifier. A plurality of clock sources 806 can interface to multiple remote multi-point network connections with a plurality of communications networks 810 as required. In a similar manner, a complementary set of clock sources and multiple communication networks can be operated in conjunction with the optical communications platform 602 (e.g. in place of the single depicted communication network 502 in FIG. 8.

Figure 9:
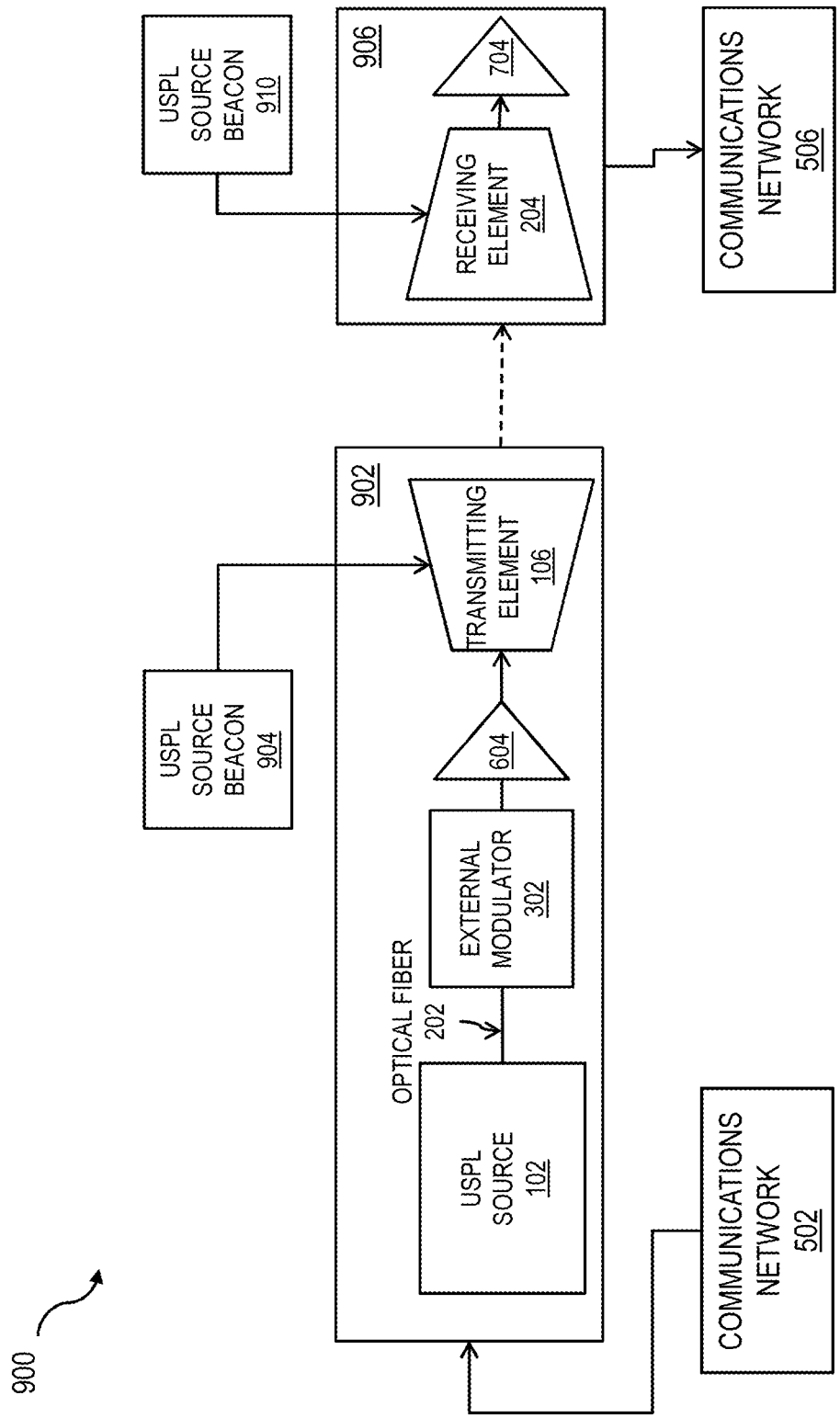
FIG. 9 depicts an example of use of USPL sources acting as tracking and alignment (pointing) beacon sources.

FIG. 9 illustrates an example of an optical communications system 900 consistent with an implementation of the current subject matter. An optical communications platform 902, which can feature similar elements to those in the optical communications platform 602 first discussed herein in reference to FIG. 6, can also include an additional USPL source 904 acting as a tracking and alignment (pointing) beacon source. A second optical communications platform 906 can also include an additional USPL source 910 acting as a tracking and alignment (pointing) beacon source. The tracking and alignment (pointing) beacon sources 904, 910 can optionally originate from available communications sources used in data transport transmission, or can be provided by separate, dedicated USPL sources. In addition, each USPL beacon source 904, 910 can include an in-band or out-of-band source, thereby allowing the advantage of available optical amplification sources, or from dedicated optical amplification resources.

Figure 10:
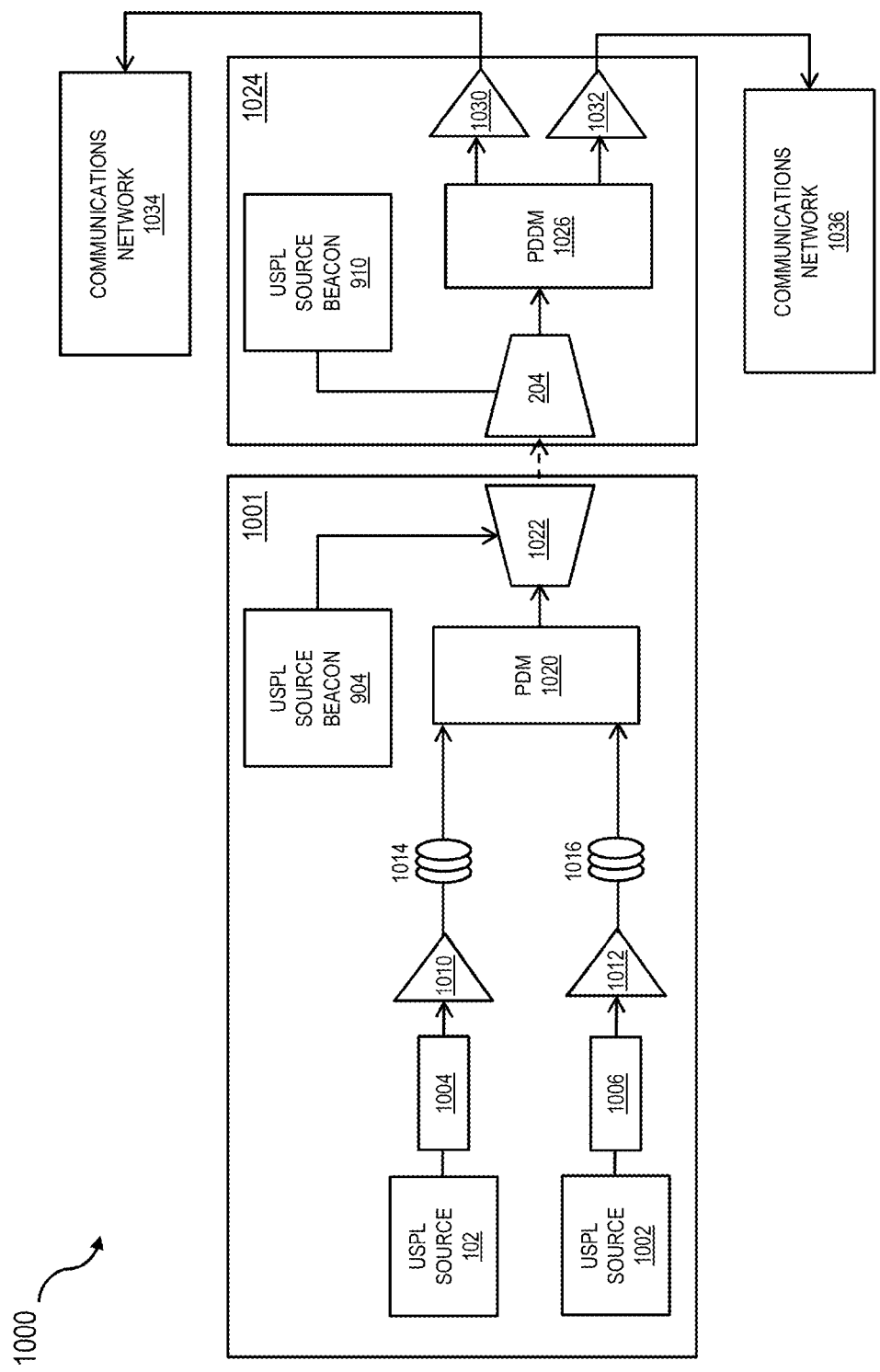
FIG. 10 depicts an example of a USPL laser sources polarization multiplexed onto a transmitted optical signal, to provide Polarization Multiplex USP-FSO (PM-USP-FSO) functionality.

FIG. 10 illustrates an example of a FSO communication system 1000 that includes a dual polarization USPL-FSO optical data-link platform 1001 in which USPL sources are polarization multiplexed onto a transmitted optical signal to thereby provide polarization multiplexed USP-FSO (PM-USP-FSO) functionality. Two USPL sources 102 and 1002 are fiber coupled to either directly modulated or externally modulated modulation components 1004, 1006 respectively. Each respective modulated signal is optically amplified by an optical amplifier component 1010, 1012 followed by adjustment of optical polarization states using polarization components 1014, 1016. The polarization state signals are fiber coupled to a polarization dependent multiplexer (PDM) component 1020 for interfacing to an optical launch platform component 1022, which can be similar to the transmit element 106 discussed above. The PDM 1020 multiplexes the light of differing polarization states into a single pulse train for transmission via the optical launch platform component 1022. An USPL optical beacon 904 can be included to provide capabilities similar to those discussed above in reference to FIG. 9, for example to operate along or in conjunction with a second USPL optical beacon 906 at a receiving platform 1024, which can include a receiving element 204 similar to those described above. As previously noted, the receiving element 204 as well as other features and components of the receiving platform 1024 can generally be capable of supporting transmission functions such that a bi-directional link is established. A received signal recovered by the receiving element 204 can provide an optical signal that is interfaced to an appropriate polarization dependent de-multiplexer 1026 capable of providing two signals for further optical amplification using amplification elements 1030, 1032. Each optical amplified signal as provided by the amplification elements 1030, 1032 can be interfaced to an appropriate optical network 1034, 1036 for network usage.

FIG. 11A shows an example of a system 1100 in which USPL-FSO transceivers can be utilized for use in line-of-sight optical communication (e.g. "lasercom") applications, and FIG. 11B shows an example of a system 1150 in which USPL-FSO transceivers can be utilized for use in non-line-of-sight lasercom applications. An advantage to some implementations of the current subject matter can be realized due to scattering of the optical signal sent from a transmit element as the transmitted light passes through the atmosphere. This scattering can permit the use of non-line-of-sight communication. In addition, radios used in such communication systems can operate in the solar-blind portion of the UV-C band, where light emits at a wavelength of 200 to 280 nm. In this band, when solar radiation propagates through the environment, it is strongly attenuated by the Earth's atmosphere. This means that, as it gets closer to the ground, the amount of background noise radiation drops dramatically, and low-power communications link operation is possible. On the other hand, environmental elements such as oxygen, ozone and water can weaken or interrupt the communications broadcast, limiting usage to short-range applications.

When UV waves spread throughout the atmosphere, they are typically strongly scattered into a variety of signal paths. Signal scattering is essential to UV systems operating in non-line-of-sight conditions, and the communications performance can highly dependent on the transmission beam pointing and the receiver's field of view. A line-of-sight arrangement 1100 as shown in FIG. 11A can differ in bandwidth size from a non-line-of-sight arrangement 1150 as shown in FIG. 11B. Ultraviolet communication can more strongly rely on a transmitter's beam position and a receiver's field of view. As a result, refining of the pointing apex angle, for example by experimenting with supplementary equipment to enhance the UV-C signal, can be advantageous.

FIG. 12 illustrates an example of a remote sensing system 1200 in which an USPL source 102 is fiber coupled by an optical fiber component 202 to an optical launch element 1202 capable of transmitting and receiving optical signals. Some of the light propagated forward through the optical launch element 1202 is backscattered by interaction with air-borne particulates that are the subject of investigation. The optical backscattered signal is detected through the optical launch element 1202 or a similar receive aperture and passed along for detection and spectrographic analysis through detection circuitry 1204 or the like in FIG. 12. The signature of particulates within a target atmospheric region 1206 within which an investigation is made can be calibrated through conventional approaches, for example using predetermined spectrographic calibration measurements based on one or more of ultraviolet spectroscopy, infrared spectroscopy, Raman spectroscopy, etc. Consistent with this implementation, an optical system can be operated as a LiDAR instrument providing enhanced resolution and detection sensitivity performance, using USPL laser sources operating over a spectral range of interest. Adjustability of spectral range can aid in evaluating and analyzing chemical constituents in the atmosphere.

USPL-FSO transceivers can be utilized for remote sensing and detection for signatures of airborne elements using ionization or non-ionization detection techniques, utilizing optical transport terminals manufactured through either the Hyperbolic Mirror Fabrication Techniques or conventional Newtonian designs that focus a received signal at one ideal point. Also certain adaptations can be related to ionization probing of remote regions include controllable ionization, which has been shown to occur at these frequencies and an ionization process, which can be focused at distance to adjust depth of atmospheric penetration especially in weather and clouds.

FIG. 13 illustrates an example of use of USPL sources as well as optical reception techniques to improve detection sensitivity. Researchers at the National Institute of Standards and Technology (NIST), US, have built a laser ranging system that can pinpoint multiple objects with nanometer precision over distances up to 100 km. The LIDAR (light detection and ranging) system could have applications from precision manufacturing on Earth to maintaining networks of satellites in perfect formation (Nature Photonics DOI: 10.1038/NPHOTON.2009.94). The NIST device uses two coherent broadband fiber-laser frequency combs. Frequency combs output a series of stable short pulses that also contain a highly coherent carrier that extends across the pulse train. This means a frequency comb can be employed to simultaneously make an interferometric measurement as well as a time-of-flight measurement, thereby enhancing analytical capabilities for application specific situations.

In the arrangement shown in FIG. 13, two phase-locked frequency combs 1301 and 1302 are used in a coherent linear optical sampling configuration, also known as a multi-heterodyne, meaning that one frequency comb measures both distance paths, while the other frequency comb provides distance information encoded in the light of the first comb. Pulses from one frequency comb 1301 can be launched out of the fiber and directed towards two glass plates, a reference 1303 and a target 1304. The plates 1303 and 1304 can reflect a certain fraction (e.g. approximately 4%) of the pulse back down the fiber, effectively creating two new pulses. The time separation between the two pulses 1301 can give the distance between the moveable target plate and reference plates. A second frequency comb 1302 is tightly phase-locked with the first, but has a slightly different repetition rate. Due to the different delay between consecutive pulses when the sources interfere, the second frequency comb can sample a slightly different part of the light from the electric field of the first comb.

Using the technique described is reference to FIG. 13, can make possible the replacement of two coherent broadband fiber-laser sources with two appropriate USPL sources used within the scope of the configuration outlined having each USPL source fiber coupled to dedicated free-space optical telescope designs. By doing so, the overall efficiency, optical ranging and accuracy can be improved substantially.

Currently available USPL optical pulse trains operate at the native pulse repetition rates of the USPL laser source and are typically limited to 50 MHz or less, thereby capping the maximum data rates for optical transmission. As a result the optical system utilizing USPL laser sources is restricted to low data rate applications of 50 Mbps or less. Having the means to increase USPL operational rates is necessary for providing solutions for data transport in excess of 50 Mbps.

FIG. 14 illustrates an example of a remote sensing system 1400 in which an USPL source 102 is fiber coupled by an optical fiber component 202 to an optical launch element 1202 capable of transmitting and receiving optical signals. Light propagated forward by the optical launch element 1202 is backscattered by interaction with targets known and unknown that are the subject of investigation within an atmospheric region 1206. The optical backscattered signal is detected through the optical launch element 1202 or a similar receive aperture and passed along for detection analysis through a detection circuitry and spectrographic analysis component 1402 in FIG. 14. The signature of particulates within the region 1206 under investigation can be calibrated, for example where range-finding analysis can be performed. A system 1400 as in FIG. 14 can include a USPL-FSO transceiver utilized and operated across the 1.3 to 1.6 micron wavelength range as a range-finder and spotting apparatus for the purposes of target identification and interrogation applications.

FIG. 15 illustrates an optical pulse multiplier module 1500 that can increase the repetition rate of the output from a USPL source 102. A typical USPL with a pulse width of 10-100 femto-seconds has a repetition rate of, for example, 50 MHz. The output from the USPL 102 can be fed as an input 1502 into a USPL photonic chip pulse multiplier module 1504. In this example, the photonic chip can contain a 20,000:1 splitter element 1506 that splits the input into discrete light elements. Each light element on the opposite side of the splitter element 1506 contains the 50 MHz pulse train. Each light element then passes though a delay controller (either a fiber loop or lens array) 1510, which delays the pulse train for that element in time, for example by a number of picoseconds. Successive light elements are thereby delayed by incremental picoseconds. All of these pulse trains with their unique time delays are combined into a single pulse train in a fashion similar to time division multiplexing utilizing a 20,000:1 optical combiner element 1512. The required ratios of splitters and combiners can be controlled to provide necessary optical designs for the application required. The final output 1514 is a pulse train of 10-100 femto-second pulses with a repletion rate of 1 THz. This THz pulse train can then be modulated by a 10 or 100 GigE signal, such as shown in FIG. 28, resulting in 100 femto-second pulses per bit for the 10 GigE system, and 10 femto-second pulses per bit for 100 GigE systems. The application cited is not limited to specific data rates of 10 and 100 Gbps, but can operate as required by the application under considerations. These numbers are just for illustration purposes. Implementations of the current subject matter can use any multiplier factor to increase the repetition rate of the USPL via the photonic chip pulse multiplier module 1504 to any arbitrary repetition rate. Other examples used in generation of enhanced USPL repetition rates are illustrated within this submission.

FIG. 16 depicts a system 1600 for generation, transmission, and receiving of high pulse rate USPL optical streams. An optical chip multiplexing module 1610, which can for example be similar to that discussed in reference to FIG. 15, can be used in this application. In this approach to achieve USPL pulse multiplication, a series of 10 GigE router connections (10 GigE is not intended to be a limiting feature) described by signals 1601, 1602, 1603, 1604 (four signals are shown in FIG. 16, but it will be understood that any number is within the scope of the current subject matter) are interfaced to the optical chip multiplexing module 1610. In operation, the optical chip multiplexing module 1610 can support full duplex (Tx and Rx) to connect with the 10 GigE routers 1601, 1602, 1603, 1604. The optical chip multiplexing module 1610 can provide efficient modulation by a USPL signal 1685 output from a USPL source 1690 for ingress optical signals 1601, 1602, 1603, 1604. The optical chip multiplexing module 1610 can provide capabilities to modulate and multiplex these ingress optical signals.

At a remote receive site where a receiving device is positioned, all signals sent via a transmitting element 1660 at the transmitting device can be recovered using an appropriate receiver element 1665. A complementary set of optical chip multiplexing module 1675 can provide necessary capabilities for demultiplexing the received data stream as shown by elements for delivery to a series of routers 1601', 1602', 1603', 1604' (again, the depiction of four such routers is not intended to be limiting). End-to-end network connectivity can be demonstrated through network end-point elements.

FIG. 17 depicts an example system 1700 in which an optical chip is interconnected to a wavelength division multiplexing (WDM) system, currently available versions of which can be very expensive. WDM systems have the advantage of not requiring timing or synchronization as needed with a 10 GigE (or other speed) router 1701, since each 10 GigE signal runs independent of other such signals on its own wavelength. Timing or synchronization of the TDM optical chip with 10 GigE routers can be important in a TDM optical chip. A GbE switch 1701 can provide the necessary electrical RF signal 1705, from the switch 1701 to modulate a USPL source 1702, either directly or by use of USPL a pulse multiplier module previously detailed within this document. A typical NRZ output 1710 can be coupled into a external modulator 1720, which can be modulated using a NRZ clock source for the switch 1701, thereby resulting in a RZ modulated spectrum 1730. The conversion process using readily available equipment can provide capabilities for introducing USPL sources and their benefits into the terrestrial backhaul network spectrum.

For the optical chip system to successfully bridge between two remote 10 GigE switches, it must typically act like a simple piece of fiber. The timing of the TDM chip can therefore be driven by the 10 GigE switch 1701. Both actively mode-locked USPLs (i.e. 40 GHz, 1 picosecond pulse width) and passively mode-locked USPLs (i.e. 50 MHz, 100 USPL pulse width) can be driven by a RF timing signal.

FIG. 18 illustrates a device 1800 that can support another approach to progression to a high pulse repetition data rate operation, such as for extremely high data rate operation in which optical chip design can be performed using either fiber or free-space optics. A 50 MHz USPL source 1801 is interfaced to a series of optical delay controller elements 1802, which can be designed using either fiber loops or offset lenses, to result in producing exactly a 10.313 Gbps RZ output stream, which is the 10 GigE line rate (greater than 10 Gbps because of 64 B/66 B encoding). A splitter element 1803 provides splitting functionality of the incoming optical signal train 1801 into (in this example) 206 paths, along with variable optical delay lines 1804. After sufficient delay is introduced through design all signals are multiplexed together through a combiner element 1805. In so doing a series of optical signals each identical, and equally spaced between adjacent pulses form a continuum of pulses for modulation. Prior to entering an E-O modulator element 1806, all optical ingress signals can be conditioned by pre-emphasis techniques, for example using typical optical amplification techniques, to result in a uniform power spectrum for each egress signal from the combiner element 1805. The conditioned egress signals are then coupled into the E-O modulator element 1806 and modulated with an available NRZ signal from the 10 GigE signal source element 1807. The 10 GigE modulated output 1809 can interface to an EDFA and then into the TX of a FSO system (or a fiber optic system). The Rx side (after the detector) can be fed directly into a 10 GigE switch as a modulated and amplified output 1810.

FIG. 19 illustrates another example of a device 1900 that can be used for USPL pulse multiplication consistent with implementations of the current subject matter. Consistent with this approach, a 10×TDM system is configured to give a 100 Gbps output. A TDM demux chip can be on the receive side of a communication link to break up the individual 10 GigE signals, and can include a reciprocal approach to the design shown in FIG. 19.

As in FIG. 18, a 50 MHz USPL source 1801 is interfaced to a series of optical delay controller elements 1802, which can be designed using either fiber loops or offset lenses, to result in producing exactly a 10.313 Gbps RZ output stream, which is the 10 GigE line rate (greater than 10 Gbps because of 64 B/66 B encoding). A splitter element 1803 provides splitting functionality of the incoming optical signal train 1801 into (in this example) 206 paths, along with variable optical delay lines 1804. After sufficient delay is introduced through design all signals are multiplexed together through a combiner element 1805. Instead of a single modulator element 1806 as shown in FIG. 18, however, the 10.313 GHz RZ output 1901 from the combiner element 1805 is fed into a second splitter element 1910, which in this case can be a 10× splitter, which splits the optical signal into ten parallel paths. Other implementations of this design can support various split ratios as required by design. Optical paths out from second splitter element 1910 are individually connected to specified optical delay lines 1920. Each individual delayed path is connected to a dedicated optical modulator of a set of optical modulators 1930 modulated with an available NRZ signal from the 10×10 GigE signal source element 1931, resulting in a series of modulated optical signals 1935. An optical combiner identified 1940 provides a single optical pulse train 1950. The series of optical pulses in the single optical pulse train 1950 can be interfaced to an appropriate optical amplifier for desired optical conditioning for network use.

FIG. 20 illustrates another example of a device 2000 that can be used for USPL pulse multiplication consistent with implementations of the current subject matter. A device 2000 as depicted can provide the ability to achieve high USPL pulse repetition data rates for network applications by modulation of the low repetition rate intra-channel pulses. By applying direct modulation of each channel on the delay controller, creation of a modulation scheme, which is not constrained by the current speed limitations from the electronics technology, can be beneficially accomplished. Implementations of the current subject matter can provide a mechanism to enhance the data transmission capacity of a system, by separately modulating individual channels at the current standard electronic modulation speed (in the example of FIG. 20 at the rate of 100×10 GigE signal input 2001) and time-multiplexing the channels into a single frequency high rep rate pulse stream. In this approach, the current standard, which is limited by the speed of electro-optic modulators (40 Gbps), can be enhanced by approximately N orders of magnitude, where N is the number of channels of the time-multiplexer. For example, a 100 channel TDM with each channel amplitude modulated at the current standard data rate can be able to offer data rates at speeds of up to 4 Tbs. N can be limited by the width of the optical pulse itself. In the limit that information is carried 1 bit/pulse, the time slot occupied by 1 bit is the width of the pulse itself (in that sense, RZ system would converge to a NRZ). For example, in the scheme, a 40 fs pulse width laser with a 40 GHz rep rate is able to carry information at a maximum rate of 25 Tbps. This approach can be used in a 40 Gbps-channel modulation scheme (i.e 1 bit every 25 ps) and can correspond to a capacity of N~625 channels in a single transmission, which can be the number of 40 fs time intervals fitting in a 25 ps time interval. A significant advantage of this approach is the ability to "optically enhance" an otherwise limited data capacity modulation scheme, while still interfacing with the existing data rate limited modulators. For example, an amplitude modulator based on a Mach-Zehnder interferometer can be easily integrated in a TDM IC package, in that required is the ability to branch out the channel into two separate paths, add a tiny phase modulator (nonlinear crystal) in one of the paths, and combine the paths for interference.

FIG. 20 includes a USPL source 2010 coupled to a multi-port optical splitter element 2020. The number of optical ports identified need not be limited to those described or shown herein. A series of optical delay lines 2030 provide required optical delays between each parallel path from the multi-port optical splitter element 2020, and can be tailored for specific applications. The optical delay paths from the optical delay lines 2030 are summed together using an optical combiner element 2035. The resulting combined optical data stream appearing through element 2040 represents a multiplicative enhancement in the pulse repetition rate of the original USPL source identified by element 2010. Further enhancement in pulse repetition rate is accomplished though the usage of element 2041, described by an optical splitter where the incoming signal 2040 is split into a series of paths not limited to those identified by element 2041. By way of a second delay controller 2045, optical delays may be introduced to each path within the device as identified by the second set of optical delay paths 2042. Each parallel path 2042 in turn is modulated by a modulating element 2044 with an available RF signal source element identified by the signal input 2001. An optical combiner element 2050 integrates all incoming signals onto a single data stream 2060.

Optical pre-emphasis and de-emphasis techniques can be introduced within each segment of elements described to custom tailor the optical spectrum for a uniform or asymmetric optical power distribution. Pre- & de-emphasis can be accomplished using commonly used optical amplifiers such as Er-Doped Optical amplifiers (EDFA).

FIG. 21 depicts an example of a system 2100 that includes a mode-locked USPL source 2101, which can be used to generate appropriately required clock and data streams for the application. Mode-locked lasers can represent a choice of high performance, high finesse source for clocks in digital communication systems. In this respect, mode-locked fiber lasers—in either linear or ring configuration—can make an attractive candidate of choice, as they can achieve pulse widths on the USPL source region and repetition rate as high as GHz. In addition to that, fibers offer compactness, low cost, low sensitivity to thermal noise, low jitter, no problems associated with diffraction or air dust pollution, just to name a few. In a communications scenario, the pulse width can determine the available bandwidth of the system, and the repetition rate limits the data rate. The pulse width can be determined by the intrinsic characteristics of the laser cavity—i.e. balancing of the overall group-velocity dispersion (GVD), and the choice of the saturable absorber (in the case of a passive system)—or the bandwidth of an active element (in the case of an active mode-locked system). The repetition rate of the pulse train is constrained by the length of the fiber. For example, in a linear laser, the fundamental mode $v_{osc}$ of the laser can be expressed as:

$$v_{OSC} = \frac{c}{2n_g L}, \quad (4)$$

where c is the speed of light in vacuum, $n_g$ is the average group index, and L is the length of the cavity. Therefore, a 10 cm long fiber laser cavity element 2110 with an average group index of 1.47 would have a repetition rate of 1 GHz. In strictly passive systems, mode-locking can be achieved through the use of a saturable absorber. In an active laser, an amplitude modulator element 2150 can be inserted in the cavity to increase the repetition rate of the laser (harmonic mode locking). In order to achieve high repetition rate clocks using mode-locked USPL source, it is possible to use one or more of (i) an intra-cavity amplitude Mach-Zehnder modulator (MZM) 2150 as shown in FIG. 21 and (ii) a low threshold saturable absorber. These techniques, known as "harmonic mode-locking", can be utilized within a fiber based plant distribution system or within a FSO system, for terrestrial, submarine or FSO system either in; air, space or submarine applications.

Detailed within FIG. 21 is 980 nm pump element 2102 coupled to an optical WDM device 2105. An erbium doped optical amplifier 2110 or equivalent can be used to create a non-linear environment to obtain a mode-locked pulse train emission within a closed cavity established between two Faraday reflectors 2101 and 2160 on either end of the optical USPL cavity. Operation of the device is capable of establishing a self-contained series of optical pulse in excess of 100 Gbps, and highly synchronized in nature at the output port 2170 of the module. In order to achieve a high gain non-linear medium the EDFA 2110 can be specially designed. A phase lock loop 2130 can provide advantageous stability in operation by maintaining a synchronized clock source through modulation of the signal through components 2120, 2130, 2150 of the self contained high-repetition rate pulse generator.

To achieve high rep rates in a laser that is limited by its dimensions (length in the case of a linear laser and perimeter in the case of a ring laser), it can be necessary to stimulate intra-cavity generation of the multiples of the fundamental mode. In the active case, an amplitude modulator inserted in the cavity modulates the loss of the system operating as a "threshold gating" device. For this approach to be successful, it can be necessary that the controlling signal to the modulator be referenced to the oscillation of the laser itself to avoid the driving signal "forcing" an external frequency of oscillation on the laser. This can be realized by the introduction of a phase-lock-loop element 2130, or a synchronous oscillator circuit to track-and-lock onto the repetition rate of the laser, and regenerate the signal. In the case of a PLL, the RF output can be set to a multiple of the input signal (much as this device is used in cell phone technology), and the rep rate of the laser increased. The signal can then be used for triggering of a pulse generator, or in conjunction with a low-pass filter. A MZ amplitude modulator 2150 outside the laser cavity can be used to create On-Off Keying (OOK) modulation on the pulse train coming out of the mode-locked laser.

FIG. 22 shows a graphical depiction 2200 illustrating effects of a loss modulation introduced to the input pulse train 2201 due to the presence of the amplitude modulator 2205 with a controlling signal NRZ signal 2210 made of a bit sequence as illustrated. The resulting signal at the output of the device 2220 represents an NRZ to RZ converter device for use in telecommunications and scientific applications where the application may benefit from RZ data streams. A clock signal 2201 (optical input) at a given pulse repetition rate will pass through the modulator 2205. At the same time, a controlling signal consisting of a sequence of 1's and 0's can be applied to the RF port of the modulator element 2215. When the modulator element 2215 is biased at minimum transmission, in the absence of a controlling signal the loss experienced by the optical signal can be at its maximum. In the presence of the RF signal (1's), the loss will drop to a minimum (OPEN GATE), thus working as an On-Off Keying modulation device. The pulse width of the output optical signal is typically much less than the time slot occupied by a single bit of information (even less than a half clock period of a NRZ scheme) making this system genuinely RZ as identified by element 2220.

FIG. 23 illustrates an example system 2300 for generation of high optical harmonic USPL pulse streams having high pulse repetition rate using a saturable absorber (SA) device 2330. The SA device 2330 can in some examples include carbon nano-tubes. Passive mode-locked fiber lasers using carbon nano-tubes SA (CNT-SA) make another attractive option for high rep rate sources due to their ability to generate high harmonics of the fundamental rep rate. In the approach described, a closed, self contained optical cavity is established, in which two Faraday reflectors 2301 and 2350 form the optical cavity. Although a high-power erbium doped fiber amplifier (EDFA) 2310 is shown in FIG. 23, any inverting medium producing a non-linear optical cavity can be used. A seed laser 2315, such as for example a 980 nm pump laser as shown in FIG. 23 can be used in generating a high-repetition rate optical train. In particular, any suitable pump laser may be considered in terms of optical wavelength and pulse repetition rate required. The SA element 2330 can be placed within the cavity to establish required optical pulse characteristics 2350 as required through design requirements.

FIG. 23 shows the schematics of an example of a laser that can be used in one or more implementations of the current subject matter. Unlike the active laser shown in FIG. 22, here the MZ modulator can be replaced by the SA element 2330. A technique similar to those described herein can be utilized within a fiber based plant distribution system or within a FSO system, for terrestrial, submarine or FSO system either in air, space or submarine applications.

FIG. 24 illustrates an approach to providing time-domain multiplexing (TDM) where the TDM multiplexes a pulse train using parallel time delay channels. In some instances, it can become important to manipulate the delay channels such that they are "consistent" relative to each another. The frequency of the output multiplexed pulse train can ideally as much as possible be insensitive to environmental changes. For that, a proposed feedback loop control system is design to correct the delay units for any fluctuations which compromises the stability of the output rep rate.

FIG. 24 shows a diagram of an example of a delay control system 2400. The control loop can be implemented in one of several ways consistent with the current subject matter. FIG. 24 describes one possibility for illustration purposes. The input pulse train enters the TDM and multiplexes into N paths, each with its own delay line. If the paths are made of low "bending-loss" fiber waveguides, then each path can be coiled around a cylindrical piezoelectric actuator (PZ) of radius R. The actuators generally expand in a radial direction as a result of a controlling voltage (Vc). This expansion $\Delta R$, which is linearly proportional to Vc, causes a change in length of the fiber $\Delta L=2\pi N\Delta R$, where N is the number of fiber turns around the PZ. For Terahertz multiplexing, the delay between the pulses (and thus of PZ1) must be 1 picosecond. This can require a change in length equals to 200 microns, which, for a one turn PZ actuator corresponds to a $\Delta R=32.5$ microns. Most commercially available piezoelectric actuators are highly linear and operate well within this range. The control mechanism can, therefore, be based on several PZ actuators, each with a number of turns corresponding to multiples of the first delay, i.e. (32, 64, 96 microns, etc.), and controlled by a single voltage Vc. The controlling voltage is determined by the feedback system, which compares the frequency of the output signal using a 1/N divider, with the frequency of the input signal, using a phase comparator (PC). The frequency of the "slow" input optical signal (represented by the waveform with $\tau RT$ in FIG. 24 is converted to an RF signal using photo-detector PDin. In order to reduce the effects of electronic jitter, a "differentiator" (or high pass filter) can be applied to the RF signal as to steepen the leading edges of the pulses. A phase-locked loop is used to track-and-lock the signal, and to regenerate it into a 50% duty-cycle waveform. Likewise, in the output side, the optical signal is picked-up by photo-detector PDout, high-pass filtered, and regenerated using the clock output port of a clock-and-data recovery system. The clock of the output signal, which has a frequency N times the frequency of the input signal, is send to an N times frequency divider before going to the phase comparator. From the phase comparator, a DC voltage level representing the mismatch between the input and output signals (much as what is used in the architecture of PLL circuits) indicates the direction of correction for the actuators. A low-pass filter adds a time constant to the system to enhance its insensitivity to spurious noise.

A CDR can advantageously be used in the output, as opposed to a PLL such that the output signal may, or may not, be modulated. This system can be designed to work in both un-modulated, and "intra-TDM modulated" (i.e. one modulator at each delay path) schemes. However, this is a completely deterministic approach to compensating for variations on the length of the delay lines. Ideally, and within a practical standpoint, the delay paths should all be referenced to the same "thermal level" i.e. be sensitive to the same thermal changes simultaneously. In the event that each line senses different variation, this system would not be able to correct for that in real time.

In the alternative, a completely statistical approach can include summing of op amp circuits (S1 . . . SN) to deliver the controlling voltage to the actuators. Using such an approach, input voltages (V1 to VN) can be used to compensate for discrepancies in length between the lines, in a completely static sense, otherwise they can be used for initial fine adjustments to the system. The approach typically must also compensate or at least take into account any bending loss requirements of the fibers used. Some new fibers just coming out in the market may have a critical radius of only a few millimeters.

In the event that each path delay line senses different variation in temperature or experiences uncorrelated length changes due to spurious localized noise, the previously described approach, as is, may suffer from difficulties in performing a real time correction. A more robust approach operating in a completely statistical sense can be used consistent with some implementations of the current subject matter. In such an approach, summing op amp circuits (S1 ... SN) can be used to deliver the controlling voltages to the actuators. In this case, the input voltages (V1 to VN) can be used to compensate for discrepancies in length between the delay lines in a completely statistical sense, otherwise they can only be useful for initial fine adjustments to the system (calibration).

Referring again to FIG. 24, an incoming USPL source identified as element 2401 is coupled to an optical coupler element 2403, such that one leg of the coupler connects to an optical photodiode selected for operation at the operational data rate of 2401. Using standard electronic filtering techniques described by elements 2404, 2405, and 2406 an electrical square wave representation of the incoming USPL signal is extracted and identified by element 2407. The second optical leg of coupler 2403 is interfaced into an appropriate optical splitter element identified by 2410, where the incoming signal into 2410 is split into 206 parallel optical paths. Also illustrated are variable rate optical delay lines established in parallel for each of the parallel branches of the splitter element 2410. The parallel piezo-electric electric elements are identified by elements 242N and are controlled electronically through feedback circuitry within the diagram. A control voltage identified by Vc is generated through a photodiode 2485 along with electronic circuitry elements 2480 and 2475. The clock-and-data Recovery (CDR) element 2475 produces a clock source that is used in controlling each of the PZ elements. Optical paths identified as 244N are combined after a proper delay is introduced into each leg of element 2410. The pulse multiplied USPL signal 2490 is thereby generated.

FIG. 25A shows a schematic of a fiber PZ actuator 2500, and FIG. 25B shows a graph 2590 of radius vs. voltage for such an actuator. Together, these drawings illustrate operation of a PZ actuator for increasing the pulse repetition rate of an incoming USPL pulse train through induced optical delay. Although shown for use as an element for enhancing pulse repetition rate generation for USPL signals, the same technique can be used for other optical devices requiring or benefiting from optical delay. The basic structure for the device is a fiber based PZ actuator 2501. When a voltage 2550 is applied to electrodes 2520 a voltage induced stress results within the fiber, causing a time delay of the optical signal traveling through the fiber. By varying applied voltage a performance curve of optical delay vs. applied voltage is obtained as shown in the graph 2590 of FIG. 25B.

FIG. 26 shows a diagram illustrating features of an example statistical corrector 2600. The coarse correction controller 2640 shown in FIG. 26 corresponds to the system described in the previous section, which can correct for length variations simultaneously picked up by all delay lines. As mentioned, these variations are expected to occur in a time scale much slower than the "intra delay line" spurious variations. This latter effect can manifest itself as a period-to-period jitter introduced on the system. This type of jitter can be monitored using an RF Spectrum Analyzer (RFA), causing the rep rate line of the system to display "side lines" (or side bands), which are the result of the analyzer beating together noisy frequencies resulting from uneven time intervals between consecutive pulses. One such pattern can be processed using an analog-to-digital converter (ADC) and saved as an array of values, which can then be fed to a neural network (NN) machine. Neural network machines are known to posses excellent adaptability characteristics that allow them to essentially learn patterns from outside events by adapting to new set of input and outputs. A set of inputs in this case can be generated from a set of "imperfect observations", i.e. "noisy" outputs of the TDM system as detected by the RFA and converted to digital arrays by the ADC ($\{f_1, f_2, \ldots f_N\}$, where $f_i$ is a frequency component picked up by the RFA). A set of outputs can be generated from the corrections ($\{V_1, V_2, \ldots, V_N\}$, where $V_i$ is a compensating input voltage to the summing op amp) required to rid the output frequency set from the undesired excess frequency noise, which is due to the outside perturbations to the system. With a sufficiently large number of $\{f,V\}$ pairs, where f, V are frequency, voltage arrays, one can build an statistical set to train the NN machine to learn the underlying pattern associated with the presence of the intra-channel noise. These machines can be found commercially in an IC format from several manufacturers, or implemented as software and used in conjunction with a computer feedback control mechanism. A single layer Perceptron type neural network, or ADALINE (Adaptive Linear Neuron or later Adaptive Linear Element), should be sufficient to accomplish the task.

Similar to the description provided above in relation to FIG. 24, a statistical corrector element 2670 can include electronic circuitry that is similar to or that provides similar functionality as the electrical circuitry elements 2480 and 2475 and the photodiode 2485 of FIG. 24. For the approach illustrated in FIG. 26, a RF spectra analyzer 2695 along with a Neural Network 2670 and a Coarse Correction Controller element 2640 are used to perform the requirement of optical delay introduced into a parallel series of PZ elements 262N.

FIG. 27 illustrates concepts and capabilities of approaches consistent with implementations of the current subject matter in which performance, accuracy, and resolution can be improved through replacement of piezoelectric disk (PZ) modules identified by elements 2795 and 272N, where compact micro fiber based collimators (MFC) 2795 encircled by ceramic disks are used to obtain optical delay lines. Although illustrating a technique for increasing the native pulse repetition rate for a USPL pulse train, the design illustrated is not limited to such applications but can be applied or extended to other needs within the optical sector wherever optical delay is required. In so doing, a more controlled amount of temporal delay can be introduced within each MFC element of the circuit. The improvement through the use of utilizing MFC elements can improve response, resolution, and the achievement of reproducing in a rapid fashion required voltage responses in a mass production means. The concept identified within FIG. 27 can be incorporated into precisely produced elements that can serve as complementary paired units for use in reducing USPL pulse-to-pulse jitter as well as for the purposes of data encryption needs.

With further reference to FIG. 27, a USPL source 2701 having a certain pulse repetition rate is split into a preselected number of optical paths 271N (which can number other than 206) as identified by splitter element 2705. An appropriately controlled delay 273N is introduced into each parallel leg of the split optical paths 271N using elements described by 2795 and 272N. The resulting delayed paths 274N are added together through an optical combiner element 2760. The pulse multiplied USPL signal 2780 results.

One potential disadvantage of some previously available TDM designs, in which fibers are "wrapped-around" the piezo actuators, is that the mechanism must comply with the bending loss requirements of the fibers used. Some new fibers just coming out in the market have critical radius of only a few millimeters. To correct for this issue, implementations of the current subject matter can use of micro-machined air-gap U-brackets in lieu of the fiber-wrapped cylindrical piezos. FIG. 27 illustrates this principle. In this approach, the piezoelectric actuators ($PZ_1, \ldots PZ_N$) can be replaced by air gap U-bracket structures constructed using micro-fiber collimators (MFCs), and micro-rings made of a piezoelectric material. In this case, however, the piezoelectric actuator expands longitudinally, increasing (or decreasing) the air gap distance between the collimators, in response to the controlling voltages (V1, V2, ... VN). As in the case of the cylindrical piezoelectric, a single voltage Vc can be use to drive all the piezoelectric devices, provided that the gains of each channel (G1, G2, ... GN) are adjusted accordingly to provide the correct expansion for each line. Ideally, except for inherent biases to the system (i.e. intrinsic differences between op amps), the gain adjustments should be as G1, 2G1, 3G1, and so forth, in order to provide expansions, which are multiples of the τRT/N. Another way of implementing such an approach can be the use of multiple piezoelectric rings at the channels. In that manner, one can have channels with 1, 2, 3, N piezoelectric rings driven by the same voltage with all amplifiers at the same gain.

FIG. 28 provides a conceptual presentation of an optical chip system 2800 to successfully bridge between two remote 10 GigE switches. Ideally, such a connection can perform similarly to a simple piece of fiber. The timing of the TDM chip can be driven by the 10 GigE switch.

In reference to FIG. 28, a USPL source 2805 having a predetermined native pulse repetition rate identified by 2806 connects to an optical Pulse multiplier chip 2807. Element 2807 is designed to convert the incoming pulse repetition rate signal 2806 into an appropriate level for operation with high-speed network Ethernet switches as identified by 2801. Switch 2801 provides a reference signal 2802 used to modulate signal 2809 by way of a standard electro-optic modulator 2820 at the data rate of interest. A resulting RZ optical signal is generated as shown in element 2840.

An alternative to having the timing run from the 10 GigE switch is to build up the USPL to a Terabit/second (or faster) with a multiplier photonic chip, and then modulate this Terabit/second signal directly from the 10 GigE switch. Each bit will have 100 or so pulses. An advantage of this approach can be the elimination of a need for separate timing signals to be run from the switch to the USPL. The USPL via multiplier chip just has to pump out the Terabit/second pulses. Another advantage is that the output of the Multiplier Chip does not have to be exactly 10.313 or 103.12 Gbps. It just has to at a rate at about 1 Terabit/second. Where each 10 GigE bit has 100 or 101 or 99 pulses, this limitation is a non-issue. Another advantage is each bit will have many 10 USPL, so the 10 GigE signal will have the atmospheric propagation (fog and scintillation) advantage. Another advantage can be realized at the receiver end. It should be easier for a detector to detect a bit if that bit has 100 or so USPL pulses within that single bit. This could result in improved receiver sensitivity, and thus allow improved range for the FSO system. An additional advantage can be realized in that upgrading to 100 GigE can be as simple as replacing the 10 GigE switch with a 100 GigE switch. Each bit will have around 10 pulses in this case.

From a purely signal processing perspective this approach demonstrates an efficient way to send data and clock combined in a single transmission stream. Much like a "sampling" of the bits using an optical pulse stream, this approach has the advantage that the bit "size" is determined by the maximum number of pulses it carries, therefore establishing a basis for counting bits as they arrive at the receiving end. In other words, if the bit unit has a time slot which can fit N pulses, the clock of the system can be established as "one new bit of information" after every $5^{th}$.

A technique similar to those described herein can be utilized within a fiber based plant distribution system or within a FSO system, for terrestrial, submarine or FSO system either in air, space or submarine applications, and illustrates for the first time how the interconnection from USPL sources to optical network elements is achieved for networking applications.

FIG. 29 shows a system 2900 that illustrates a conceptual network extension for the design concept reflected within FIG. 28. As multiple USPL sources 2901, 2902, 2903 (it should be noted that while three are shown, any number is within the scope of the current subject matter), each modulated through dedicated optical switches and USPL laser Multiplier Chips circuits are configured in a WDM arrangement. As described in reference to FIG. 28, electrical signals from each Ethernet switch can be used to modulate dedicated optical modulators 2911, 2922, 2928 for each optical path. Optical power for each segment of the system can be provided by optical amplification elements 2931, 2932, 2933 for amplification purposes. Each amplified USPL path can then be interfaced to an appropriate optical combiner 2940 for transport to a network 2950, and can be either free space or fiber based as required. The output from the WDM module can then be configured to a transmitting element 102 for FSO transport or into fiber plant equipment.

The technique described herein can be utilized within a fiber based plant distribution system or within a FSO system, for terrestrial, submarine or FSO system either in; air, space or submarine applications, and illustrates for the first time how the interconnection from USPL sources to optical network elements is achieved for networking applications.

FIG. 30 shows the schematics of an experimental setup for implementations of the current subject matter to include construction of a computer assisted system to control the pulse width of an all-fiber mode-locked laser using recursive linear polarization adjustments with simultaneous stabilization of the cavity's repetition rate using a synchronous self-regenerative mechanism. The design can also offer tune-ability of the repetition rate, and pulse width.

The fiber ring laser is represented by the inner blue loop, where all intra-cavity fiber branches are coded in blue, except for the positive high dispersion fiber outside the loop, which is part of the fiber grating compressor (coded in dark brown). The outside loops represent the feedback active systems.

FIG. 30 shows a diagram of a system 3000 illustrating features of an USPL module providing control of pulse width and pulse repetition rate control through mirrors (M1, M2), gratings (G1,G2), lengths (L1,L2), second-harmonic generator (SHG), photomultiplier tube (PMT), lock-in amplifier (LIA), data acquisition system (DAC), detector (DET), clock-extraction mechanism (CLK), frequency-to-voltage controller (FVC), high-voltage driver (HVD), reference signal (REF), pulse-generator (PGEN), amplitude modulator (AM), isolator (ISO), piezoelectric actuator (PZT), optical coupler (OC), polarizer (POL), and polarization controller (PC) all serve to provide control of pulse repetition rate and pulse width control.

The passive mode-locking mechanism can be based on nonlinear polarization rotation (NPR), which can be used in mode-locked fiber lasers. In this mechanism, weakly birefringent single mode fibers (SMF) can be used to create elliptically polarized light in a propagating pulse. As the pulse travels along the fiber, it experiences a nonlinear effect, where an intensity dependent polarization rotation occurs. By the time the pulse reaches the polarization controller (PC) 3001 the polarization state of the high intensity portion of the pulse experiences more rotation than the lower intensity one. The controller can perform the function of rotating the high intensity polarization component of the pulse, bringing its orientation as nearly aligned to the axis of the polarizer (POL) as possible. Consequently, as the pulse passes through the polarizer, its lower intensity components experience more attenuation than the high intensity components. The pulse coming out of the polarizer is, therefore, narrowed, and the entire process works as a Fast-Saturable Absorber (FSA). This nonlinear effect works in conjunction with the Group-Velocity Dispersion (GVD) of the loop, and, after a number of round trips, a situation of stability occurs, and passive mode-locking is achieved. The overall GVD of the optical loop can be tailored to produce, within a margin of error, an specific desired pulse width, by using different types of fibers (such as single mode, dispersion shifted, polarization maintaining, etc. . . . ), and adding up their contributions to the average GVD of the laser.

An active control of the linear polarization rotation from the PC can greatly improve the performance of the laser. This can be achieved using a feedback system that tracks down the evolution of the pulse width. This system, represented by the outer loop in FIG. 1, can be used to maximize compression, and consequently, the average power of the pulse. A pulse coming out of the fiber ring laser through an OC is expected to have a width on the order of a few picoseconds. An external pulse compression scheme, which uses a fiber grating compressor, is used to narrow the pulse to a sub 100 fsec range. This technique has been extensively used in many reported experiments, leading to high energy, high power, USPL pulses. Here, the narrowed pulse is focused on a Second-Harmonic Generator (SHG) crystal and detected using a Photo-Multiplying Tube (PMT). The lock-in-amplifier (LIA) provides an output DC signal to a Data Acquisition Card (DAC). This signal follows variations of the pulse width by tracking increases, or decreases, in the pulses' peak power. A similar technique has been successfully used in the past, except that, in that case, a Spatial Light Modulator (SLM) was used instead. Here, a programmable servo-mechanism directly controls the linear polarization rotation using actuators on the PC. With the DC signal data provided by the DAC, a decision-making software (such as, but not limited to, LABVIEW or MATLAB SIMULINK) can be developed to control the servo-mechanism, which in turn adjusts the angle of rotation of the input pulse relative to the polarizer's axis. These adjustments, performed by the actuators, are achieved using stress induced birefringence. For instance, if the pulse width decreases, the mechanism will prompt the actuator to follow a certain direction of the linear angular rotation to compensate for that, and if the pulse width increases, it will act in the opposite direction, both aimed at maximizing the average output power.

A self-regenerative feedback system synchronized to the repetition rate of the optical oscillation, and used as a driving signal to an amplitude modulator (AM), can regulate the round trip time of the laser. In the active system, the amplitude modulator acts as a threshold gating device by modulating the loss, synchronously with the round trip time. This technique has can successfully stabilize mode-locked lasers in recent reports. A signal picked up from an optical coupler (OC) by a photo-detector (DET) can be electronically locked and regenerated by a clock extraction mechanism (CLK) such as a Phase-Locked Loop or a Synchronous Oscillator. The regenerated signal triggers a Pulse Generator (PGen), which is then used to drive the modulator. In a perfectly synchronized scenario, the AM will "open" every time the pulse passes through it, at each round trip time (TRT). Because the CLK follows variations on TRT, the driving signal of the AM will vary accordingly.

An outside reference signal (REF) can be used to tune the repetition rate of the cavity. It can be compared to the recovered signal from the CLK using a mixer, and the output used to drive a Piezoelectric (PZT) system, which can regulate the length of the cavity. Such use of a PZT system to regulate the cavity's length is a well known concept, and similar designs have already been successfully demonstrated experimentally. Here a linear Frequency-to-Voltage Converter (FVC) may be calibrated to provide an input signal to the PZT's High Voltage Driver (HVD). The PZT will adjust the length of the cavity to match the repetition rate of the REF signal. If, for instance the REF signal increases its frequency, the output of the FVC will decrease, and so will the HV drive level to the piezoelectric-cylinder, forcing it to contract and, consequently increasing the repetition rate of the laser. The opposite occurs when the rep. rate of the reference decreases.

It is possible to have the width of the pulse tuned to a "transformed-limited" value using a pair of negative dispersion gratings. This chirped pulse compression technique is well established, and there has been reports of pulse compressions as narrow as 6 fs. The idea is to have the grating pair pulse compressor mounted on a moving stage that translates along a line which sets the separation between the gratings. As the distance changes, so does the compression factor.

In an example of a data modulation scheme consistent with implementations of the current subject matter, a passively modelocked laser can be used as the source of ultrafast pulses, which limits our flexibility to change the data modulation rate. In order to scale up the data rate of our system, we need to increase the base repetition rate of our pulse source. Traditionally, the repetition rate of a passively modelocked laser has been increased by either shortening the laser cavity length or by harmonic mode-locking of the laser. Both techniques cause the intra-cavity pulse peak power to decrease, resulting in longer pulse-widths and more unstable mode-locking.

One approach to solving this problem involves use of a modified pulse interleaving scheme, by a technique which we call pulse multiplication. FIG. 31 illustrates this concept. The lower repetition rate pulse train of a well-characterized, well-modelocked laser 3101 is coupled into an integrated-optical directional coupler 3180, where a well-determined fraction of the pulse is tapped off and "re-circulated" in an optical loop with an optical delay 3150 equal to the desired inter-pulse spacing in the output pulse train, and re-coupled to the output of the directional coupler. For instance, to generate a 1 GHz pulse train from a 10 MHz pulse train, an optical delay of 1 ns is required, and to enable the $100^{th}$ pulse in the train to coincide with the input pulse from the 10 MHz source, the optical delay might have to be precisely controlled. The optical delay loop includes optical gain 3120 to compensate for signal attenuation, dispersion compensation 3160 to restore pulse-width and active optical delay control 3150. Once the pulse multiplication has occurred, the output pulse train is OOK-modulated 3175 with a data stream 3182 to generated RZ signal 3190, and amplified in an erbium-doped fiber amplifier 3185 to bring the pulse energy up to the same level as that of the input pulse train (or up to the desired output pulse energy level).

One or more of the features described herein, whether taken alone or in combination, can be included in various aspects or implementations of the current subject matter. For example, in some aspects, an optical wireless communication system can include at least one USPL laser source, which can optionally include one or more of pico-second, nano-second, femto-second and atto-second type laser sources. An optical wireless communication system can include USPL sources that can be fiber-coupled or free-space coupled to an optical transport system, can be modulated using one or more modulation techniques for point-to-multi-point communications system architectures, and/or can utilize optical transport terminals or telescopes manufactured through one or more of hyperbolic mirror fabrication techniques, conventional Newtonian mirror fabrication techniques, or other techniques that are functionally equivalent or similar. Aspheric aspheric optical designs can also or alternatively be used to minimize, reduce, etc. obscuration of a received optical signal.

Free-space optical transport systems consistent with implementations of the current subject matter can utilize USPL laser designs that focus a received signal at one ideal point. In some implementations one telescope or other optical element for focusing and delivering light can be considered as a transmitting element and a second telescope or other optical element for focusing and receiving light positioned remotely from the first telescope or other optical element can function as a receiving element to create an optical data-link. Both optical communication platforms can optionally include components necessary to provide both transmit and receive functions, and can be referred to as USPL optical transceivers. Either or both of the telescopes or other optical elements for focusing and delivering light can be coupled to a transmitting USPL source through either via optical fiber or by a free-space coupling to the transmitting element. Either or both of the telescopes or other optical elements for focusing and receiving light can be coupled to a receive endpoint through either optical fiber or a free-space coupling to the optical receiver. A free-space optical (FSO) wireless communication system including one or more USPL sources can be used: within the framework of an optical communications network, in conjunction with the fiber-optic backhaul network (and can be used transparently within optical communications networks within an optical communications network (and can be modulated using On-Off keying (OOK) Non-Return-to-Zero (NRZ), and Return-to-Zero (RZ) modulation techniques, within the 1550 nm optical communications band), within an optical communications network (and can be modulated using Differential-Phase-Shift Keying (DPSK) modulation techniques), within an optical communications network (and can be modulated using commonly used modulation techniques for point-to-point communications system architectures using commonly used free-space optical transceiver terminals), within an optical communications network utilizing D-TEK detection techniques, within a communications network for use in conjunction with Erbium-Doped Fiber Amplifiers (EDFA) as well as high power Erbium-Ytterbium Doped Fiber Amplifiers (Er/Yb-DFA), within an optical communications network (and can be modulated using commonly used modulation techniques for point-to-multi-point communications system architectures), etc.

USPL technology can, in some aspects, be utilized as a beacon source to providing optical tracking and beam steering for use in auto-tracking capabilities and for maintaining terminal co-alignment during operation. The recovered clock and data extracted at the receive terminal can be used for multi-hop spans for use in extending network reach. The optical network can be provided with similar benefits in WDM configurations, thereby increasing the magnitude of effective optical bandwidth of the carrier data link. USP laser sources can also or alternatively be polarization multiplexed onto the transmitted optical signal to provide polarization multiplex USP-FSO (PM-USP-FSO) functionality. The recovered clock and data extracted at the receive terminal can be used for multi-hop spans for use in extending network reach, and can include a generic, large bandwidth range of operation for providing data-rate invariant operation. An optical pre-amplifier or semi-conductor optical amplifier (SOA) can be used prior to the optical receiver element and, alternatively or in combination with the recovered clock and data extracted at the receive terminal, can be used for multi-hop spans for use in extending network reach, having a generic, large bandwidth range of operation for providing data-rate invariant operation. Terminal co-alignment can be maintained during operation, such that significant improvement in performance and terminal co-alignment can be realized through the use of USPL technology, through the use of USPL data source as well as providing a improved approach to maintaining transceiver alignment through the use of USPL laser beacons.

USPL-FSO transceivers can be utilized in some aspects for performing remote-sensing and detection for signatures of airborne elements using ionization or non-ionization detection techniques, utilizing optical transport terminals manufactured through either the Hyperbolic Mirror Fabrication Techniques or conventional Newtonian designs that focus a received signal at one ideal point. USPL-FSO transceivers consistent with implementations of the current subject matter can be utilized in non-line of sight lasercom applications. USPL-FSO transceivers consistent with implementations of the current subject matter can allow adjustment of the distance at which the scattering effect (enabling NLOS technique) takes place, reception techniques to improve detection sensitivity using DTech detection schemes, and improved bandwidth via broadband detectors including frequency combs. USPL-FSO transceivers consistent with implementations of the current subject matter can be utilized in conjunction with Adaptive Optic (AO) Techniques for performing incoming optical wave-front correction (AO-USPL-FSO). USPL-FSO transceivers consistent with implementations of the current subject matter can be utilized and operate across the 1.3 to 1.6 micron wavelength range. USPL-FSO transceivers consistent with implementations of the current subject matter can be utilized in conjunction with optical add-drop and optical multiplexing techniques, in both single-mode as well as multi-mode fiber configurations. A USPL-FSO transceiver consistent with implementations of the current subject matter can be utilized and operated across the 1.3 to 1.6 micron wavelength range as a range-finder and spotting apparatus for the purposes of target identification and interrogation applications.

In other aspects of the current subject matter, a series of switched network connections, such as for example 10 GigE, 100 GigE, or the like connections can be connected from one point to another, either over fiber or free-space optics, for example via Time Division Multiplexing (TDM).

A mode-locked USPL source consistent with implementations of the current subject matter can be used to generate both clock and data streams. Mode-locked lasers can represent a choice of a high performance, high finesse source for clocks in digital communication systems. In this respect, mode-locked fiber lasers—in either linear or ring configuration—can make an attractive candidate of choice, as they can achieve pulse widths of the USPL sources region and repetition rate as high as GHz.

High harmonic generation can be achieved using carbon nano-tubes saturable absorbers. Passive mode-locked fiber lasers using carbon nano-tubes saturable absorbers (CNT- SA) make an option for high rep rate sources due to their ability to readily generate high harmonics of the fundamental rep rate.

FSO can be used in terrestrial, space and undersea applications.

Conditional path lengths control from splitter to aperture can be an important parameter. TDM multiplexes can be employed consistent with implementations of the current subject matter to control the relative temporal time delay between aperture-to-source paths. Each pulse train can be controlled using parallel time delay channels. This technique can be used to control conventional multiple-transmit FSO aperture systems employing WDM as well as TDM systems. USPL laser pulse-to-pulse spacing can be maintained and controlled to precise temporal requirements for both TDM and WDM systems. The techniques described can be used in TDM and WDM fiber based system. The use of TDM multiplexers as described herein can be used implement unique encryption means onto the transmitted optical signal. A complementary TDM multiplexer can be utilized to invert the incoming received signal, and thereby recover the unique signature of the pulse signals. A TDM multiplexer described herein can be utilized to control WDM pulse character for the purpose of WDM encryption. A TDM multiplexer can be used in conventional FSO systems wherein multiple apertures connected to a common source signal are capable of having the temporal delay between pulses controlled to maintain constant path lengths. A TDM multiplexer can be used for TDM fiber based and FSO based systems. A TDM multiplexer can be an enabling technology to control optical pulse train relationship for USPL sources. A TDM multiplexer can be used as an atmospheric link characterization utility across an optical link through measurement of neural correction factor to get same pulse relational ship.

Any combination of PZ discs can be used in a transmitter and can have an infinite number of encryption combinations for USPL based systems, both fiber and FSO based. The timing can run from 10 GigE switches or the equivalent and to build up the USPL to a Terabit/second (or faster) rate with a Multiplier Photonic chip, and this Terabit/second signal can be modulated directly from the 10 GigE switch. While operating in a WDM configuration, an interface either to a fiber based system or to a FSO network element can be included.

A system can accept an ultrafast optical pulse train and can generate a train of optical pulses with pulse-width, spectral content, chirp characteristics identical to that of the input optical pulse, and with a pulse repetition rate being an integral multiple of that of the input pulse. This can be accomplished by tapping a fraction of the input pulse power in a 2×2 optical coupler with an actively controllable optical coupling coefficient, re-circulating this tapped pulse over one round trip in an optical delay line provided with optical amplification, optical isolation, optical delay (path length) control, optical phase and amplitude modulation, and compensation of temporal and spectral evolution experienced by the optical pulse in the optical delay line for the purpose of minimizing temporal pulse width at the output of the device, and recombining this power with the 2×2 optical coupler.

Passive or active optical delay control can be used, as can optical gain utilizing rare-earth-doped optical fiber and/or rare-earth-doped integrated optical device and/or electrically- or optically-pumped semiconductor optical amplification. Dispersion compensation can be provided using fiber-Bragg gratings and/or volume Bragg gratings. Wavelength division multiplexing data modulation of the pulse traversing the delay line can be sued as can pulse code data modulation of the pulse traversing the delay line.

The tailoring of conventional USPL sources through synthesis of USPL square wave pulses can be accomplished utilizing micro-lithographic amplitude and phase mask technologies, for FSO applications. The ability to adjust pulse widths using technology and similar approaches to control and actively control pulse with this technology can improve propagation efficiency through FSO transmission links, thereby improving system availability and received optical power levels.

Active programmable pulse shapers can be used to actively control USPL pulse-width can include matching real-time atmospheric conditions to maximize propagation through changing environments. One or more of the following techniques can be used in FSO applications to adapt the optical temporal spectrum using techniques: Fourier Transform Pulse shaping, Liquid Crystal Modular (LCM) Arrays, Liquid Crystal on Silicon (LCOS) Technology, Programmable Pulse Shaping using Acousto-optic modulators (AOM), Acousto-optic Programmable Dispersive Filter (AOPDF), and Polarization Pulse Shaping.

FIG. 32 shows a process flow chart 3200 illustrating features of a method, one or more of which can appear in implementations of the current subject matter. At 3202, a beam of light pulses each having a duration of approximately 1 nanosecond or shorter is generated. At 3204, a modulation signal is applied to the beam to generate a modulated optical signal. The modulation signal carrying data for transmission to a remote receiving apparatus. The modulated optical signal is received at an optical transceiver within an optical communication platform at 3206, and at 3210 the modulated optical signal is transmitted using the optical transceiver for receipt by the second optical communication apparatus FIG. 33 shows another process flow chart 3300 illustrating features of a method, one or more of which can appear in implementations of the current subject matter. At 3302, a beam of light pulses each having a duration of approximately 1 nanosecond or shorter is generated, for example using a USPL source. The beam of light pulses is transmitted at 3304 toward a target atmospheric region via an optical transceiver. At 3306, optical information received at the optical transceiver as a result of optical backscattering of the beam of light pulses from one or more objects in the target atmospheric region is analyzed.

FIG. 34 shows another process flow chart 3400 illustrating features of a method, one or more of which can appear in implementations of the current subject matter. At 3402, first and second beams comprising light pulses are generated, for example by a USPL source. At 3404, a first modulation signal is applied to the first beam to generate a first modulated optical signal and a second modulation signal is applied to the second beam to generate a second modulated optical signal. A first polarization state of the first modulated optical signal is adjusted at 3406. Optionally, a second polarization states of the second odulated optical signal can also be adjusted. At 3410, the first modulated optical signal having the adjusted first polarization state is multiplexed with the second modulated signal. At 3412, the multiplexed first modulated optical signal having the adjusted first polarization state with the second modulated signal is transmitted by an optical transceiver for receipt by a second optical communication apparatus.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like. A computer remote from an analyzer can be linked to the analyzer over a wired or wireless network to enable data exchange between the analyzer and the remote computer (e.g. receiving data at the remote computer from the analyzer and transmitting information such as calibration data, operating parameters, software upgrades or updates, and the like) as well as remote control, diagnostics, etc. of the analyzer.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An optical communication apparatus comprising:
   an ultra-short-pulse-laser (USPL) source that generates a beam comprising light pulses each having a duration of approximately 1 nanosecond or shorter;
   a modulation element that applies a modulation signal to the beam generated by the USPL source to generate a modulated optical signal, the modulation signal carrying data for transmission to a second optical communication apparatus;
   an optical transceiver that receives the modulated optical signal and transmits the modulated optical signal for receipt by the second optical communication apparatus; and
   wherein the optical transceiver is configured to detect atmospheric elements enabling analysis of a backscattered signal of an air-borne particulate signature of the detected atmospheric elements to enable adjustment of the beam generated by the USPL source enhancing atmospheric penetration.

2. An optical communication apparatus as in claim 1, wherein the modulation element comprises at least one of a direct modulation element, an indirect modulation element, and an external modulation element, the external modulation element being external to the USPL source.

3. An optical communication apparatus as in claim 1, wherein the duration is less than approximately a picosecond.

4. An optical communication apparatus as in claim 1, wherein the duration is less than approximately a femtosecond.

5. An optical communication apparatus as in claim 1, wherein the duration is less than approximately an attosecond.

6. An optical communication apparatus as in claim 1, further comprising an optical multiplexer that multiplexes more than one communication channel into the beam.

7. An optical communication apparatus as in claim 1, further comprising an optical amplifier disposed between the USPL source and the optical transceiver, the optical amplifier increasing an output power of the modulated optical signal transmitted by the optical transceiver.

8. An optical communication apparatus as in claim 7, wherein the optical amplifier comprises at least one of an optical pre-amplifier, a semi-conductor optical amplifier, an erbium-doped fiber amplifiers, and an erbium-ytterbium doped fiber amplifier.

9. An optical communication apparatus as in claim 1, further comprising a second USPL source supplying a second beam of light pulses to the optical transceiver, the second USPL source serving as a tracking and alignment beacon to determine or verify a target point for the transmitted modulated optical signal at the remote receiving apparatus.

10. An optical communication apparatus as in claim 1, wherein a tracking and alignment beacon signal is generated within the modulated optical signal, the tracking and alignment beacon signal being used to determine or verify a target point for the transmitted modulated optical signal at the remote receiving apparatus.

11. An optical communication apparatus as in claim 1, further comprising a polarization dependent multiplexer component that multiplexes optical signals of differing polarity before transmission of the modulated optical signal to the second optical communication apparatus.

12. An optical communication apparatus as in claim 1, further comprising a polarization dependent de-multiplexer component that de-multiplexes optical signals of differing polarity received as a second modulated optical signal from the second optical communication apparatus.

13. An optical communication apparatus as in claim 12, wherein the de-multiplexed optical signals are each interfaced to a different optical network for network usage.

14. An optical communication apparatus as in claim 1, wherein the detected atmospheric elements further comprise aerosols, fog and scintillation effects.

15. A method of optical communication comprising:
generating by an ultra-short-pulse-laser (USPL) source a beam comprising light pulses each having a duration of approximately 1 nanosecond or shorter;
applying by a modulation element a modulation signal to the beam to generate a modulated optical signal, the modulation signal carrying data for transmission to a remote receiving apparatus;
receiving the modulated optical signal at an optical transceiver;
transmitting, using the optical transceiver, the modulated optical signal for receipt by the second optical communication apparatus; and
detecting by the optical transceiver atmospheric elements enabling analysis of a backscattered signal of an airborne particulate signature of the detected atmospheric elements to enable adjustment of the beam enhancing atmospheric penetration.

16. A method as in claim 15, wherein the generating is performed by an ultra-short-pulse-laser (USPL) source.

17. A method as in claim 15, wherein the applying is performed by a modulation element, the modulation element comprising at least one of a direct modulation element, an indirect modulation element, and an external modulation element, the external modulation element being external to the USPL source.

18. An optical communication apparatus as in claim 15, wherein the detected atmospheric elements further comprise aerosols, fog and scintillation effects.

19. A remote sensing apparatus comprising:
an ultra-short-pulse-laser (USPL) source that generates a beam comprising light pulses each having a duration of approximately 1 nanosecond or shorter;
an optical transceiver that transmits the beam of light pulses toward a target atmospheric region; and
detection circuitry for analyzing optical information received at the remote sensing apparatus as a result of optical backscattering from one or more objects in the target atmospheric region,
wherein the detection circuitry is configured to analyze a backscattered signal of an air-borne particulate signature of the one or more objects in the target atmospheric region enabling adjustment of the beam generated by the USPL source enhancing atmospheric penetration of the beam generated by the USPL source.

20. A remote sensing apparatus as in claim 19, further comprising a spectrographic analysis component for analyzing spectroscopic information extracted from the optical information received at the remote sensing apparatus.

21. An optical communication apparatus as in claim 19, wherein the optical information further comprises aerosols, fog and scintillation effects.

22. A method of remote sensing comprising:
generating, using a USPL source, a beam of light pulses each having a duration of approximately 1 nanosecond or shorter;
transmitting the beam of light pulses toward a target atmospheric region via an optical transceiver;
analyzing optical information received at the optical transceiver as a result of optical backscattering of the beam of light pulses from one or more objects in the target atmospheric region including a backscattered signal of an air-borne particulate signature to enable adjustment of the beam generated by the USPL source; and
adjusting the beam generated by the USPL source based on the analyzed optical information enhancing atmospheric penetration of the beam generated by the USPL source.

23. An optical communication apparatus as in claim 22, wherein the optical information further comprises aerosols, fog and scintillation effects.

24. An optical communication apparatus comprising:
a first laser source that generates a first beam comprising light pulses;
a second laser source that generate a second beam comprising light pulses
a first modulation element that applies a first modulation signal to the first beam to generate a first modulated optical signal, the first modulation signal carrying first data for transmission to a remote optical communication apparatus;
a second modulation element that applies a second modulation signal to the second beam to generate a second modulated optical signal, the second modulation signal carrying second data for transmission to the remote optical communication apparatus;
a first polarization component that adjusts a first polarization state of the first modulated optical signal;
a polarization dependent multiplexer component that multiplexes the first modulated optical signal having the adjusted first polarization state with the second modulated signal; and
an optical transceiver that receives the multiplexed optical signal first modulated optical signal with the adjusted first polarization state with the second modulated signal transmits the multiplexed first modulated optical signal having the adjusted first polarization state with the second modulated signal for receipt by the second optical communication apparatus; and
wherein the optical transceiver is configured to detect atmospheric elements enabling analysis of a backscattered signal of an air-borne particulate signature of the detected atmospheric elements to enable adjustment of the first and second beam generated by the first and second laser source enhancing atmospheric penetration.

25. An optical communication apparatus as in claim 24, wherein the detected atmospheric elements further comprise aerosols, fog and scintillation effects.

* * * * *